United States Patent
Mikami et al.

(10) Patent No.: US 12,308,421 B2
(45) Date of Patent: May 20, 2025

(54) ELECTRODE AND POWER STORAGE DEVICE COMPRISING GRAPHENE COMPOUND

(71) Applicant: SEMICONDUCTOR ENERGY LABORATORY CO., LTD., Atsugi (JP)

(72) Inventors: Mayumi Mikami, Kanagawa (JP); Yohei Momma, Kanagawa (JP); Minoru Takahashi, Nagano (JP); Hiroshi Kadoma, Kanagawa (JP); Teppei Oguni, Kanagawa (JP); Satoshi Seo, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 15/698,695

(22) Filed: Sep. 8, 2017

(65) Prior Publication Data

US 2018/0076489 A1 Mar. 15, 2018

(30) Foreign Application Priority Data

Sep. 12, 2016 (JP) .................................. 2016-177284

(51) Int. Cl.
*H01M 4/36* (2006.01)
*C07F 7/12* (2006.01)
(Continued)

(52) U.S. Cl.
CPC .............. *H01M 4/366* (2013.01); *C07F 7/12* (2013.01); *C07F 7/1804* (2013.01); *H01G 11/26* (2013.01);
(Continued)

(58) Field of Classification Search
None
See application file for complete search history.

(56) References Cited

U.S. PATENT DOCUMENTS 4,302,518 A 11/1981 Goodenough et al.
4,668,595 A 5/1987 Yoshino et al.
(Continued)

FOREIGN PATENT DOCUMENTS

CN 101148263 A 3/2008
CN 102610806 A 7/2012
(Continued)

OTHER PUBLICATIONS

Joshi.T et al., "Effects of Dissolved Transition Metals on the Electrochemical Performance and SEI Growth in Lithium-Ion Batteries", J. Electrochem. SOC. (Journal of the Electrochemical Society), 2014, vol. 161, No. 12, pp. A1915-A1921.
(Continued)

*Primary Examiner* — Jonathan G Leong
*Assistant Examiner* — Tony S Chuo
(74) *Attorney, Agent, or Firm* — NIXON PEABODY LLP; Jeffrey L. Costellia

(57) ABSTRACT

A novel electrode, a novel power storage device, an electrode with less deterioration, an electrode with a high capacity, a long-life power storage device, a power storage device with less deterioration, a power storage device with high energy density, or a highly reliable power storage device is provided. The electrode includes a graphene compound including a graphene layer and a substituted or unsubstituted chain group, and an active material. The graphene layer is bonded to the chain group through a substituent containing silicon. The graphene compound includes a region in contact with the active material in particle form. The active material includes an element A, which is one or more elements selected from elements belonging to Group 1 and elements belonging to Group 2, and an element M, which is one or more elements selected from manganese and nickel. The chain group includes one or
(Continued)

more groups selected from a carbonyl group, an ester group, a carboxyl group, an ether group, and an epoxy group.

12 Claims, 29 Drawing Sheets

(51) Int. Cl.

| | | |
|---|---|---|
| C07F 7/18 | (2006.01) | |
| H01G 11/26 | (2013.01) | |
| H01G 11/30 | (2013.01) | |
| H01G 11/36 | (2013.01) | |
| H01G 11/38 | (2013.01) | |
| H01G 11/46 | (2013.01) | |
| H01G 11/50 | (2013.01) | |
| H01M 4/131 | (2010.01) | |
| H01M 4/505 | (2010.01) | |
| H01M 4/525 | (2010.01) | |
| H01M 4/62 | (2006.01) | |
| H01M 10/052 | (2010.01) | |
| H01M 10/0525 | (2010.01) | |
| H01M 10/42 | (2006.01) | |
| H01G 11/06 | (2013.01) | |
| H01G 11/42 | (2013.01) | |
| H01G 11/52 | (2013.01) | |
| H01G 11/58 | (2013.01) | |

(52) U.S. Cl.
CPC ............ *H01G 11/30* (2013.01); *H01G 11/36* (2013.01); *H01G 11/38* (2013.01); *H01G 11/46* (2013.01); *H01G 11/50* (2013.01); *H01M 4/131* (2013.01); *H01M 4/505* (2013.01); *H01M 4/525* (2013.01); *H01M 4/625* (2013.01); *H01M 10/052* (2013.01); *H01M 10/0525* (2013.01); *H01M 10/4235* (2013.01); *H01G 11/06* (2013.01); *H01G 11/42* (2013.01); *H01G 11/52* (2013.01); *H01G 11/58* (2013.01); *H01M 2220/20* (2013.01); *Y02E 60/10* (2013.01)

(56) References Cited

U.S. PATENT DOCUMENTS

| | | |
|---|---|---|
| 5,240,794 A | 8/1993 | Thackeray et al. |
| 5,443,929 A | 8/1995 | Yamamoto et al. |
| 5,604,396 A | 2/1997 | Watanabe et al. |
| 5,705,291 A | 1/1998 | Amatucci et al. |
| 5,783,333 A | 7/1998 | Mayer |
| 5,824,278 A | 10/1998 | Yao |
| 5,834,139 A | 11/1998 | Shodai et al. |
| 5,871,866 A | 2/1999 | Barker et al. |
| 5,910,382 A | 6/1999 | Goodenough et al. |
| 6,085,015 A | 7/2000 | Armand et al. |
| 6,218,050 B1 | 4/2001 | Yoon et al. |
| 6,346,348 B1 | 2/2002 | Nakajima et al. |
| 6,458,487 B1 | 10/2002 | Takeuchi et al. |
| 6,514,640 B1 | 2/2003 | Armand et al. |
| 6,582,814 B2 | 6/2003 | Swiler et al. |
| 6,680,143 B2 | 1/2004 | Thackeray et al. |
| 6,737,195 B2 | 5/2004 | Kweon et al. |
| 6,753,111 B2 | 6/2004 | Kweon et al. |
| 6,846,592 B2 | 1/2005 | Kweon et al. |
| 6,919,144 B2 | 7/2005 | Miyazaki et al. |
| 6,974,601 B2 | 12/2005 | Kweon et al. |
| 6,984,469 B2 | 1/2006 | Kweon et al. |
| 7,018,741 B2 | 3/2006 | Suhara et al. |
| 7,138,209 B2 | 11/2006 | Kweon et al. |
| 7,294,435 B2 | 11/2007 | Miyamoto et al. |
| 7,303,840 B2 | 12/2007 | Thackeray et al. |
| 7,309,546 B2 | 12/2007 | Kweon et al. |
| 7,368,071 B2 | 5/2008 | Dahn et al. |
| 7,393,476 B2 | 7/2008 | Shiozaki et al. |
| 7,635,536 B2 | 12/2009 | Johnson et al. |
| 7,709,148 B2 | 5/2010 | Kawasato et al. |
| 7,709,151 B2 | 5/2010 | Inoue et al. |
| 7,736,807 B2 | 6/2010 | Hasegawa et al. |
| 7,790,308 B2 | 9/2010 | Johnson et al. |
| 7,892,679 B2 | 2/2011 | Shimizu et al. |
| 7,927,506 B2 | 4/2011 | Park |
| 7,935,270 B2 | 5/2011 | Park |
| 8,003,256 B2 | 8/2011 | Ohishi |
| 8,007,941 B2 | 8/2011 | Kweon et al. |
| 8,034,486 B2 | 10/2011 | Kweon et al. |
| 8,080,340 B2 | 12/2011 | Thackeray et al. |
| RE43,276 E | 3/2012 | Kweon et al. |
| 8,236,449 B2 | 8/2012 | Nakura |
| 8,470,477 B2 | 6/2013 | Miwa et al. |
| 8,476,510 B2 | 7/2013 | Swager et al. |
| 8,557,440 B2 | 10/2013 | Yu et al. |
| 8,685,569 B2 | 4/2014 | Oguni et al. |
| 8,685,570 B2 | 4/2014 | Miwa et al. |
| 8,709,654 B2 | 4/2014 | Takeuchi et al. |
| 8,753,532 B2 | 6/2014 | Levasseur et al. |
| 8,808,918 B2 | 8/2014 | Jung et al. |
| 8,877,377 B2 | 11/2014 | Hosoya |
| 8,877,381 B2 | 11/2014 | Yasuda et al. |
| 8,883,351 B2 | 11/2014 | Todoriki et al. |
| 8,906,547 B2 | 12/2014 | Taniguchi et al. |
| 8,927,148 B2 | 1/2015 | Kawakami |
| 8,945,770 B2 | 2/2015 | Koo et al. |
| 8,945,772 B2 | 2/2015 | Kawakami et al. |
| 9,225,003 B2 | 12/2015 | Yukawa |
| 9,227,850 B2 | 1/2016 | Ooishi |
| 9,293,236 B2 | 3/2016 | Kawakami et al. |
| 9,362,557 B2 | 6/2016 | Watanabe et al. |
| 9,391,322 B2 | 7/2016 | Liu et al. |
| 9,478,796 B2 | 10/2016 | Li et al. |
| 9,505,631 B2 | 11/2016 | Masukuni et al. |
| 9,515,313 B2 | 12/2016 | Umeyama et al. |
| 9,601,764 B2 | 3/2017 | Kawakami et al. |
| 9,666,326 B2 | 5/2017 | Kawakami et al. |
| 9,698,420 B2 | 7/2017 | Ishizaki et al. |
| 9,786,903 B2 | 10/2017 | Ryu et al. |
| 9,899,664 B2 | 2/2018 | Yamaki et al. |
| 9,923,244 B2 | 3/2018 | Takanashi et al. |
| 10,128,495 B2 | 11/2018 | Satow et al. |
| 10,243,215 B2 | 3/2019 | Shitaba et al. |
| 10,361,432 B2 | 7/2019 | Takaichi et al. |
| 10,938,035 B2 | 3/2021 | Yamakaji et al. |
| 2001/0010807 A1 | 8/2001 | Matsubara |
| 2002/0102459 A1 | 8/2002 | Hosoya et al. |
| 2002/0110736 A1 | 8/2002 | Kweon et al. |
| 2002/0164156 A1 | 11/2002 | Bilbrey |
| 2002/0195591 A1 | 12/2002 | Ravet et al. |
| 2003/0104279 A1 | 6/2003 | Miyazaki et al. |
| 2003/0134186 A1 | 7/2003 | Shizuki |
| 2004/0229123 A1 | 11/2004 | Takahashi et al. |
| 2004/0229124 A1 | 11/2004 | Miyamoto et al. |
| 2004/0234857 A1 | 11/2004 | Shiozaki et al. |
| 2005/0019662 A1 | 1/2005 | Suhara et al. |
| 2006/0051671 A1 | 3/2006 | Thackeray et al. |
| 2006/0051673 A1 | 3/2006 | Johnson et al. |
| 2006/0121352 A1 | 6/2006 | Kejha et al. |
| 2006/0188780 A1 | 8/2006 | Fujii et al. |
| 2006/0275664 A1 | 12/2006 | Ohzuku et al. |
| 2006/0286459 A1 | 12/2006 | Zhao et al. |
| 2007/0026315 A1 | 2/2007 | Lampe-Onnerud et al. |
| 2007/0099086 A1 | 5/2007 | Kang et al. |
| 2007/0117014 A1 | 5/2007 | Saito et al. |
| 2007/0122712 A1 | 5/2007 | Kang et al. |
| 2007/0148546 A1 | 6/2007 | Shimizu et al. |
| 2007/0160906 A1 | 7/2007 | Tooyama et al. |
| 2007/0212609 A1 | 9/2007 | Iwami |
| 2007/0224506 A1 | 9/2007 | Ooyama et al. |
| 2008/0131780 A1 | 6/2008 | Kawasato et al. |
| 2008/0166637 A1 | 7/2008 | Inagaki et al. |
| 2008/0241693 A1 | 10/2008 | Fukuchi et al. |
| 2009/0011335 A1 | 1/2009 | Takeda et al. |
| 2009/0087731 A1 | 4/2009 | Fukui et al. |
| 2009/0104532 A1 | 4/2009 | Hosoya |

(56) References Cited

U.S. PATENT DOCUMENTS

| | | |
|---|---|---|
| 2009/0123813 A1 | 5/2009 | Chiang et al. |
| 2009/0123842 A1 | 5/2009 | Thackeray et al. |
| 2009/0220862 A1 | 9/2009 | Toyama et al. |
| 2010/0019194 A1 | 1/2010 | Fujiwara et al. |
| 2010/0035147 A1 | 2/2010 | Kotato et al. |
| 2010/0129714 A1 | 5/2010 | Toyama et al. |
| 2010/0129715 A1 | 5/2010 | Saito et al. |
| 2010/0143784 A1 | 6/2010 | Johnson et al. |
| 2010/0143799 A1 | 6/2010 | Park |
| 2010/0159330 A1 | 6/2010 | Sugiura et al. |
| 2010/0178464 A1* | 7/2010 | Choi .................. B82Y 30/00 428/156 |
| 2010/0216024 A1 | 8/2010 | Kanno et al. |
| 2010/0233542 A1 | 9/2010 | Endo et al. |
| 2010/0247986 A1 | 9/2010 | Toyama et al. |
| 2010/0248033 A1 | 9/2010 | Kumar et al. |
| 2011/0033749 A1 | 2/2011 | Uchida et al. |
| 2011/0059367 A1 | 3/2011 | Morita et al. |
| 2011/0076564 A1 | 3/2011 | Yu et al. |
| 2011/0200879 A1 | 8/2011 | Saito et al. |
| 2011/0229757 A1 | 9/2011 | Kawakami et al. |
| 2011/0256437 A1 | 10/2011 | Katsuki. et al. |
| 2011/0269023 A1 | 11/2011 | Kawakami et al. |
| 2011/0297876 A1 | 12/2011 | Masukuni et al. |
| 2011/0300441 A1 | 12/2011 | Kawakami |
| 2012/0034516 A1 | 2/2012 | Koo et al. |
| 2012/0045692 A1 | 2/2012 | Takemura et al. |
| 2012/0064406 A1 | 3/2012 | Sato et al. |
| 2012/0064409 A1 | 3/2012 | Zhamu et al. |
| 2012/0088151 A1 | 4/2012 | Yamazaki et al. |
| 2012/0088156 A1 | 4/2012 | Nomoto et al. |
| 2012/0118149 A1 | 5/2012 | Dabrowski et al. |
| 2012/0177974 A1 | 7/2012 | Nakajima et al. |
| 2012/0244430 A1 | 9/2012 | Yamazaki et al. |
| 2012/0256337 A1 | 10/2012 | Yokoyama et al. |
| 2012/0258358 A1 | 10/2012 | Yura et al. |
| 2012/0258365 A1 | 10/2012 | Yokoyama et al. |
| 2012/0258369 A1 | 10/2012 | Yokoyama et al. |
| 2012/0261622 A1 | 10/2012 | Honma |
| 2012/0295163 A1 | 11/2012 | Yanagita et al. |
| 2012/0308891 A1 | 12/2012 | Todoriki et al. |
| 2012/0315544 A1 | 12/2012 | Yasuda et al. |
| 2012/0328951 A1 | 12/2012 | Hirohashi et al. |
| 2012/0328956 A1 | 12/2012 | Oguni et al. |
| 2012/0330044 A1* | 12/2012 | Hou .................. B82Y 30/00 556/9 |
| 2013/0017435 A1 | 1/2013 | Sato et al. |
| 2013/0040193 A1 | 2/2013 | Tsuchida et al. |
| 2013/0045418 A1 | 2/2013 | Oguni et al. |
| 2013/0052547 A1 | 2/2013 | Ogino et al. |
| 2013/0065120 A1 | 3/2013 | Miwa et al. |
| 2013/0078516 A1 | 3/2013 | Taniguchi et al. |
| 2013/0084384 A1 | 4/2013 | Yamakaji |
| 2013/0130103 A1 | 5/2013 | Kim et al. |
| 2013/0134051 A1 | 5/2013 | Takahashi et al. |
| 2013/0156683 A1 | 6/2013 | Holzapfel et al. |
| 2013/0156942 A1 | 6/2013 | Yamakaji et al. |
| 2013/0157034 A1 | 6/2013 | Choi et al. |
| 2013/0164619 A1 | 6/2013 | Yamakaji et al. |
| 2013/0177806 A1 | 7/2013 | Caldwell et al. |
| 2013/0183579 A1 | 7/2013 | Kim et al. |
| 2013/0189585 A1 | 7/2013 | Kang et al. |
| 2013/0190449 A1 | 7/2013 | Kinloch et al. |
| 2013/0202953 A1 | 8/2013 | Sharma et al. |
| 2013/0212879 A1 | 8/2013 | Ogino |
| 2013/0266858 A1 | 10/2013 | Inoue et al. |
| 2013/0266859 A1 | 10/2013 | Todoriki et al. |
| 2013/0313471 A1 | 11/2013 | Endo et al. |
| 2013/0316237 A1 | 11/2013 | Miki |
| 2013/0337320 A1 | 12/2013 | Yukawa |
| 2014/0004412 A1 | 1/2014 | Ogino |
| 2014/0023920 A1 | 1/2014 | Yamazaki et al. |
| 2014/0079995 A1 | 3/2014 | Wakada |
| 2014/0099554 A1 | 4/2014 | Inoue et al. |
| 2014/0127567 A1 | 5/2014 | Kuriki et al. |
| 2014/0127568 A1* | 5/2014 | Kawakami .......... H01M 4/1393 429/211 |
| 2014/0131633 A1 | 5/2014 | Ito et al. |
| 2014/0162132 A1 | 6/2014 | Ishii et al. |
| 2014/0166946 A1 | 6/2014 | Miwa et al. |
| 2014/0184172 A1 | 7/2014 | Momo et al. |
| 2014/0234700 A1 | 8/2014 | Moriwaka et al. |
| 2014/0275323 A1 | 9/2014 | Thibodeau et al. |
| 2014/0295068 A1 | 10/2014 | Nanba et al. |
| 2014/0315083 A1* | 10/2014 | Liu .................. H01M 4/622 429/217 |
| 2014/0332715 A1 | 11/2014 | Kawakami et al. |
| 2014/0370184 A1 | 12/2014 | Takemura. et al. |
| 2015/0014581 A1 | 1/2015 | Kawakami et al. |
| 2015/0014605 A1 | 1/2015 | Kawakami et al. |
| 2015/0064565 A1 | 3/2015 | Todoriki et al. |
| 2015/0093648 A1 | 4/2015 | Son et al. |
| 2015/0099178 A1 | 4/2015 | Kawakami et al. |
| 2015/0099179 A1 | 4/2015 | Ikenuma et al. |
| 2015/0123050 A1 | 5/2015 | Yamazaki et al. |
| 2015/0155556 A1 | 6/2015 | Kawakami et al. |
| 2015/0166348 A1 | 6/2015 | Ikenuma et al. |
| 2015/0262762 A1 | 9/2015 | Ikenuma et al. |
| 2015/0325855 A1 | 11/2015 | Kawakami et al. |
| 2015/0333320 A1 | 11/2015 | Tamaki et al. |
| 2015/0333324 A1 | 11/2015 | Umeyama et al. |
| 2015/0357641 A1 | 12/2015 | Sugie et al. |
| 2015/0380737 A1 | 12/2015 | Kawasato et al. |
| 2016/0006032 A1 | 1/2016 | Paulsen et al. |
| 2016/0028080 A1 | 1/2016 | Sugiura |
| 2016/0046771 A1 | 2/2016 | Thibodeau et al. |
| 2016/0064726 A1 | 3/2016 | Ikenuma et al. |
| 2016/0087315 A1 | 3/2016 | Oyama |
| 2016/0118646 A1 | 4/2016 | Ikenuma |
| 2016/0118658 A1 | 4/2016 | Kawakami et al. |
| 2016/0156030 A1 | 6/2016 | Sun et al. |
| 2016/0164089 A1 | 6/2016 | Kawakami et al. |
| 2016/0276658 A1 | 9/2016 | Choi et al. |
| 2016/0285102 A1 | 9/2016 | Shitaba et al. |
| 2016/0329533 A1 | 11/2016 | Tajima |
| 2016/0349905 A1 | 12/2016 | Momma et al. |
| 2016/0380271 A1 | 12/2016 | Ochiai et al. |
| 2017/0005364 A1 | 1/2017 | Yamazaki et al. |
| 2017/0040594 A1 | 2/2017 | Yamaki et al. |
| 2017/0062819 A1 | 3/2017 | Ikenuma |
| 2017/0069907 A1 | 3/2017 | Zhu et al. |
| 2017/0117589 A1 | 4/2017 | Tajima et al. |
| 2017/0187035 A1 | 6/2017 | Yanagihara et al. |
| 2017/0207444 A1 | 7/2017 | Yanagihara et al. |
| 2017/0256817 A1 | 9/2017 | Kadoma et al. |
| 2017/0309910 A1 | 10/2017 | Jo et al. |
| 2018/0013130 A1 | 1/2018 | Ochiai et al. |
| 2018/0019462 A1 | 1/2018 | Kadoma et al. |
| 2018/0040888 A1 | 2/2018 | Park et al. |
| 2018/0040897 A1 | 2/2018 | Park et al. |
| 2018/0102536 A1 | 4/2018 | Kawakami et al. |
| 2018/0108944 A1 | 4/2018 | Yamakaji |
| 2018/0145317 A1 | 5/2018 | Momma et al. |
| 2018/0145368 A1 | 5/2018 | Ochiai et al. |
| 2018/0254477 A1 | 9/2018 | Horikawa et al. |
| 2018/0331365 A1* | 11/2018 | Joo .................. H01M 4/0404 |
| 2018/0366729 A1 | 12/2018 | Yanagita et al. |
| 2020/0144601 A1 | 5/2020 | Takahashi et al. |
| 2020/0152961 A1 | 5/2020 | Momma et al. |
| 2020/0176770 A1 | 6/2020 | Takahashi et al. |
| 2021/0175507 A1 | 6/2021 | Yamakaji et al. |

FOREIGN PATENT DOCUMENTS

| | | |
|---|---|---|
| CN | 102694201 A | 9/2012 |
| CN | 102569775 B | 1/2017 |
| JP | H05-314965 | 11/1993 |
| JP | H05-314995 | 11/1993 |
| JP | 08-037007 A | 2/1996 |
| JP | 08-100107 A | 4/1996 |
| JP | 08-236114 A | 9/1996 |
| JP | 11-025983 A | 1/1999 |
| JP | 11-096993 A | 4/1999 |
| JP | 3031546 | 4/2000 |

(56) References Cited

FOREIGN PATENT DOCUMENTS

| | | |
|---|---|---|
| JP | 2000-203842 A | 7/2000 |
| JP | 3172388 | 6/2001 |
| JP | 2001-319692 | 11/2001 |
| JP | 2002-216760 A | 8/2002 |
| JP | 2002-352802 A | 12/2002 |
| JP | 2003-221235 A | 8/2003 |
| JP | 2003-331824 A | 11/2003 |
| JP | 2004-014381 A | 1/2004 |
| JP | 2004-103566 A | 4/2004 |
| JP | 2004-196604 A | 7/2004 |
| JP | 2004-288579 A | 10/2004 |
| JP | 2004-342554 A | 12/2004 |
| JP | 2005-158612 A | 6/2005 |
| JP | 2005-225734 A | 8/2005 |
| JP | 2005-302510 A | 10/2005 |
| JP | 2005-332629 A | 12/2005 |
| JP | 2006-164758 A | 6/2006 |
| JP | 2006-261132 A | 9/2006 |
| JP | 2006-318928 A | 11/2006 |
| JP | 2006-318929 A | 11/2006 |
| JP | 2007-128714 A | 5/2007 |
| JP | 2007-213866 A | 8/2007 |
| JP | 3959333 | 8/2007 |
| JP | 2008-166156 A | 7/2008 |
| JP | 2009-179501 A | 8/2009 |
| JP | 2010-080407 A | 4/2010 |
| JP | 2010-102895 A | 5/2010 |
| JP | 2010-192428 | 9/2010 |
| JP | 2010-244847 A | 10/2010 |
| JP | 2010-272239 A | 12/2010 |
| JP | 2011-076748 A | 4/2011 |
| JP | 2011-082133 A | 4/2011 |
| JP | 2011-138718 A | 7/2011 |
| JP | 4739780 | 8/2011 |
| JP | 2011-210694 A | 10/2011 |
| JP | 2012-043794 A | 3/2012 |
| JP | 2012-066944 A | 4/2012 |
| JP | 2012-074366 A | 4/2012 |
| JP | 2012-084257 A | 4/2012 |
| JP | 2012-146477 A | 8/2012 |
| JP | 2012-169217 A | 9/2012 |
| JP | 2012-209077 A | 10/2012 |
| JP | 2013-012410 A | 1/2013 |
| JP | 2013-062082 A | 4/2013 |
| JP | 2013-091581 A | 5/2013 |
| JP | 2013-093319 A | 5/2013 |
| JP | 2013-100197 A | 5/2013 |
| JP | 2013-152926 A | 8/2013 |
| JP | 2013-246936 A | 12/2013 |
| JP | 2014-049239 A | 3/2014 |
| JP | 2014-063707 A | 4/2014 |
| JP | 2014-063708 A | 4/2014 |
| JP | 2014-116111 A | 6/2014 |
| JP | 2015-069958 A | 4/2015 |
| JP | 2015-082374 A | 4/2015 |
| JP | 2015-099722 A | 5/2015 |
| JP | 2015-156363 A | 8/2015 |
| JP | 2015-201432 A | 11/2015 |
| JP | 2016-512283 | 4/2016 |
| JP | 2016-076454 A | 5/2016 |
| JP | 2017-021942 A | 1/2017 |
| JP | 2017-091777 A | 5/2017 |
| JP | 2018-092934 A | 6/2018 |
| JP | 2018-147726 A | 9/2018 |
| WO | WO-2012/005180 | 1/2012 |
| WO | WO-2012/029729 | 3/2012 |
| WO | WO-2012/124242 | 9/2012 |
| WO | WO-2012/132387 | 10/2012 |
| WO | WO-2014/061653 | 4/2014 |
| WO | WO-2014/098238 | 6/2014 |
| WO | WO-2014/143758 | 9/2014 |
| WO | WO-2015/136881 | 9/2015 |
| WO | WO-2015/163356 | 10/2015 |
| WO | WO-2018/211375 | 11/2018 |

OTHER PUBLICATIONS

Sun.Y et al., "High-energy cathode material for long-life and safe lithium batteries", Nature Materials, Mar. 22, 2009, vol. 8, pp. 320-324.

Thackeray.M et al., "Li2MnO3-stabilized LiMO2(M=Mn, Ni, Co) electrodes for lithium-ion batteries", J. Mater. Chem. (Journal of Materials Chemistry), 2007, vol. 17, pp. 3112-3125.

Mukalk et al., "Magnetic properties of the chemically delithiated LixMn2O4 with 0.07 ≤x≤1", Journal of Solid State Chemistry, May 1, 2011, vol. 184, No. 5, pp. 1096-1104.

Lee.S et al., "Antiferromagnetic ordering in Li2MnO3 single crystals with a two-dimensional honeycomb lattice", Journal of Physics: Condensed Matter, Nov. 14, 2012, vol. 24, No. 45, pp. 456004-1-456004-9.

Dreyer.D et al., "The Chemistry of Graphene Oxide", Chemical Society Reviews, Nov. 3, 2009, vol. 39, No. 1, pp. 228-240.

Wang.Z et al., "EELS analysis of cation valence states and oxygen vacancies in magnetic oxides", Micron, Oct. 1, 2000, vol. 31, No. 5, pp. 571-580, Elsevier.

Tan.H et al., "Oxidation state and chemical shift investigation in transition metal oxides by EELS", Ultramicroscopy, May 1, 2012, vol. 116, pp. 24-33, Elsevier.

Berbenni.V et al., "Thermogravimetry and X-Ray Diffraction Study of the Thermal Decomposition Processes in xLi2CO3—MnCO3 Mixtures", Journal of Analytical and Applied Pyrolysis, 2002, vol. 62, pp. 45-62.

Johnson.C et al., "Lithium-manganese oxide electrodes with layered-spinel composite structures xLi2MnO3 • (1-x)Li1+yMn2-yO4(0<x<1,0≤y≤0.33) for lithium batteries", Electrochemistry Communications, May 1, 2005, vol. 7, No. 5, pp. 528-536, Elsevier.

Katsuno.H et al., "Growth modes in two-dimensional heteroepitaxy on an elasticsubstrate", J. Cryst. Growth (Journal of Crystal Growth), Feb. 15, 2005, vol. 275, No. 1-2, pp. e263-e288, Elsevier.

Taguchi.N et al., "Characterization of MgO-coated-LiCoO2 particles by analytical transmission electron microscopy", Journal of Power Sources, 2016, vol. 328, pp. 161-166, Elsevier.

Chung.K et al., "Structural Studies on the Effects of ZrO2 Coating on LiCoO2 during Cycling Using In Situ X-Ray Diffraction Technique", J. Electrochem. Soc. (Journal of the Electrochemical Society), 2006, vol. 153, No. 11, pp. A2152-A2157.

Liu.L et al., "Electrochemical and In Situ Synchrotron XRD Studies on Al2O3-Coated LiCoO2 Cathode Material", J. Electrochem. Soc. (Journal of the Electrochemical Society), 2004, vol. 151, No. 9, pp. A1344-A1351.

Yano.A et al., "LICoO2 Degradation Behavior in the High-Voltage Phase Transition Region and Improved Reversibility with Surface Coating", J. Electrochem. Soc. (Journal of the Electrochemical Society), 2017, vol. 164, No. 1, pp. A6116-A6122.

Chen.Z et al., "Staging Phase Transitions in LixCoO2", J. Electrochem. Soc. (Journal of the Electrochemical Society), 2002, vol. 149, No. 12, pp. A1604-A1609.

McCalla.E et al., "The spinel and cubic rocksalt solid-solutions in the Li—Mn—Ni oxide pseudo-ternary system", Solid State Ionics, May 2, 2013, vol. 242, pp. 1-9, Elsevier.

Shim.J et al., "Characterization of Spinel LixCo2O4-Coated LiCoO2 Prepared with Post-Thermal Treatment as a Cathode Material for Lithium ion Batteries", Chem. Mater. (Chemistry of Materials), Apr. 10, 2015, vol. 27, No. 9, pp. 3273-3279.

Okumura.T et al., "Correlation of lithium ion distribution and X-ray absorption near-edge structure in O3- and O2-lithium cobalt oxides from first-principle calculation", Journal of Materials Chemistry, 2012, vol. 22, pp. 17340-17348.

Motohashi.T et al., "Electronic phase diagram of the layered cobalt oxide system LixCoO2 (0.0≤x≤1.0)", Phys. Rev. B (Physical Review. B), Oct. 9, 2009, vol. 80, No. 16, pp. 165114-1-155114-9.

Gabrisch.H et al., "Hexagonal to Cubic Spinel Transformation in Lithiated Cobalt Oxide TEM Investigation", J. Electrochem. Soc. (Journal of the Electrochemical Society), 2004, vol. 151, No. 6, pp. A891-A897.

Khedr.A et al., "Synthesis, Structure, and Electrochemistry of Sm-Modified LiMn2O4 Cathode Materials for Lithium-Ion Batter-

(56) References Cited

OTHER PUBLICATIONS ies", J. Electron. Mater.(Journal of Electronic Materials), Apr. 23, 2013, vol. 42, No. 6, pp. 1275-1281.
Counts.W et al., "Fluoride Model Systems: II, The Binary Systems $CaF_2$—$BeF_2$, $MgF_2$—$BeF_2$, and LiF—$MgF_2$", J. Am. Ceram. Soc. (Journal of the American Ceramic Society), 1953, vol. 36, No. 1, pp. 12-17.
Liu.A et al., "Synthesis of Mg and Mn Doped $LiCoO_2$ and Effects on High Voltage Cycling", J. Electrochem. Soc. (Journal of the Electrochemical Society), Jun. 2, 2017, vol. 164, No. 7, pp. A1655-A1664.
Tukamoto.H et al., "Electronic Conductivity of $LiCoO_2$ and Its Enhancement by Magnesium Doping", J. Electrochem. Soc. (Journal of the Electrochemical Society), Sep. 1, 1997, vol. 144, No. 9, pp. 3164-3168.
Ohzuku.T et al., "Solid-State Redox Reactions of $LiCoO_2$ (R-3m) for 4 Volt Secondary Lithium Cells", J. Electrochem. Soc. (Journal of the Electrochemical Society), Nov. 1, 1994, vol. 141, No. 11, pp. 2972-2977.
Amatucci.G et al., "$CoO_2$, The End Member of the $Li_xCoO_2$ Solid Solution", J. Electrochem. Soc. (Journal of the Electrochemical Society), Mar. 1, 1996, vol. 143, No. 3, pp. 1114-1123.
Wang.Z et al., "Structural and electrochemical characterizations of surface-modified $LiCoO_2$ cathode materials for Li-ion batteries", Solid State Ionics, Jun. 2, 2002, vol. 148, No. 3-4, pp. 335-342, Elsevier.
Zou.M et al., "Synthesis and Electrochemical Performance of High Voltage Cycling $LiM0.05Co0.95O_2$ as Cathode Material for Lithium Rechargeable Cells", Electrochemical and Solid-State Letters, 2004, vol. 7, No. 7, pp. A176-A179.
Wang.Z et al., "Improving the cycling stability of $LiCoO_2$ at 4.5 V through co-modification by Mg doping and zirconium oxyfluoride coating", Ceramics Internationa, 2015, vol. 41, No. 1, pp. 469-474.
Cho.Y et al., "High Performance $LiCoO_2$ Cathode Materials at 60° C. for Lithium Secondary Batteries Prepared by the Facile Nanoscale Dry-Coating Method", J. Electrochem. Soc. (Journal of the Electrochemical Society), 2010, vol. 157, No. 5, pp. A617-A624.
Wang.Z et al., "Mg doping and zirconium oxyfluoride coating co-modification to enhance the high-voltage performance of $LiCoO_2$ for lithium ion battery", Journal of Alloys and Compounds, Feb. 5, 2015, vol. 621, pp. 212-219.
Mladenov.M et al., "Effect of Mg doping and MgO-surface modification on the cycling stability of $LiCoO_2$ electrodes.", Electrochemistry Communications, Aug. 1, 2001, vol. 3, No. 8, pp. 410-416.
Kweon.H et al., "Effects of metal oxide coatings on the thermal stability and electrical performance of $LiCoCO_2$ in a Li-ion cell", Journal of Power Sources, Feb. 16, 2004, vol. 126, pp. 156-162, Elsevier.
Shim.J et al., "Effects of MgO Coating on the Structural and Electrochemical Characteristics of $LiCoO_2$ as Cathode Materials for Lithium Ion Battery", Chem. Mater. (Chemistry of Materials), Mar. 24, 2014, vol. 26, No. 8, pp. 2537-2543.
Zhao.H et al., "Improvement of electrochemical stability of $LiCoO_2$ cathode by a nano-crystalline coating", Journal of Power Sources, May 20, 2004, vol. 132, pp. 195-200, Elsevier.
Iriyama.Y et al., "Effects of surface modification by MgO on interfacial reactions of lithium cobalt oxide thin film electrode", Journal of Power Sources, Oct. 5, 2004, vol. 137, pp. 111-116, Elsevier.
Shim.J et al., "Effects of MgO Coating on the Structural and Electrochemical Characteristics of $LiCoO_2$ as Cathode Materials for Lithium Ion Battery", Chem. Mater. (Chemistry of Materials), [e.g. ), Suppor] Supporting Information, Mar. 24, 2014, vol. 26, No. 8, pp. 31-33.
Orikasa.Y et al., "Origin of Surface Coating Effect for MgO on $LiCoO_2$ to Improve the Interfacial Reaction between Electrode and Electrolyte", Adv. Mater.Interfaces (Advanced Materials Interfaces), Aug. 28, 2014, vol. 1, No. 9, pp. 1400195-1-1400195-8.
Yamamoto.K et al., "Stabilization of the Electronic Structure at the Cathode/Electrolyte Interface via MgO Ultra-thin Layer during Lithium-ions Insertion/Extraction", Electrochemistry, Oct. 5, 2014, vol. 82, No. 10, pp. 891-896.
Shim.J et al., "Synergistic effects of coating and doping for lithium ion battery cathode materials: synthesis and characterization of lithium titanate-coated $LiCoO_2$ with Mg doping", Electrochimica Acta, Dec. 20, 2015, vol. 186, pp. 201-208, Elsevier.
Yamamoto.K et al., "in situ Total-Reflection Fluorescence X-Ray Absorption Spectroscopic Study on Stability at $LiFePO_4$ / Electrolyte Interface", 224th ECS Meeting Abstract, Oct. 27, 2013, p. 923.
Wang.Z et al., "Electrochemical Evaluation and Structural Characterization of Commercial $LiCoO_2$ Surfaces Modified with MgO for Lithium-Ion Batteries", J. Electrochem. Soc. (Journal of the Electrochemical Society), Mar. 4, 2002, vol. 149, No. 4, pp. A466-A471.
Lee.Y et al., "Phase Transition of Bare and Coated $Li_xCoO_2$ (x=0.4 and 0.24) at 300° C.", J. Electrochem. Soc. (Journal of the Electrochemical Society), Jul. 28, 2005, vol. 152, No. 9, pp. A1824-A1827.
Geder.J et al., "Impact of active material surface area on thermal stability of $LiCoO_2$ cathode", Journal of Power Sources, Jul. 1, 2014, vol. 257, pp. 286-292, Elsevier.
Benecke.M et al., "Effect of LiF on Hot-Pressing of MgO", J. Am. Ceram. Soc. (Journal of the American Ceramic Society), Jul. 1, 1967, vol. 50, No. 7, pp. 365-368.
Hart.P et al., "Densification Mechanisms in Hot-Pressing of Magnesia with a Fugitive Liquid", J. Am. Ceram. Soc. (Journal of the American Ceramic Society), Feb. 1, 1970, vol. 53, No. 2, pp. 83-86.
Belsky.A et al., "New developments in the Inorganic Crystal Structure Database (ICSD): Accessibility in support of materials research and design.", Acta. Cryst (Acta Crystallographica Section B), Jun. 1, 2002, vol. B58, No. 3, pp. 364-369.
Alcantara.R et al., "SPES, 6Li MAS NMR, and $Ni^{3+}$ EPR evidence for the formation of $Co^{2+}$-containing spinel phases in $LiCoO_2$ cycled electrode materials", Journal of Electroanalytical Chemistry, Aug. 28, 1998, vol. 454, No. 1-2, pp. 173-181.
Shi.S et al., "Enhanced cycling stability of Li[Li 0.2Mn0.54Ni0.13Co0.13]O2 by surface modification of MgO with melting impregnation method", Electrochimica Acta, Nov. 1, 2012, vol. 88, pp. 671-679.
Antaya.M et al., "Preparation and Characterization of $LiCoO_2$ Thin Films by Laser Ablation Deposition", J. Electrochem. Soc. (Journal of the Electrochemical Society), Mar. 1, 1993, vol. 140, No. 3, pp. 575-578.
Koyama. Y et al., "Co K-edge XANES of $LiCoO_2$ and $CoO_2$ with a variety of structures by supercell density functional calculations with a core hole", Phys. Rev. B (Physical Review. B), Feb. 27, 2012, vol. 85, No. 7, pp. 075129-1-075129-7.
Quinlan.R et al., "XPS Investigation of the Electrolyte Induced Stabilization of $LiCoO_2$ and "$AlPO_4$"-Coated $LiCoO_2$ Composite Electrodes", J. Electrochem. Soc. (Journal of the Electrochemical Society), Dec. 3, 2015, vol. 163, No. 2, pp. A300-A308.
Cho.J et al., "Comparison of $Al_2O_3$- and $AlPO_4$-coated $LiCoO_2$ cathode materials for a Li-ion cell", Journal of Power Sources, 2005, vol. 146, pp. 58-64, Elsevier.
Jin.Y et al., "Electrochemical Characterizations of Commercial $LiCoO_2$ Powders with Surface Modified by $Li_3PO_4$ Nanoparticles", Electrochemical and Solid-State Letters, Apr. 3, 2006, vol. 9, No. 6, pp. A273-A276.
Hong.W et al., "Modification of $LiCoO_2$ by Surface Coating with $MgO/TiO_2/SiO_2$ for High-Performance Lithium-Ion Battery", Electrochemical and Solid-State Letters, Dec. 20, 2005, vol. 9, No. 2, pp. A82-A85.
Eom.J et al., "$M_3(PO_4)_2$-Nanoparticle-Coated $LiCoO_2$ vs $LiCo0.96M0.04O_2$(M=Mg and Zn) on Electrochemical and Storage Characteristics", J. Electrochem. Soc. (Journal of the Electrochemical Society), Jan. 8, 2008, vol. 155, No. 3, pp. A201-A205.
Kim.Y et al., "Suppression of Cobalt Dissolution from the $LiCoO_2$ Cathodes with Various Metal-Oxide Coatings", J. Electrochem. Soc. (Journal of the Electrochemical Society), 2003, vol. 150, No. 12, pp. A1723-A1725.

(56) References Cited

OTHER PUBLICATIONS

Fang.T et al., "Effect of calcination temperature on the electrochemical behavior of ZnO-coated LiCoO2 cathode", Surface & Coatings Technology, Apr. 19, 2006, vol. 201, No. 3-4, pp. 1886-1893, Elsevier.

Park.S et al., "Novel Surface Modification Technique to Improve Electrochemical Performance of LiCoO2 at High Voltage", Electrochemical and Solid-State Letters, Apr. 21, 2005, vol. 8, No. 6, pp. A299-A302.

Jo.C et al., "An effective method to reduce residual lithium compounds on Ni-rich Li[Ni0.6Co0.2Mn0.2]O2 active material using a phosphoric acid derived Li3PO4 nanolayer", Nano Research, Dec. 4, 2014, vol. 8, No. 5, pp. 1464-1479, Springer.

Tebbe.J et al., "Mechanisms of LiCoO2 Cathode Degradation by Reaction with HF and Protection by Thin Oxide Coatings", ACS Applied Materials & Interfaces, Oct. 12, 2015, vol. 7, No. 43, pp. 24265-24278.

Bensalah.N et al., "Review on Synthesis, Characterizations, and Electrochemical Properties of Cathode Materials for Lithium Ion Batteries", Journal of Material Science & Engineering, 2016, vol. 5, No. 4, pp. 1000258-1-1000258-21.

Lu.Y et al., "Recent progress on lithium-ion batteries with high electrochemical performance", Science China Chemistry, Feb. 25, 2019, vol. 62, No. 5, pp. 533-548.

Xiao.B, "Surface Modifification of Electrode Materials for Lithium-Ion Batteries", Graduate Program in Mechanical and Materials Engineering, 2006, pp. 1-235.

Ohnishi.M et al., "Investigation of the surface degradation of LiCoO2 particles in the cathode materials of Li-ion batteries using FIB-TOF-SIMS", Journal of Surface Analysis, 2013, vol. 20, No. 2, pp. 99-110.

Iwaya.K et al., "Impact of Lithium-Ion Ordering on Surface Electronic States of LixCoO2", Phys. Rev. Lett. (Physical Review Letters), Sep. 20, 2013, vol. 111, No. 12, pp. 126104-1-126104-5.

Zou.M et al., "Synthesis of High-Voltage (4.5 V) Cycling Doped LiCoO2 for Use in Lithium Rechargeable Cells", Chem. Mater. (Chemistry of Materials), Dec. 16, 2003, vol. 15, No. 25, pp. 4699-4702.

Schipper.F et al., "Study of Cathode Materials for Lithium-Ion Batteries: Recent Progress and New Challenges", Inorganics, Apr. 28, 2017, vol. 5, No. 2, pp. 1-29.

Xia.H et al., "Phase Transitions and High-Voltage Electrochemical Behavior of LiCoO2 Thin Films Grown by Pulsed Laser Deposition", J. Electrochem. Soc. (Journal of the Electrochemical Society), 2007, vol. 154, No. 4, pp. A337-A342.

Sun.Y et al., "Role of AlF3 Coating on LiCoO2 Particles during Cycling to Cutoff Voltage above 4.5 V", J. Electrochem. Soc. (Journal of the Electrochemical Society), 2009, vol. 156, No. 12, pp. A1005-A1010.

Araki.K et al., "Electrochemical properties of LiNi1/3Co1/3Mn1/3O2 cathode material modified by coating with Al2O3 nanoparticles", Journal of Power Sources, 2014, vol. 269, pp. 236-243.

Kim.H et al., "Capacity fading behavior of Ni-rich layered cathode materials in Li-ion full cells", Journal of Electroanalytical Chemistry, 2016, vol. 782, pp. 168-173.

Lin.F et al., "Surface reconstruction and chemical evolution of stoichiometric layered cathode materials for lithium-ion batteries", Nature Communications, Mar. 27, 2014, vol. 5, pp. 3529-1-3529-9.

Yano.A et al., "Surface Structure and High-Voltage Charge/Discharge Characteristics of Al-Oxide Coated LiNi1/3Co1/3Mn1/3O2 Cathodes", J. Electrochem. Soc. (Journal of the Electrochemical Society), 2015, vol. 162, No. 2, pp. A3137-A3144.

Yano.A et al., "Surface Structure and High-Voltage Charging/Discharging Performance of Low-Content Zr-Oxide-Coated LiNi1/3Co1/3Mn1/3O2", J. Electrochem. Soc. (Journal of the Electrochemical Society), 2016, vol. 163, No. 2, pp. A75-A82.

Exhibit 1032 of IPR2023-01016, portions of JP-2015-201432A and Full translation.

Exhibit 1028 of IPR2023-01349, Full translation of JP-2015-201432A.

Appendix C of EPR 90/019,447, portions of JP-2015-201432A and Full translation.

Exhibit 1041 of EPR 90/019,535, JP-2015-201432A and Full translation.

Appendix LL of EPR 90/019,447, portions of JP-2012-074366A and Full translation.

* cited by examiner

FIG. 13A
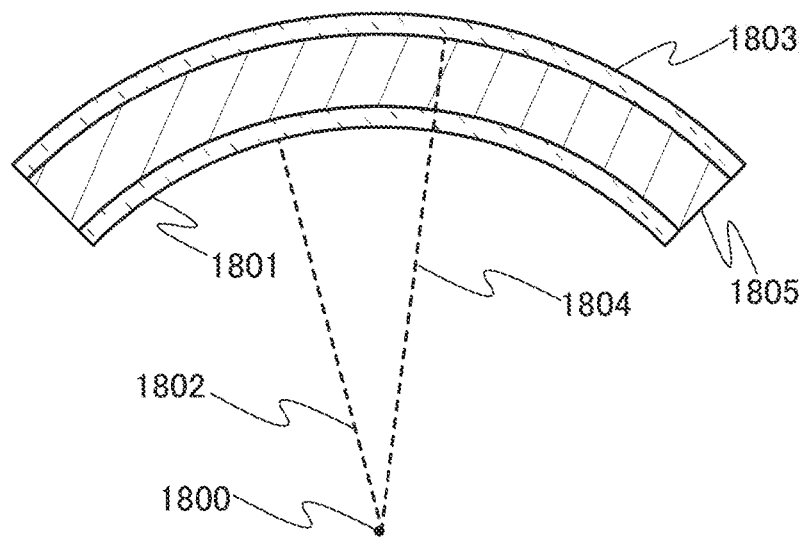
FIG. 13B
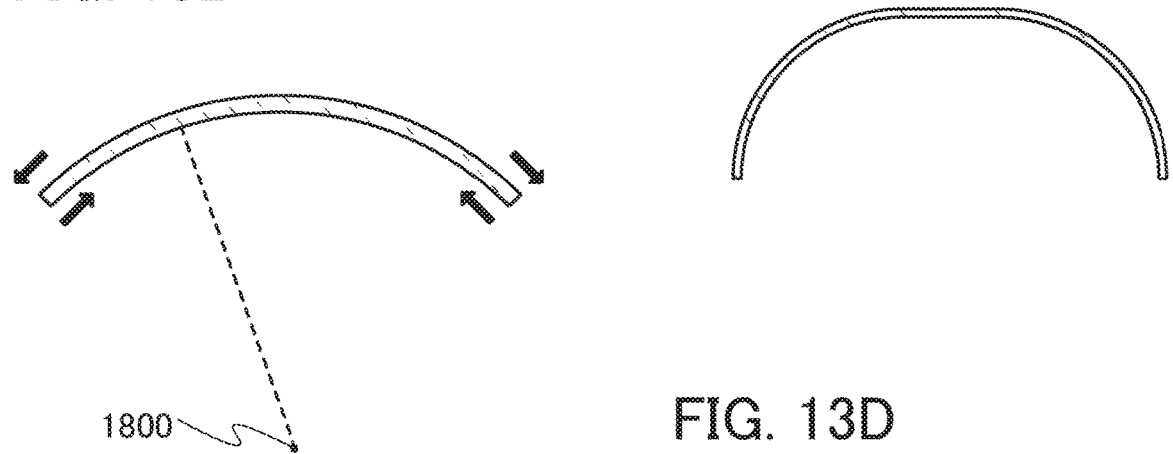
FIG. 13C
FIG. 13D
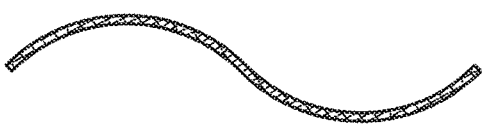

FIG. 20A
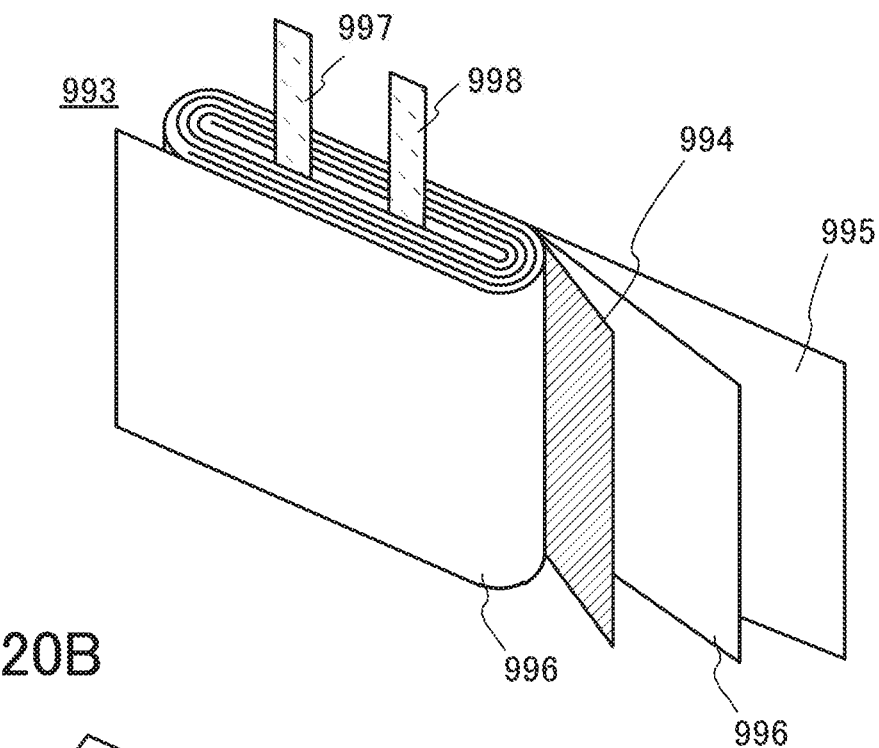
FIG. 20B
FIG. 20C
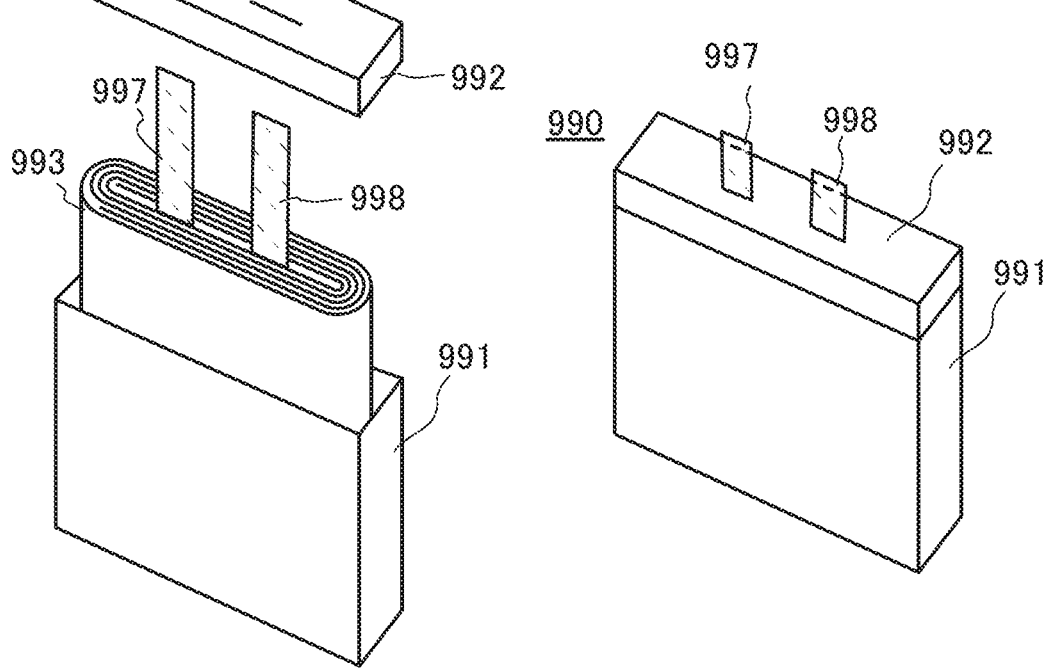

FIG. 22A-1
FIG. 22A-2
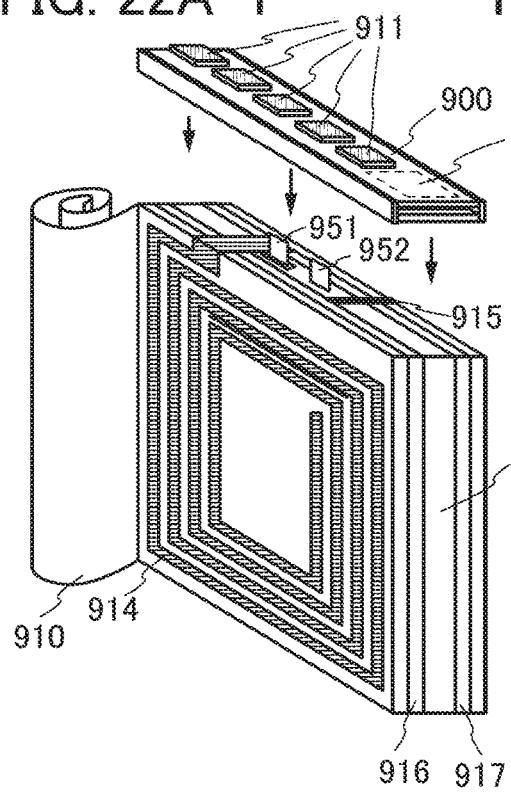
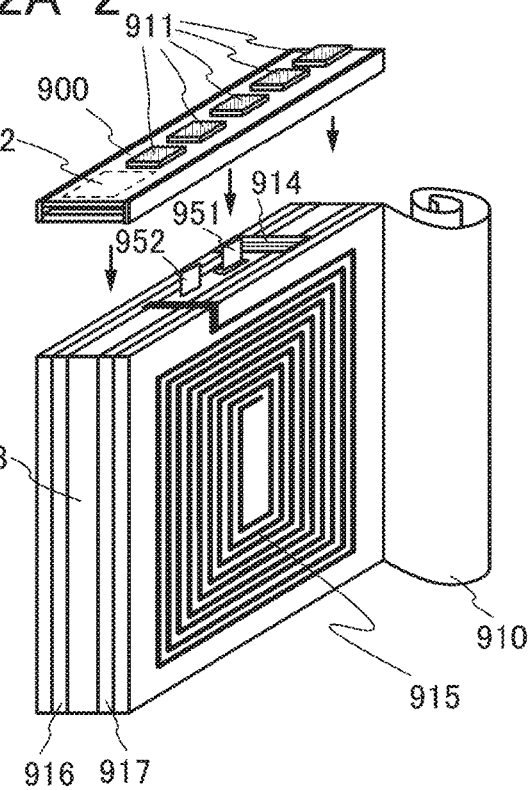
FIG. 22B-1
FIG. 22B-2
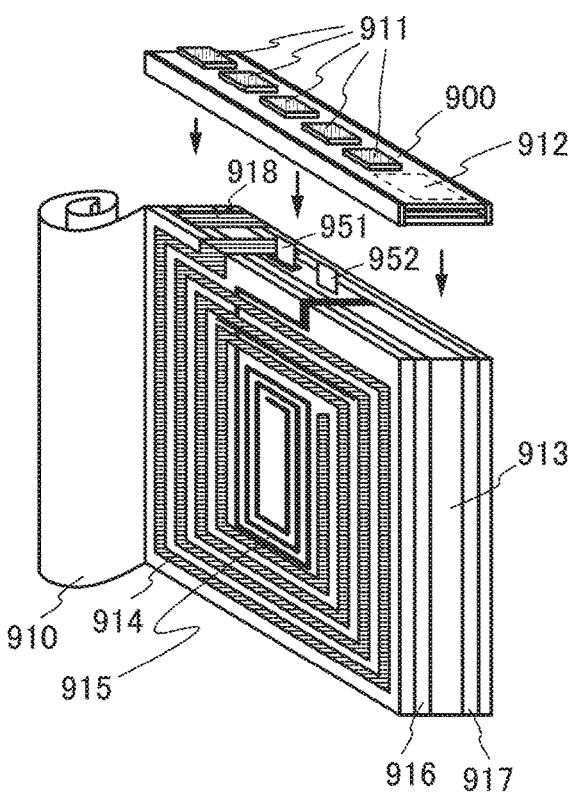
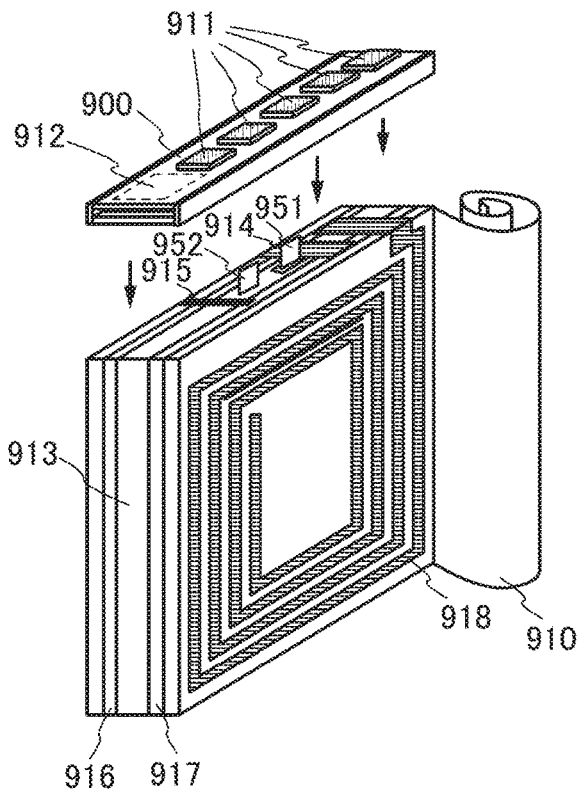

FIG. 24A  FIG. 24B  FIG. 24C
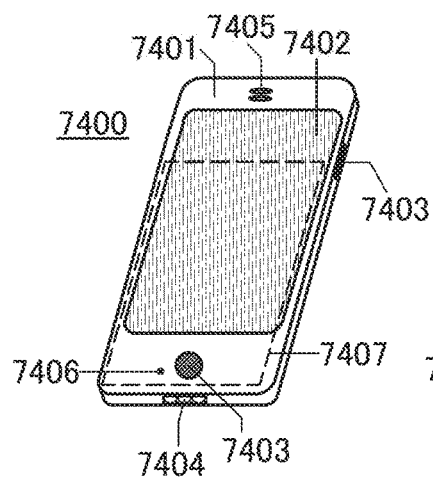
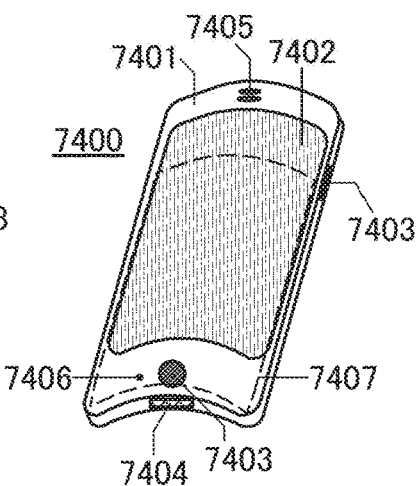
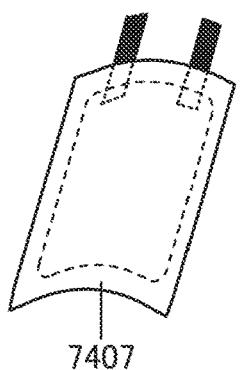
FIG. 24D  FIG. 24E
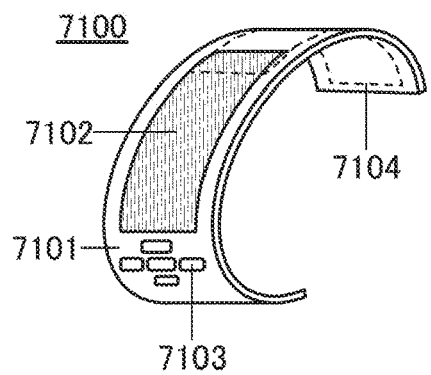
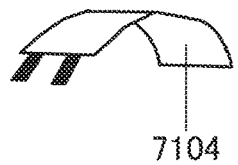
FIG. 24F
FIG. 24G
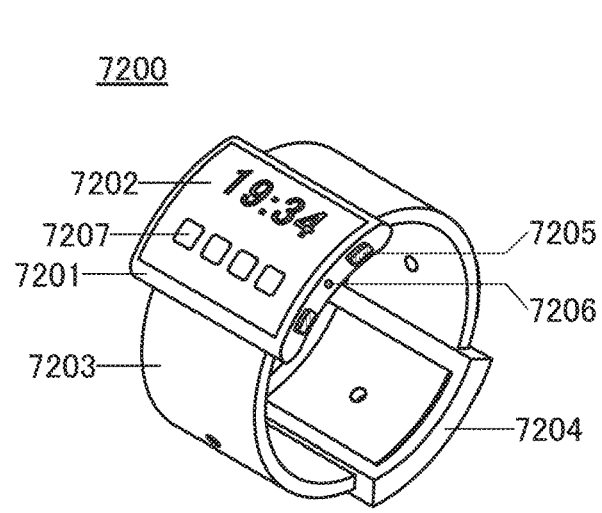
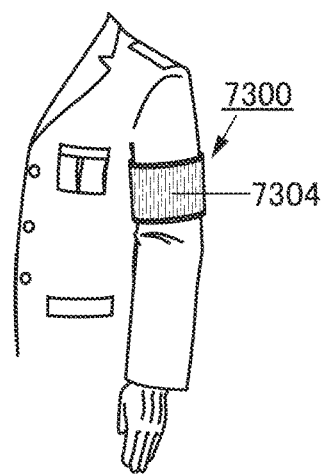

ELECTRODE AND POWER STORAGE DEVICE COMPRISING GRAPHENE COMPOUND

BACKGROUND OF THE INVENTION

1. Field of the Invention

The present invention relates to an object, a method, or a manufacturing method. The present invention relates to a process, a machine, manufacture, or a composition of matter. In particular, one embodiment of the present invention relates to a power storage device, a storage battery, an electrode, a positive electrode, a semiconductor device, a display device, a light-emitting device, a memory device, a driving method thereof, or a manufacturing method thereof. In particular, one embodiment of the present invention relates to an electrode and a manufacturing method thereof.

Note that a power storage device in this specification refers to every element and/or device having a function of storing electric power.

2. Description of the Related Art

In recent years, a variety of power storage devices, for example, storage batteries such as lithium-ion batteries, lithium-ion capacitors, and air cells, have been actively developed. In particular, demand for lithium-ion batteries with high output and high energy density has rapidly grown with the development of the semiconductor industry, for electronic devices, for example, portable information terminals such as cell phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion batteries are essential as rechargeable energy supply sources for today's information society.

Charge and discharge of the lithium-ion battery cause elution of an element contained in an active material into an electrolyte solution in some cases. This elution might result in a reduction in the capacity of a power storage device. Patent Document 1 discloses elution of manganese ion in an electrolyte solution.

REFERENCE

Patent Document

[Patent Document 1] Japanese Published Patent Application No. 2010-192428

SUMMARY OF THE INVENTION

An object of one embodiment of the present invention is to provide a novel electrode. Another object of one embodiment of the present invention is to provide a novel power storage device.

Another object of one embodiment of the present invention is to provide an electrode with less deterioration. Another object of one embodiment of the present invention is to provide an electrode with a high capacity. Another object of one embodiment of the present invention is to provide a long-life power storage device. Another object of one embodiment of the present invention is to provide a power storage device with less deterioration. Another object of one embodiment of the present invention is to provide a power storage device with high energy density. Another object of one embodiment of the present invention is to provide a highly reliable power storage device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is an electrode including an active material and a graphene compound. The graphene compound includes a graphene layer and a substituted or unsubstituted chain group. The graphene layer is bonded to the chain group through a substituent containing silicon. The active material is in particle form. The graphene compound includes a region in contact with the active material. The active material includes an element A and an element M. The element A is one or more elements selected from elements belonging to Group 1 and elements belonging to Group 2. The element M is one or more elements selected from manganese and nickel. The chain group includes one or more groups selected from a carbonyl group, an ester group, a carboxyl group, an ether group, and an epoxy group.

Another embodiment of the present invention is an electrode including an active material and a graphene compound. The active material is in particle form. The graphene compound includes a region in contact with a surface of the active material. The active material includes an element A and an element M. The element A is one or more elements selected from elements belonging to Group 1 and elements belonging to Group 2. The element M is one or more elements selected from manganese and nickel. The graphene compound has a structure represented by a following formula (G1).

[Chemical Formula 1]

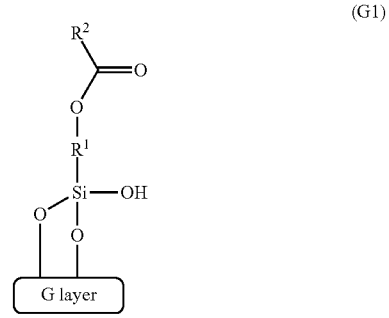

(G1)

(In the general formula (G1), G layer represents a graphene layer, $R^1$ represents a substituted or unsubstituted alkylene group, and $R^2$ represents hydrogen or a substituted or unsubstituted alkyl group.)

Another embodiment of the present invention is an electrode including an active material and a graphene compound. The active material is in particle form. The graphene compound includes a region in contact with a surface of the active material. The active material includes an element A and an element M. The element A is one or more elements selected from elements belonging to Group 1 and elements belonging to Group 2. The element M is one or more elements selected from manganese and nickel. The graphene compound has a structure represented by a following formula (G2).

[Chemical Formula 2]

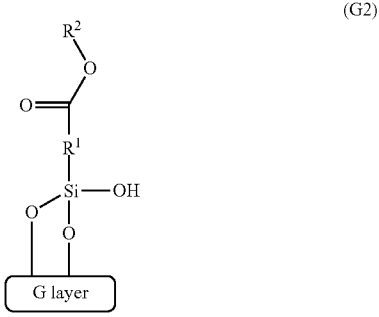

(In the general formula (G2), G layer represents a graphene layer, $R^1$ represents a substituted or unsubstituted alkylene group, and $R^2$ represents hydrogen or a substituted or unsubstituted alkyl group.)

Another embodiment of the present invention is an electrode including an active material and a graphene compound. The active material is in particle form. The graphene compound includes a region in contact with a surface of the active material. The active material includes an element A and an element M. The element A is one or more elements selected from elements belonging to Group 1 and elements belonging to Group 2. The element M is one or more elements selected from manganese and nickel. The graphene compound has a structure represented by a following formula (G3).

[Chemical Formula 3]

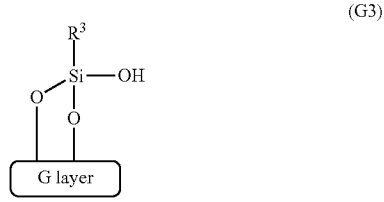

(In the general formula (G3), G layer represents a graphene layer, and $R^3$ represents a substituted or unsubstituted chain group having at least two ether bonds.)

In any of the above embodiments, the graphene compound preferably has a function of trapping the element M.

Another embodiment of the present invention is a power storage device including any one of the above electrodes, an exterior, an electrolyte solution, a separator, and a negative electrode.

One embodiment of the present invention can provide a novel electrode. Another embodiment of the present invention can provide a novel power storage device.

Another embodiment of the present invention can provide an electrode with less deterioration. Another embodiment of the present invention can provide an electrode with a high capacity. Another embodiment of the present invention can provide a long-life power storage device. Another embodiment of the present invention can provide a power storage device with less deterioration. Another embodiment of the present invention can provide a power storage device with high energy density. Another embodiment of the present invention can provide a highly reliable power storage device.

Note that the description of these effects does not preclude the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

In the accompanying drawings:

FIGS. 13A to 13D illustrate a radius of curvature of a film;

FIGS. 20A to 20C illustrate an example of a storage battery;

FIGS. 22A-1, 22A-2, 22B-1, and 22B-2 illustrate examples of power storage systems;

FIGS. 24A to 24G illustrate examples of electronic devices;

DETAILED DESCRIPTION OF THE INVENTION

Figure 1A:
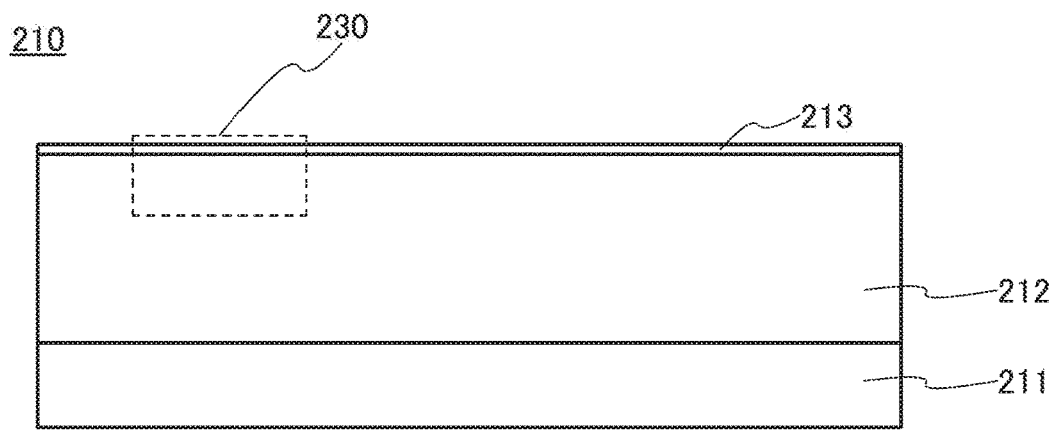
FIGS. 1A to 1C illustrate a cross section of an electrode of one embodiment of the present invention and part of the cross section of the electrode.

Embodiments and an example of the present invention will be described in detail below with reference to the accompanying drawings. However, the present invention is not limited to the description of the embodiments and example and it is easily understood by those skilled in the art that the mode and details can be changed variously. Thus, the present invention should not be construed as being limited to the description in the following embodiments and example.

Note that in drawings used in this specification, the sizes, thicknesses, and the like of components such as films, layers, substrates, regions are exaggerated for simplicity in some cases. Therefore, the sizes of the components are not limited to the sizes in the drawings and relative sizes between the components.

Note that ordinal numbers such as "first" and "second" in this specification and the like are used for convenience and do not denote the order of steps, the stacking order of layers, and the like. Therefore, for example, description can be made even when "first" is replaced with "second" or "third", as appropriate. In addition, the ordinal numbers in this specification and the like are not necessarily the same as those which specify one embodiment of the present invention.

Note that in the structures of the present invention described in this specification and the like, the same portions or portions having similar functions in different drawings are denoted by the same reference numerals, and description of such portions is not repeated. Further, the same hatching pattern is applied to portions having similar functions, and the portions are not especially denoted by reference numerals in some cases.

Note that in this specification and the like, a positive electrode and a negative electrode for a power storage device may be collectively referred to as an electrode; in this case, the electrode refers to at least one of the positive electrode and the negative electrode for the power storage device.

Here, a charge rate and a discharge rate of a power storage device will be described. For example, in the case of charging a secondary battery with a certain capacity X [Ah] at a constant current, a charge rate of 1 C means the current value I [A] with which charging is terminated in exactly 1 h, and a charge rate of 0.2 C means I/5 [A] (i.e., the current value with which charging is terminated in exactly 5 h). Similarly, a discharge rate of 1 C means the current value I [A] with which discharging is ended in exactly 1 h, and a discharge rate of 0.2 C means I/5 [A] (i.e., the current value with which discharging is ended in exactly 5 h).

Embodiment 1

A power storage device of one embodiment of the present invention includes a layer containing a graphene compound, a positive electrode, and a negative electrode. The positive electrode and the negative electrode each contain an active material. When the power storage device includes the layer containing a graphene compound, for example, a metal released from the active material can be trapped in the layer. The layer is preferably provided in the vicinity of the active material so as to be, for example, partly in contact with the active material.

Structure Example

FIG. 1A illustrates an example of a cross section of an electrode of one embodiment of the present invention. An electrode 210 includes an active material layer 212 and a layer 213 over the active material layer 212.

The active material layer 212 contains an active material 221. The active material 221 contains an element M. The element M is preferably one or more elements selected from manganese, nickel, cobalt, chromium, aluminum, iron, molybdenum, zinc, indium, gallium, copper, titanium, niobium, and vanadium, and particularly preferably manganese or nickel.

The active material 221 contains, in addition to the element M, an element A serving as a carrier ion. The element A is preferably one or more elements selected from elements belonging to Group 1 and elements belonging to Group 2. Examples of the elements belonging to Group 1 include alkali metals such as lithium, sodium, and potassium. Examples of the elements belonging to Group 2 include calcium, beryllium, and magnesium.

The active material 221 may be a positive electrode active material or a negative electrode active material.

The layer 213 contains a graphene compound. The graphene compound contains a graphene layer and a substituted or unsubstituted chain group. The graphene layer is bonded to the chain group through a substituent containing silicon, for example.

Here, the graphene compound contains a functional group having a high polarity as the chain group, for example, whereby the function of trapping a cation 252 may be improved. The chain group is preferably one or more chain groups selected from a carbonyl group, an ester group, a carboxyl group, an ether group, an epoxy group, and the like, and particularly preferably an ester group or a carboxyl group.

Here, the graphene compound having low electron conductivity serves as a separator in some cases. When the graphene compound contains the chain group and is in contact with the negative electrode, reduction at the potential of the negative electrode is suppressed in some cases.

The layer 213 is a graphene compound sheet, for example.

The length in the longitudinal direction or the length of the major axis in a plane in each of graphene and multilayer graphene that form the graphene compound is greater than or equal to 50 nm and less than or equal to 100 μm or greater than or equal to 800 nm and less than or equal to 50 μm. The details of the graphene compound, the graphene compound sheet, and graphene and multilayer graphene will be described later. Note that graphene and multilayer graphene are preferably small in some cases.

Furthermore, the electrode 210 may include a current collector 211, and the active material layer 212 is preferably provided over the current collector 211.

The layer 213 is provided over the active material layer 212. The layer 213 has a region in contact with the active material 221 contained in the active material layer 212.

Figure 1B:
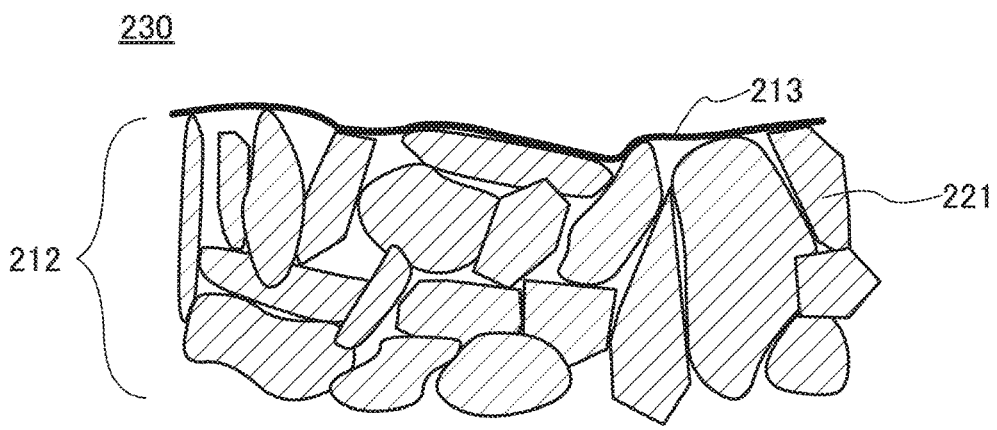

FIG. 1B is an enlarged view of a region 230 illustrated in FIG. 1A. In an example shown in FIG. 1B, as the active materials 221, a plurality of particles are in contact with the layer 213. In other words, the layer 213 has a plurality of regions in contact with the active materials 221.

Figure 1C:
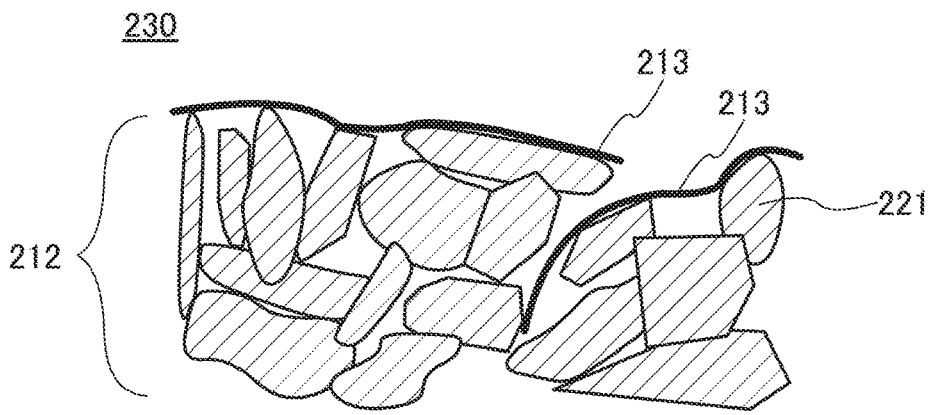

In FIG. 1B, the layer 213 is expressed as a continuous layer or sheet; however, the layer 213 may be formed of a plurality of sheets as illustrated in FIG. 1C. In addition, the layer 213 may be inserted into the active material layer 212.

Figure 2:
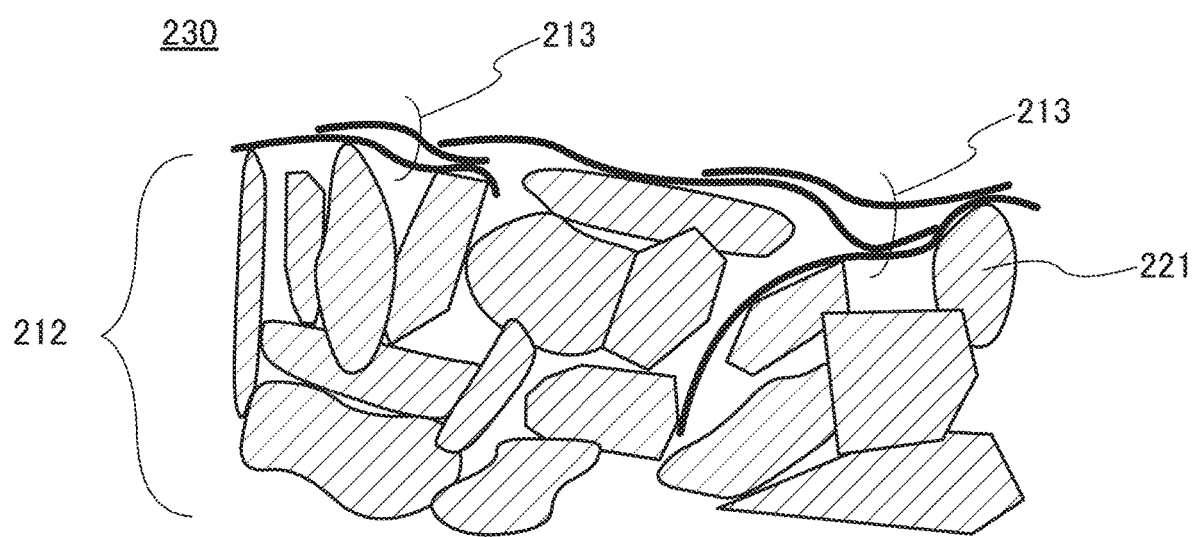
FIG. 2 illustrates part of an electrode of one embodiment of the present invention.

FIG. 2 shows an example where a plurality of sheets overlap with each other as the layer 213. The sheets overlapping with each other are preferably partly in contact with each other.

<Operation of Power Storage Device>

Figure 3A:
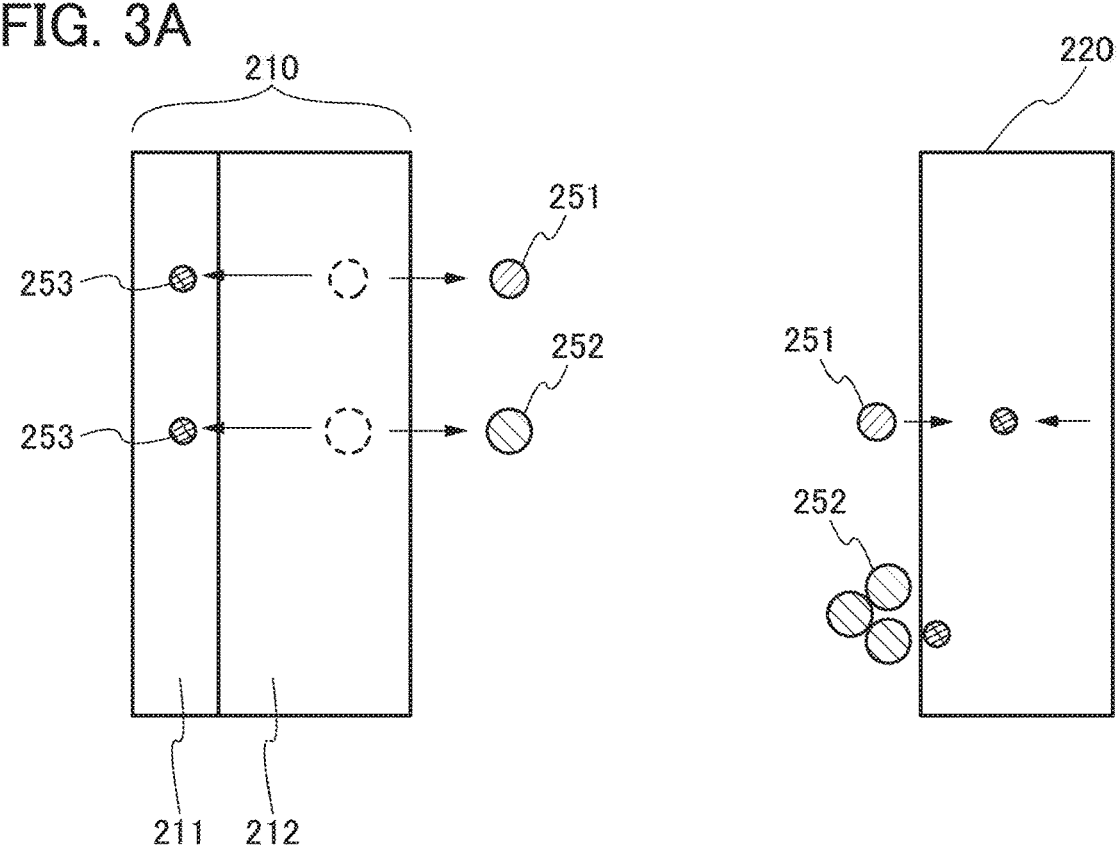
FIGS. 3A and 3B each illustrate an operation of a power storage device.
Figure 3B:
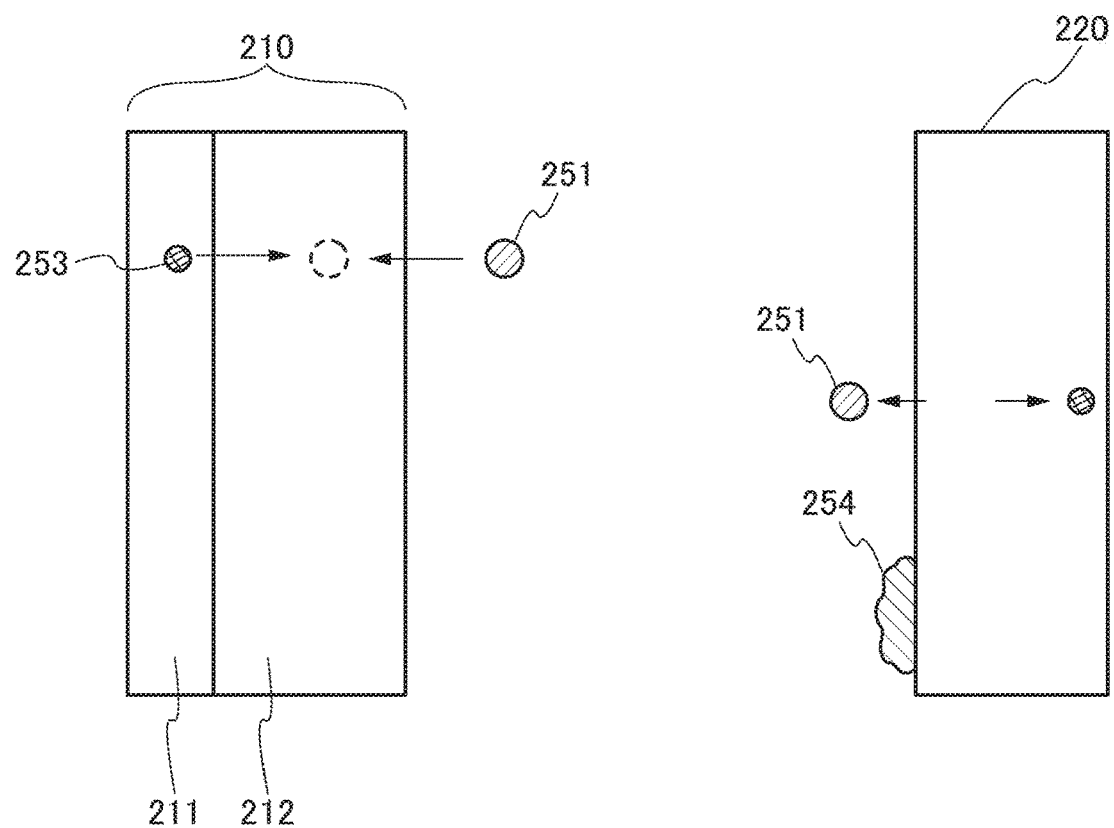

Next, the operation of the power storage device of one embodiment of the present invention is described with reference to FIGS. 3A and 3B and FIG. 4. Here, the electrode 210 serves as a positive electrode and the active material 221 serves as a positive electrode active material.

The power storage device of one embodiment of the present invention includes the electrode 210 serving as a positive electrode and an electrode 220 serving as a negative electrode. An ion in the element A is referred to as a cation 251 and an ion in the element M is referred to as a cation 252.

First, charging is described with reference to FIG. 3A. In charging, the element A is cationized, and the cation 251 and an electron 253 are released from the active material 221 contained in the active material layer 212. The cation 251 reaches the electrode 220 serving as a negative electrode and is reduced. Note that in FIGS. 3A and 3B and FIG. 4, the active material 221 is not illustrated.

Furthermore, in charging, the cation 252 is released from the active material 221 in some cases. The release of the cation 252 is also referred to as elution of the element M. The cation 252 reaches the electrode 220 and is reduced. Here, in the case where the cation 252 does not easily react with the negative electrode active material, a precipitate 254 of the element M may be formed in a reduction reaction. Alternatively, in the case where the reaction between the cation 252 and the negative electrode active material is not reversible, the element M is not easily ionized in discharging.

When the reaction potential of the negative electrode is lower than the potential which causes reductive decomposition, a film is deposited by the decomposition of the electrolyte solution. Such a film is generated by an irreversible reaction, resulting in a decrease in capacity in some cases. In charging, when the precipitate 254 of the element M is formed on the surface of the electrode 220, the film is easily deposited over the precipitate 254 in some cases; thus, the capacity is significantly decreased.

In addition, when the cation 252 is released from the active material 221 (i.e., the element M is eluted) in charging, the crystal structure of the active material 221 is changed and becomes unstable in some cases.

Next, discharging is described with reference to FIG. 3B. In discharging, the cation 251 is released from the electrode 220, reaches the electrode 210, and is reduced.

Note that the ionic radius of the cation 252 is larger than that of the cation 251. Furthermore, the release of the cation 252 might cause a change in the crystal structure of the active material 221. Thus, it is difficult for the cation 252 that has been released from the active material 221 in charging to enter the active material 221 again in discharging.

Figure 4:
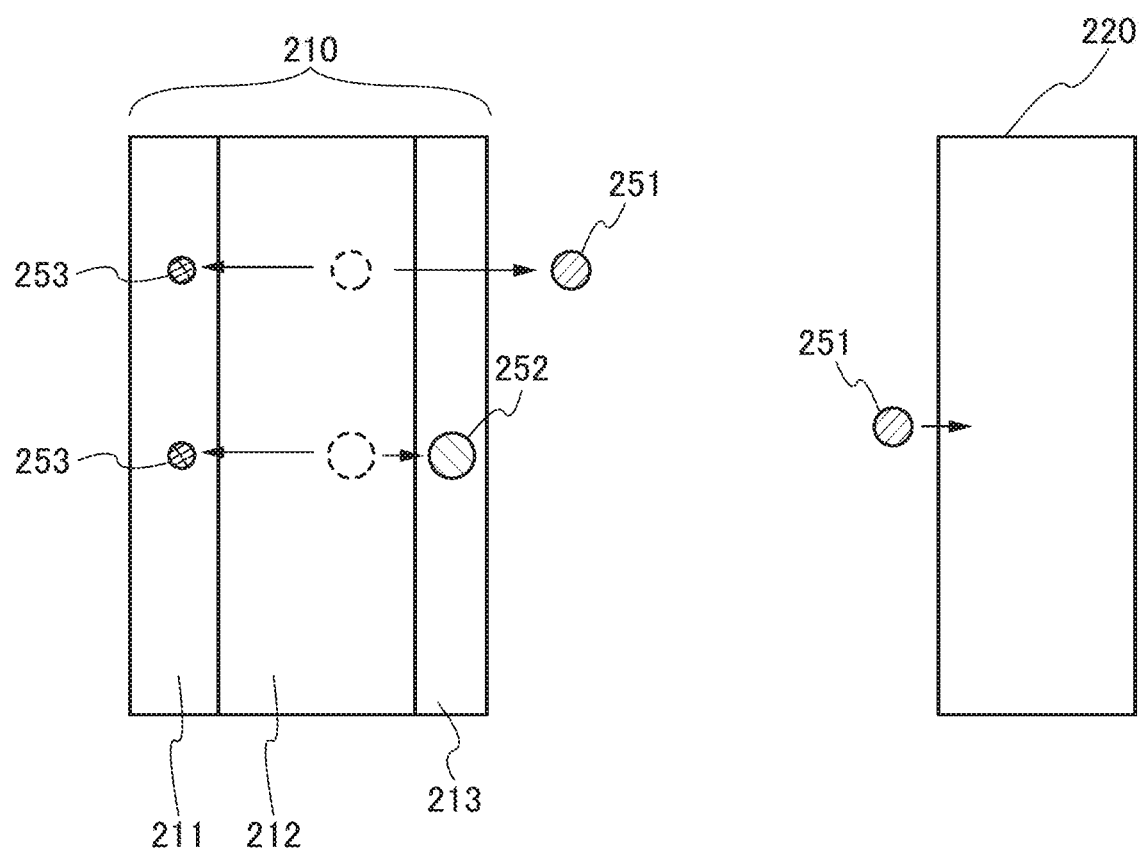
FIG. 4 illustrates an operation of a power storage device.

FIG. 4 shows an example where the electrode 210 includes the layer 213. The layer 213 has a function of trapping the cation 252, for example.

In the case where the element M is cationized and the cation 252 and the electron 253 are generated in charging, since the layer 213, which has a function of trapping the cation 252, can inhibit the cation 252 from reaching the electrode 220. In contrast, the cation 251 preferably reaches the electrode 220 through the layer 213.

When the cation 252 exists in an electrolyte solution and the concentration comes to equilibrium, the elution (cationization) of the element M is suppressed. The cation 252 is trapped by the layer 213, whereby in the active material layer 212, the concentration of the cation 252 in the vicinity of an interface between the active material layer 212 and the layer 213 is increased. Since the concentration of the cation 252 is high, the release of the cation 252 at the surface of the active material layer 212 can be suppressed. That is, the provision of the layer 213 leads to suppression of the elution of the element M.

Furthermore, the graphene compound of one embodiment of the present invention containing the chain group has low electrical conductivity in some cases. The layer 213 is preferably provided also in the case where the element A is deposited on the surface of the electrode 220 because the layer 213 might inhibit a short circuit between the element A and the active material 221 or the current collector 211 included in the electrode 210.

After the charging, for example, the layer 213 contains the element M.

<Method for Fabricating Electrode>

A method for fabricating the electrode of one embodiment of the present invention will be described.

The electrode 210 contains an active material and a graphene compound. The electrode 210 preferably contains a positive electrode active material as the active material.

First, the active material layer 212 is formed. The active material layer 212 contains the active material. In addition, the active material layer 212 preferably contains a binder and a conductive additive. The binder and the conductive additive are described in the following embodiment.

The active material, other components (here, the binder and the conductive additive), and a solvent are mixed to form slurry. The solvent used for formation of the slurry is preferably a polar solvent. Examples of the material of the polar solvent include water, methanol, ethanol, acetone, tetrahydrofuran (THF), dimethylformamide (DMF), N-methylpyrrolidone (NMP), dimethyl sulfoxide (DMSO), and a mixed solution of any two or more of the above.

Next, slurry is applied to a current collector. The current collector is described in the following embodiment.

Then, heat treatment is performed to volatilize the solvent of the slurry applied to the current collector. After that, pressing may be performed.

Through the above process, the active material layer 212 is formed over the current collector.

Next, the layer 213 is formed. First, graphene compounds are dispersed into the solvent. Examples of the material of the solvent include water, methanol, ethanol, acetone, tetrahydrofuran (THF), dimethylformamide (DMF), 1-methyl-2-pyrrolidone (NMP), dimethyl sulfoxide (DMSO), ethylene glycol, diethylene glycol, glycerin, and a mixed solution of any two or more of the above.

Then, the formed dispersion liquid is dropped on the active material layer 212. Alternatively, the active material layer 212 may be soaked into the dispersion liquid.

Then, heat treatment is performed to volatilize the solvent of the dispersion liquid. The treatment is performed under a reduced-pressure atmosphere, whereby the solvent is easily volatilized.

Through the above process, the layer 213 is formed over the active material layer 212. The graphene compound content in the layer 213 is, for example, greater than or equal to 0.2 mg/cm$^2$ and less than or equal to 10 mg/cm$^2$, or greater than or equal to 0.5 mg/cm$^2$ and less than or equal to 3 mg/cm$^2$.

<Positive Electrode Active Material>

As an example of the active material 221, a positive electrode active material containing the element M is described.

For the positive electrode active material, a material with a spinel crystal structure represented by the general formula of $LiM_2O_4$. Here, the element M is preferably a metal, for example, manganese. Alternatively, the element M may be two or more metals selected from a plurality of metals, for example, manganese and one or more metals selected from metals other than manganese. Examples of metals other than manganese include nickel, cobalt, aluminum, iron, and vanadium. For example, the element M preferably contains nickel as a metal other than manganese, in which case the discharge voltage might be improved and the energy density might be improved. Alternatively, a small amount of lithium nickelate (e.g., $LiNiO_2$ and $Li_xNi_{(1-x)}XO_2$) may be mixed into a lithium-containing material with a spinel crystal structure such as $LiM_2O_4$. Here, as the element X, cobalt, aluminum, or the like can be used.

Examples of positive electrode active materials are a composite oxide with a layered rock-salt crystal structure and a composite oxide with a spinel crystal structure. Alternatively, an example of a positive electrode active material is a polyanionic positive electrode material. Examples of polyanionic positive electrode materials are a material with an olivine crystal structure and a material with a NASICON structure.

As the positive electrode active material, various composite oxides can be used. For example, a compound such as $LiFeO_2$, $LiCoO_2$, $LiNiO_2$, $LiMn_2O_4$, $V_2O_5$, $Cr_2O_5$, or $MnO_2$ can be used.

An example of a material with a layered rock-salt crystal structure includes a composite oxide represented by $LiMO_2$. The element M is preferably one or more elements selected from cobalt and nickel. $LiCoO_2$ is preferable because it has high capacity, stability in the air, and thermal stability, for example. As the element M, one or more elements selected from aluminum and manganese may be included in addition to one or more elements selected from cobalt and nickel. For example, it is possible to use $LiCo_xMn_yNi_zO_w$ (x, y, and z are each ⅓ or a neighborhood thereof and w is 2 or a neighborhood thereof, for example).

The neighborhood is a value greater than 0.9 times and smaller than 1.1 times the predetermined value.

For example, as the positive electrode active material, a solid solution containing any of the composite oxides can be used. For example, a solid solution of $LiCo_{1/3}Mn_{1/3}Ni_{1/3}O_2$ and $Li_2MnO_3$ can be used as the positive electrode active material.

An example of a material with a spinel crystal structure includes a composite oxide represented by $LiM_2O_4$. It is preferable to contain manganese as the element M. For example, $LiMn_2O_4$ can be used. It is preferable to contain nickel in addition to manganese as the element M because the discharge voltage and the energy density of the secondary battery are improved in some cases. It is preferable to add a small amount of lithium nickel oxide ($LiNiO_2$ or $LiNi_{1-x}M_xO_2$ (M=Co, Al, or the like)) to a lithium-containing material with a spinel crystal structure which contains manganese, such as $LiMn_2O_4$, because the characteristics of the secondary battery can be improved.

The average diameter of primary particles of the positive electrode active material is preferably greater than or equal to 5 nm and less than or equal to 100 μm, further preferably greater than or equal to 50 nm and less than or equal to 50 μm, and still further preferably greater than or equal to 100 nm and less than or equal to 500 nm, for example. Furthermore, the specific surface area is preferably greater than or equal to 5 $m^2$/g and less than or equal to 15 $m^2$/g. Furthermore, the average diameter of secondary particles is preferably greater than or equal to 5 μm and less than or equal to 50 μm. Note that the average particle diameters can be measured with a particle diameter distribution analyzer or the like using a laser diffraction and scattering method or by observation with a scanning electron microscope (SEM) or a TEM. The specific surface area can be measured by a gas adsorption method.

A conductive material such as a carbon layer may be provided on the surface of the positive electrode active material. Providing a conductive material such as a carbon layer leads to an increase in the conductivity of an electrode. For example, the positive electrode active material can be coated with a carbon layer by mixing a carbohydrate such as glucose at the time of baking the positive electrode active material.

The polyanionic positive electrode material can contain oxygen, an element X, a metal A, and a metal M. The metal M is one or more elements selected from iron, manganese, cobalt, nickel, titanium, vanadium, and niobium, the metal A is one or more elements selected from lithium, sodium, and magnesium, and the element X is one or more elements selected from sulfur, phosphorus, molybdenum, tungsten, arsenic, and silicon.

Alternatively, a complex material ($LiMPO_4$ (general formula) (M is one or more of Fe(II), Mn(II), Co(II), and Ni(II))) can be used as the positive electrode active material. Typical examples of the general formula $LiMPO_4$ are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

$LiFePO_4$ is particularly preferable because it properly has properties necessary for the positive electrode active material, such as safety, stability, a high capacity density, and the existence of lithium ions which can be extracted in initial oxidation (in charging).

Alternatively, a complex material such as $Li_{(2-j)}MSiO_4$ (general formula) (M is one or more of Fe(II), Mn(II), Co(II), and Ni(II); 0≤j≤2) may be used as the positive electrode active material. Typical examples of the general formula $Li_{(2-j)}MSiO_4$ are lithium compounds such as $Li_{(2-j)}FeSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound represented by $A_xM_2(XO_4)_3$ (general formula) (A=Li, Na, or Mg, M=Fe, Mn, Ti, V, or Nb, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound represented by $Li_2MPO_4F$, $Li_2MP_2O_7$, or $Li_5MO_4$ (general formula) (M=Fe or Mn) can be used as the positive electrode active material.

Further alternatively, a polyanionic positive electrode material containing V can be used. Typical examples are α-$LiVOPO_4$, β-$LiVOPO_4$, α1-$LiVOPO_4$, $LiVPO_4F$, $LiVPO_4O$, $LiVP_2O_7$, $LiVOSO_4$, $Li_2VOSiO_4$, and $LiVMoO_6$.

Further alternatively, a perovskite fluoride such as $NaFeF_3$ and $FeF_3$, a metal chalcogenide (a sulfide, a selenide, or a telluride) such as $TiS_2$ and $MoS_2$, an oxide with an inverse spinel structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

Alternatively, a borate-based positive electrode material represented by LiMBO$_3$ (general formula) (M is Fe(II), Mn(II), or Co(II)) can be used as the positive electrode active material.

Another example of the positive electrode active material is a lithium-manganese composite oxide represented by a composition formula Li$_a$Mn$_b$M$_c$O$_d$. Here, the element M is preferably a metal element other than lithium and manganese, or silicon or phosphorus, further preferably nickel. Furthermore, in the case where the whole particle of a lithium-manganese composite oxide is measured, it is preferable to satisfy the following at the time of discharging: 0<a/(b+c)<2; c>0; and 0.26≤(b+c)/d<0.5. To achieve a high capacity, the lithium-manganese composite oxide preferably includes a region where the surface portion and the middle portion are different in the crystal structure, the crystal orientation, or the oxygen content. In order that such a lithium-manganese composite oxide can be obtained, the composition formula is preferably 1.6≤a≤1.848; 0.19≤c/b≤0.935; and 2.5≤d≤3. Furthermore, it is particularly preferable to use a lithium-manganese composite oxide represented by a composition formula Li$_{1.68}$Mn$_{0.8062}$Ni$_{0.318}$O$_3$. In this specification and the like, a lithium-manganese composite oxide represented by a composition formula Li$_{1.68}$Mn$_{0.8062}$Ni$_{0.318}$O$_3$ refers to that formed at a ratio (molar ratio) of the amounts of raw materials of Li$_2$CO$_3$:MnCO$_3$:NiO=0.84:0.8062:0.318. Although this lithium-manganese composite oxide is represented by a composition formula Li$_{1.68}$Mn$_{0.8062}$Ni$_{0.318}$O$_3$, the composition might deviate from this.

Note that the ratios of metal, silicon, phosphorus, and other elements to the total composition in the whole particle of a lithium-manganese composite oxide can be measured with, for example, an inductively coupled plasma mass spectrometer (ICP-MS). The ratio of oxygen to the total composition in the whole particle of a lithium-manganese composite oxide can be measured by, for example, energy dispersive X-ray spectroscopy (EDX). Alternatively, the ratio of oxygen to the total composition in the whole particle of a lithium-manganese composite oxide can be measured by ICP-MS combined with fusion gas analysis and valence evaluation of X-ray absorption fine structure (XAFS) analysis. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like.

Figure 5A:
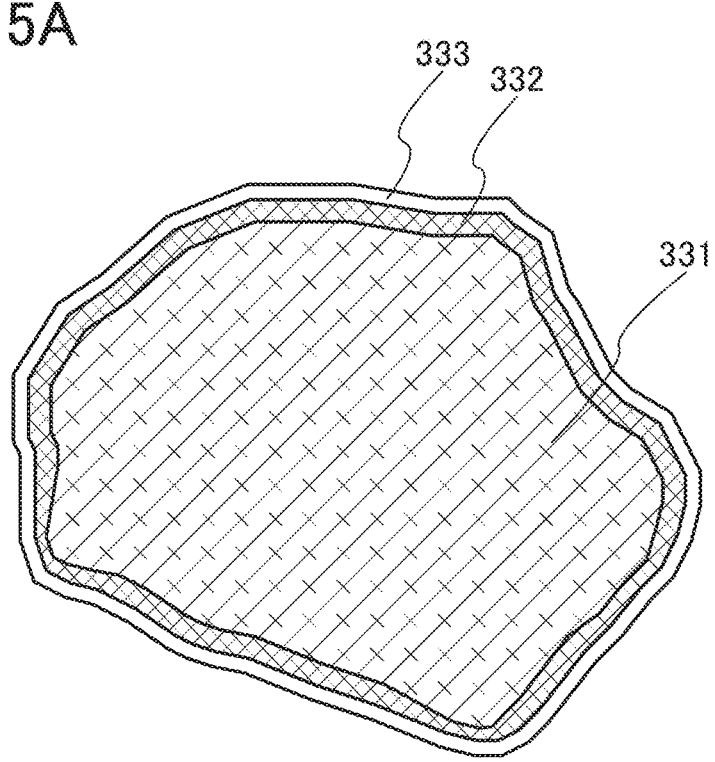
FIGS. 5A and 5B each illustrate a cross section of an active material.
Figure 5B:
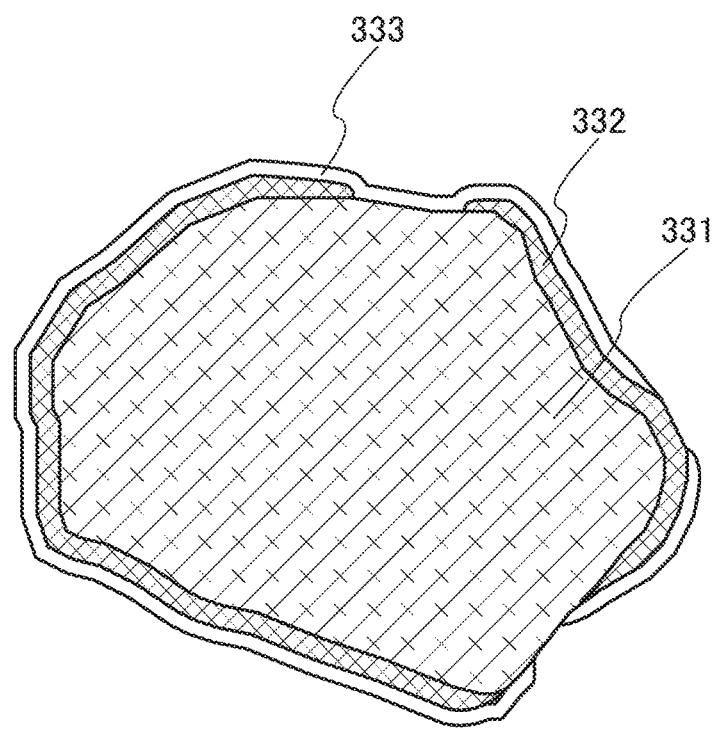

FIGS. 5A and 5B each illustrate an example of a cross-sectional view of a particle of a lithium-manganese composite oxide having a region with different crystal structures, crystal orientations, or oxygen contents.

As illustrated in FIG. 5A, the lithium-manganese composite oxide having a region with different crystal structures, crystal orientations, or oxygen contents preferably include a region 331, a region 332, and a region 333. The region 332 is in contact with at least part of the outer side of the region 331. Here, the term "outer side" refers to the side closer to a surface of a particle. The region 333 preferably includes a region corresponding to a surface of a particle containing the lithium-manganese composite oxide.

As illustrated in FIG. 5B, the region 331 may include a region not covered with the region 332. The region 332 may include a region not covered with the region 333. Furthermore, the region 331 may include a region in contact with the region 333, for example. Furthermore, the region 331 may include a region covered with neither the region 332 nor the region 333.

The region 332 preferably has a composition different from that of the region 331.

For example, the case will be described where the composition of the region 331 and that of the region 332 are separately measured and the region 331 and the region 332 each contain lithium, manganese, the element M, and oxygen; the atomic ratio of lithium to manganese, the element M, and oxygen in the region 331 is represented by a1:b1:c1:d1; and the atomic ratio of lithium to manganese, the element M, and oxygen in the region 332 is represented by a2:b2:c2:d2. Note that the composition of each of the region 331 and the region 332 can be measured by, for example, EDX using a TEM. In measurement by EDX, the proportion of lithium is sometimes difficult to measure. Thus, a difference between the region 331 and the region 332 in composition except for lithium will be described below. Here, d1/(b1+c1) is preferably greater than or equal to 2.2, further preferably greater than or equal to 2.3, and still further preferably greater than or equal to 2.35 and less than or equal to 3. Furthermore, d2/(b2+c2) is preferably less than 2.2, further preferably less than 2.1, and still further preferably greater than or equal to 1.1 and less than or equal to 1.9. In this case, the composition of the whole particle of lithium-manganese composite oxide including the region 331 and the region 332 also preferably satisfies the above inequality: 0.26≤(b+c)/d<0.5.

The valence of manganese in the region 332 may be different from that of manganese in the region 331. The valence of the element M in the region 332 may be different from that of the element M in the region 331.

Specifically, the region 331 is preferably a lithium-manganese composite oxide having a layered rock-salt crystal structure. The region 332 is preferably a lithium-manganese composite oxide having a spinel crystal structure.

Here, in the case where the compositions of the regions or valences of elements in the regions are spatially distributed, the compositions or valences in a plurality of portions are obtained, the average values thereof are calculated, and the average values are regarded as the compositions or valences of the regions, for example.

A transition layer may be provided between the region 332 and the region 331. The transition layer is a region where the composition, crystal structure, or crystal lattice constant changes continuously or gradually. A mixed layer may be provided between the region 332 and the region 331. The mixed layer is a layer in which, for example, two or more crystals having different crystal orientations are mixed, two or more crystals having different crystal structures are mixed, or two or more crystals having different compositions are mixed.

For the region 333, carbon or a metal compound can be used. Examples of the metal are cobalt, aluminum, nickel, iron, manganese, titanium, zinc, and lithium. Examples of the metal compound are an oxide and a fluoride of the metal.

It is particularly preferable that the region 333 contain carbon. Since carbon has high conductivity, the particle covered with carbon in the electrode of the power storage device can reduce the resistance of the electrode, for example. The region 333 preferably includes a graphene compound. The use of the graphene compound in the region 333 allows a particle of the lithium-manganese composite oxide to be efficiently coated with the region 333. The graphene compound will be described later. The region 333 may include, specifically, graphene or graphene oxide, for example. Furthermore, graphene formed by reducing graphene oxide is preferably used as graphene. Graphene has excellent electrical characteristics of high conductivity and excellent physical properties of high flexibility and high mechanical strength. When graphene oxide is used for the region 333 and is reduced, the region 332 in contact with the region 333 is oxidized in some cases.

When the region 333 includes a graphene compound, the secondary battery using the lithium-manganese composite oxide as a positive electrode material can have improved cycle characteristics.

The thickness of a layer containing carbon is preferably greater than or equal to 0.4 nm and less than or equal to 40 nm.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium may be used as the positive electrode active material. For example, the positive electrode active material may be a layered oxide containing sodium.

As a material containing sodium, an oxide containing sodium, such as $NaFeO_2$, $Na_{2/3}[Fe_{1/2}Mn_{1/2}]O_2$, $Na_{2/3}[Ni_{1/3}Mn_{2/3}]O_2$, $Na_2Fe_2(SO_4)_3$, $Na_3V_2(PO_4)_3$, $Na_2FePO_4F$, $NaVPO_4F$, $NaMPO_4$ (M is Fe(II), Mn(II), Co(II), or Ni(II)), $Na_2FePO_4F$, and $Na_4Co_3(PO_4)_2P_2O_7$ can be used as the positive electrode active material.

In addition, as the positive electrode active material, a lithium-containing metal sulfide can be used. Examples of the lithium-containing metal sulfide are $Li_2TiS_3$ and $Li_3NbS_4$.

This embodiment can be combined with any of the other embodiments as appropriate.

Embodiment 2

In this embodiment, a graphene compound of one embodiment of the present invention is described.

<Graphene Compound>

First, graphene and a graphene compound are described.

Graphene is a one-atom-thick sheet of carbon atoms having $sp^2$ hybrid orbitals which are bonded to each other and arranged to have a hexagonal lattice structure on a plane. Bonds between carbon atoms in graphene are stronger than those in diamond; thus, graphene has extremely high resistance to deformation and pulling. However, graphene has extremely high electron conductivity and is not sufficiently permeable to lithium ions.

Graphene containing carbon atoms arranged in one atomic layer is referred to as single-layer graphene in some cases. Graphene including two or more and one hundred or less layers is referred to as multilayer graphene in some cases. The length in the longitudinal direction or the length of the major axis in a plane in each of single-layer graphene and multilayer graphene is greater than or equal to 50 nm and less than or equal to 100 μm or greater than or equal to 800 nm and less than or equal to 50 μm. Note that graphene in this specification includes single-layer graphene and multilayer graphene.

In general, graphene has various kinds of defects in some cases. For example, a carbon atom forming a lattice may be missing or a five-membered ring or a seven-membered ring may exist in a lattice in addition to a six-membered ring in some cases. In addition, graphene may have a functional group containing carbon or an element other than carbon. Such a defect site can be utilized to bond graphene with an atom or an atomic group to obtain a desired property.

In this specification and the like, a compound including graphene as a basic skeleton is referred to as a graphene compound (GC). Note that, in this specification, graphene compounds include single-layer graphene and multilayer graphene.

Graphene compounds are detailed below.

A graphene compound is, for example, a compound where graphene is chemically modified with an atom other than carbon or an atomic group with an atom other than a carbon atom. A graphene compound may be a compound where graphene is chemically modified with an atomic group composed mainly of carbon, such as an alkyl group or an alkylene group. An atomic group that chemically modifies graphene is referred to as a chemically modifying group, a modifying group, a substituent, a functional group, a characteristic group, or the like in some cases. Chemical modification in this specification and the like refers to introduction of an atomic group to graphene, multilayer graphene, a graphene compound, or graphene oxide (described later) by a substitution reaction, an addition reaction, or other reactions.

The chemical modification not only means introduction of one kind of atom or atomic group but also means introduction of two or more kinds of atoms or atomic groups by two or more types of chemical modification. The chemical modification includes an addition reaction of hydrogen, a halogen atom, a hydrocarbon group, an aromatic hydrocarbon group, or a heterocyclic compound group. Examples of a reaction of introducing an atomic group to graphene include an addition reaction and a substitution reaction. Alternatively, a Friedel-Crafts reaction, a Bingel reaction, or the like may be performed. A radical addition reaction may be performed on graphene, and a ring may be formed between graphene and an atomic group by a cycloaddition reaction.

Note that a front surface and a back surface of graphene may be chemically modified with different atoms or different atomic groups. In multilayer graphene, multiple layers may be chemically modified with different atoms or atomic groups.

An example of the above-mentioned graphene compound chemically modified with an atom or an atomic group is graphene chemically modified with oxygen or a functional group containing oxygen. A graphene compound chemically modified with oxygen or a functional group containing oxygen is referred to as graphene oxide (GO) in some cases. In this specification, graphene oxides include multilayer graphene oxides.

An example of graphene oxide is represented by a structural formula (300). Although the structural formula (300) shows an example in which a graphene layer (G layer) has an epoxy group, a hydroxy group, and a carboxy group, the kind and the number of functional groups of the graphene oxide are not limited to those of this example.

[Chemical Formula 4]

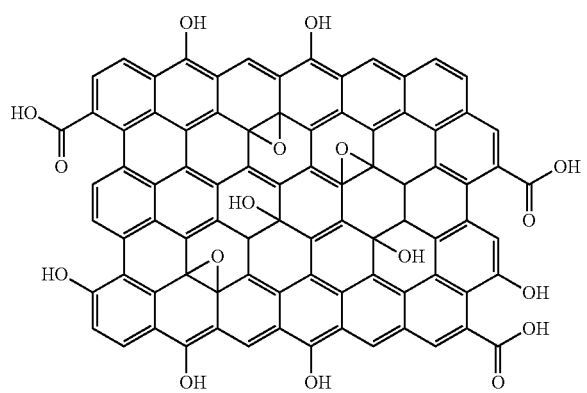

(300)

A simplified structure of graphene oxide is represented by a general formula (G3). A graphene layer is represented by G layer in the general formula (G3). The graphene layer is a sheet-like layer of carbon atoms bonded to each other. The graphene layer may be either a single layer or a multilayer and may include defects or functional groups. Hereinafter, the graphene oxide is described with the general formula (G3). Although the general formula (G3) shows an example in which the graphene layer has two hydroxy groups, the kind and the number of functional groups of the graphene layer of the present invention are not limited to those of this example.

[Chemical Formula 5]

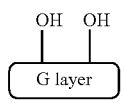

(G3)

A formation method example of graphene oxide is described below. Graphene oxide can be obtained by oxidizing the aforementioned graphene or multilayer graphene. Alternatively, graphene oxide can be obtained by being separated from graphite oxide. Graphite oxide can be obtained by oxidizing graphite. The graphene oxide may be further chemically modified with the above-described atom or atomic group.

A compound that can be obtained by reducing graphene oxide is referred to as reduced graphene oxide (RGO) in some cases. In RGO, in some cases, all oxygen atoms contained in the graphene oxide are not extracted and part of them remains in a state of oxygen or an atomic group containing oxygen that is bonded to carbon.

A graphene compound may have a sheet-like shape where a plurality of graphene compounds partly overlap with each other. Such a graphene compound is referred to as a graphene compound sheet in some cases. The graphene compound sheet has, for example, an area with a thickness larger than or equal to 0.33 nm and smaller than or equal to 10 mm, preferably larger than 0.34 nm and smaller than or equal to 10 µm. The graphene compound sheet may be chemically modified with an atom other than carbon, an atomic group containing an atom other than carbon, an atomic group composed mainly of carbon such as an alkyl group, or the like. A plurality of layers in the graphene compound sheet may be chemically modified with different atoms or atomic groups.

A graphene compound may have a five-membered ring composed of carbon atoms or a poly-membered ring that is a seven- or more-membered ring composed of carbon atoms, in addition to a six-membered ring composed of carbon atoms. In the neighborhood of a poly-membered ring that is a seven- or more-membered ring, a region through which a lithium ion can pass may be generated.

A plurality of graphene compounds may be gathered to form a sheet-like shape.

A graphene compound has a planar shape, thereby enabling surface contact.

<Chemically Modified Graphene Compound>

Next, a chemically modified graphene compound is described.

For example, the graphene compound of one embodiment of the present invention is preferably a graphene compound chemically modified to have a functional group including one or more groups selected from a carbonyl group, an ester group, a carboxyl group, an ether group, an epoxy group, and the like, and further preferably a graphene compound including an ester group or a carboxyl group. A modifier including a large number of ester groups or carboxyl groups could have a high molecular weight. This might makes it difficult for the modifier to be dissolved in a solvent at chemical modification to graphene or graphene oxide in the process of synthesizing the graphene compound. Thus, the reactivity in chemical modification to graphene or graphene oxide decreases in some cases. In addition, the increased number of ester groups might easily cause a hydrolysis reaction. Therefore, the number of ester groups or carboxyl groups in the modifier is preferably 1 to 10.

The graphene compound of one embodiment of the present invention has higher heat resistance than, for example, a polymer material such as polyethylene oxide (PEO). It is important for a lithium-ion battery to have high heat resistance to prevent a serious accident such as a firing or explosion caused by an unexpected reaction due to damage to a component in the battery.

For example, the graphene compound of one embodiment of the present invention contains a graphene layer and a substituted or unsubstituted chain group, and the graphene layer is bonded to the chain group through a substituent containing Si. Here, as shown in a general formula (G1), the substituent containing Si contains, for example, Si and O. For example, the graphene compound of one embodiment of the present invention contains silicon and oxygen bonded to the silicon, and the silicon is bonded to the chain group including an ester group, as shown in a general formula (G1).

Another embodiment of the present invention is a graphene compound represented by the following general formula (G1) or (G2).

[Chemical Formula 6]

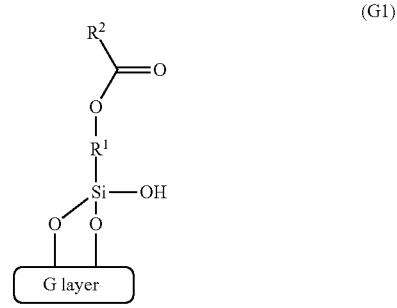

(G1)

[Chemical Formula 7]

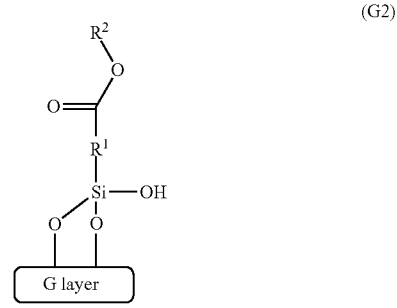

(G2)

In each of the general formulae (G1) and (G2), G layer represents a graphene layer.

When the graphene compound of one embodiment of the present invention has a structure represented by the general formula (G1) or the general formula (G2), reduction resistance might be improved as compared with GO.

In each of the general formulae (G1) and (G2), $R^1$ represents a substituted or unsubstituted alkylene group and may be branched. $R^2$ represents hydrogen or a substituted or unsubstituted alkyl group and may be branched. The general formula (G1) is classified into esters because the general formula (G1) has an ester group. In the case where $R^2$ in the general formula (G2) is an alkyl group, the general formula (G2) is classified into esters because the general formula (G2) has an ester group. In the case where $R^2$ in the general formula (G2) is hydrogen, the general formula (G2) is classified into carboxylic acids because the general formula (G2) has a carboxyl group.

Note that substitution in the general formula (G1) or (G2) is preferably substitution by a substituent such as an alkyl group having 1 to 6 carbon atoms, e.g., a methyl group, an ethyl group, an n-propyl group, an iso-propyl group, a sec-butyl group, a tert-butyl group, an n-pentyl group, or an n-hexyl group, an aryl group having 6 to 10 carbon atoms, e.g., a phenyl group, an o-tolyl group, an m-tolyl group, a p-tolyl group, a 1-naphthyl group, or a 2-naphthyl group, fluorine, or trifluoromethane.

Alternatively, $R^1$ is preferably a substituted or unsubstituted alkylene group having 1 to 20 carbon atoms. $R^2$ is preferably hydrogen or a substituted or unsubstituted alkyl group having 1 to 20 carbon atoms. Interlayer distance in a chemically modified graphene compound may be larger than that in graphene or graphene oxide. As the interlayer distance increases, the electron conductivity becomes low. $R^1$ and $R^2$ may be selected as appropriate so that the interlayer distance with which desired electron conductivity is obtained is set.

When the graphene compound has low electron conductivity and the electrode 210 includes the layer 213, for example, the electric field of the surface of the electrode 210 might be relieved.

Alternatively, $R^1$ is preferably a substituted or unsubstituted alkylene group having 1 to 11 carbon atoms. Alternatively, $R^2$ is preferably a substituted or unsubstituted alkyl group having 1 to 11 carbon atoms. In terms of dispersibility in a solvent, the number of carbon atoms is preferably within the above range.

There is no particular limitation on the molecular weight or molecular structure of graphene in the graphene compound of one embodiment of the present invention, and graphene in any size can be used. Accordingly, it is impossible to specify a molecular structure of the graphene compound of one embodiment of the present invention in detail and fully represent the molecular structure of the graphene compound of one embodiment of the present invention. Thus, the chemically modified graphene compound of one embodiment of the present invention might be practically specified by describing a formation method; for example, a graphene compound chemically modified with a silicon compound that has a substituted or unsubstituted group having one or more ester groups or carboxyl groups. In addition, it is impossible or impractical to specify the chemically modified graphene compound of one embodiment of the present invention without describing a formation method, in some cases. Furthermore, although a graphene layer and silicon are fixed in the shape of the graphene layer with two Si—O bonds in the above formula, the number of the Si—O bonds may be one or three. The bond is not limited to the Si—O bond, and another bond may be used. A hydroxy group or an alkoxy group may be bonded to silicon that is not bonded to the graphene layer.

Alternatively, the chemically modified graphene compound of one embodiment of the present invention is a graphene compound represented by the following general formula (G3).

[Chemical Formula 8]

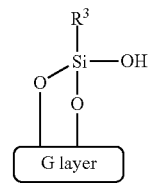

(G3)

In the general formula (G3), G layer represents a graphene layer. In the general formula (G3), $R^3$ represents a substituted or unsubstituted chain group having at least two ether bonds. Note that $R^3$ may have a branched structure. Furthermore, although G layer and Si are fixed in the shape of a G layer with two Si—O bonds in the above formula, the number of Si—O bonds may be one or three. The bond is not limited to the Si—O bond, and another bond may be used.

When the graphene compound of one embodiment of the present invention has a structure represented by the general formula (G3), reduction resistance might be improved as compared with GO.

<Chemical Modification>

Next, a method for chemically modifying graphene or graphene oxide is described using the following synthesis schemes (A-1) and (A-2).

[Chemical Formula 9]

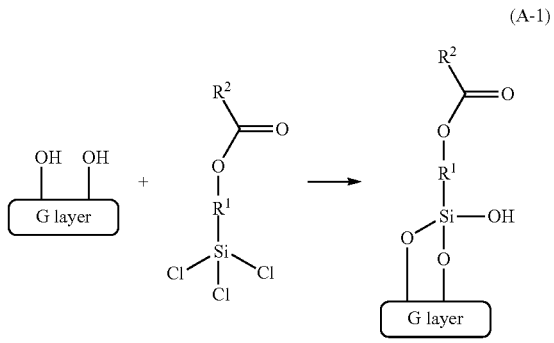

(A-1)

[Chemical Formula 10]

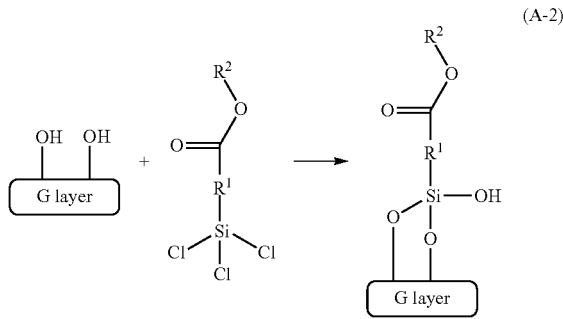

(A-2)

In each of the synthesis schemes (A-1) and (A-2), G layer represents a graphene layer.

As shown in each of the synthesis schemes (A-1) and (A-2), a silicon compound having one or more ester groups or carboxyl groups is reacted with graphene or graphene oxide in the presence of a Lewis base, whereby a chemically modified objective compound can be obtained. Such a reaction is referred to as silylation in some cases.

Silylation means the substitution of a silicon atom for a hydrogen atom in a hydroxy group, an amino group, a carboxyl group, an amide group, a mercapto group, or the like. A silicon compound used for silylation is referred to as a silylating agent in some cases.

As the Lewis base, alkylamine or a heterocyclic aromatic compound is used. Specifically, one or more of butylamine, pentylamine, hexylamine, diethylamine, dipropylamine, dibutylamine, triethylamine, tripropylamine, and pyridine is used.

In addition, the reaction is preferably performed under an inert gas atmosphere of nitrogen or a rare gas such as argon. The atmosphere of nitrogen or argon is preferable because hydrolysis of the silicon compound, oxidation of the Lewis base, or the like can be prevented. The atmosphere of the reaction is not limited to nitrogen or argon and may be an air atmosphere, for example.

In each of the synthesis schemes (A-1) and (A-2), $R^1$ represents a substituted or unsubstituted alkylene group and may be branched. $R^2$ represents hydrogen or a substituted or unsubstituted alkyl group and may be branched.

Alternatively, $R^1$ is preferably a substituted or unsubstituted alkylene group having 1 to 20 carbon atoms. Alternatively, $R^2$ is preferably hydrogen or a substituted or unsubstituted alkyl group having 1 to 20 carbon atoms.

Alternatively, $R^1$ is preferably a substituted or unsubstituted alkylene group having 1 to 11 carbon atoms. Alternatively, $R^2$ is preferably a substituted or unsubstituted alkyl group having 1 to 11 carbon atoms.

Examples of a Lewis base that can be used in each of the synthesis schemes (A-1) and (A-2) include, but are not limited to, organic bases such as butylamine, pentylamine, hexylamine, diethylamine, dipropylamine, dibutylamine, triethylamine, tripropylamine, and pyridine.

Examples of a solvent that can be used in each of the synthesis schemes (A-1) and (A-2) include, but are not limited to, aromatic hydrocarbons such as toluene, xylene, and mesitylene; hydrocarbons such as hexane and heptane; and ether such as ethylene glycol dimethyl ether. It is particularly preferable to use primary amine as a Lewis base and an aromatic hydrocarbon as a solvent.

Instead of the silicon compound shown in each of the synthesis schemes (A-1) and (A-2), an agent having a trialkoxysilyl group may be used. However, the present invention is not limited thereto.

Specific Example

Next, examples of a silicon compound that has a chain group having one or more ester groups or carboxyl groups are shown below. With the use of any of such silicon compounds, a graphene compound chemically modified with a chain group having one or more ester groups or carboxyl groups can be formed. Compounds 100 to 149 and compounds 156 to 161, which have ester groups, are classified into esters. Compounds 150 to 155, which have carboxyl groups, are classified into carboxylic acids.

[Chemical Formula 11]

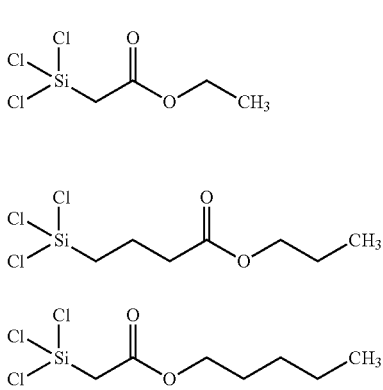

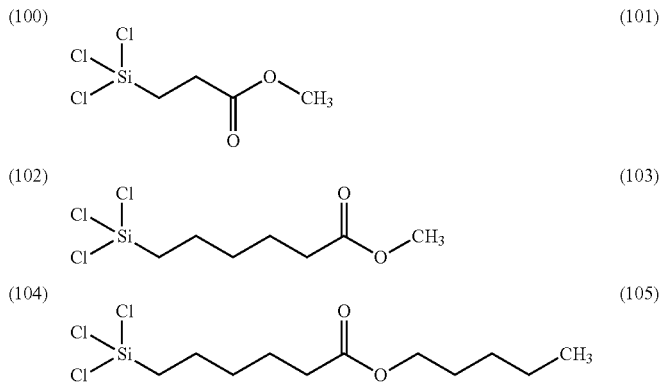

-continued
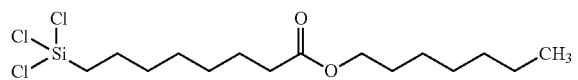 (106)
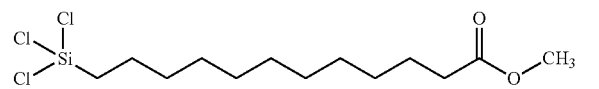 (107)
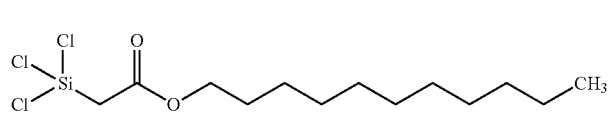 (108)
 (109)
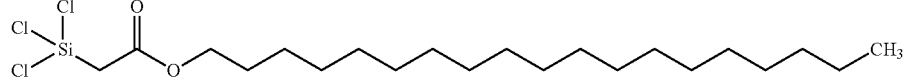 (110)
[Chemical Formula 12]
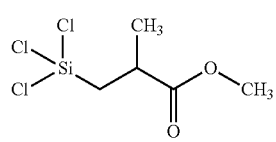 (111)
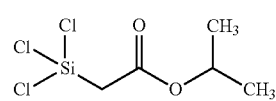 (112)
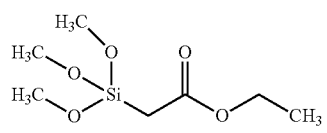 (113)
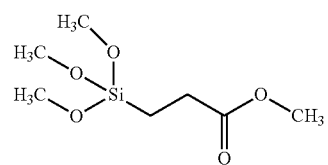 (114)
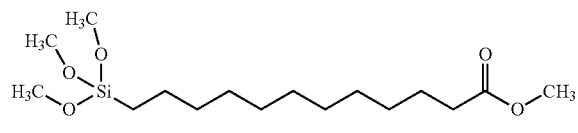 (115)
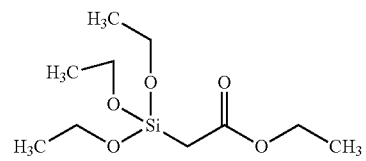 (116)
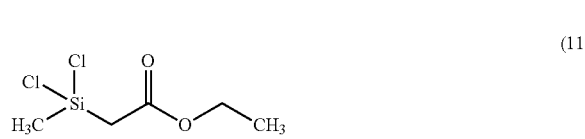 (117)
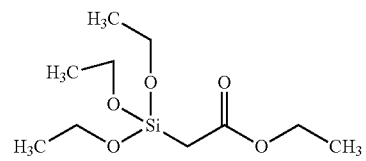 (118)
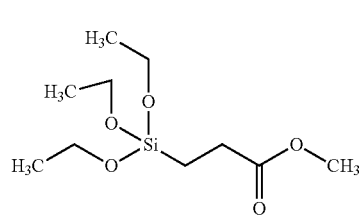 (119)
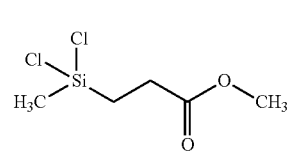 (120)
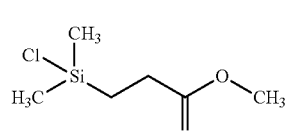 (121)
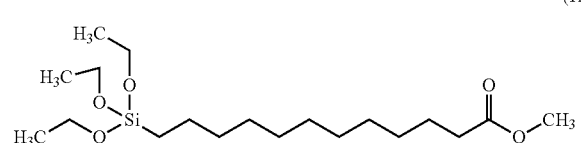 (122)
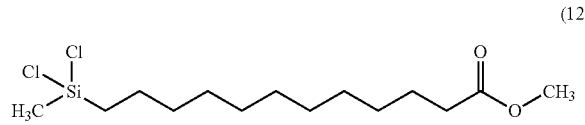 (123)
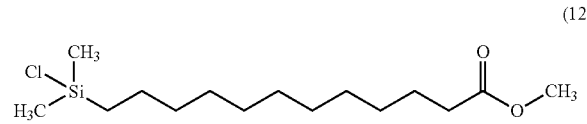 (124)

[Chemical Formula 13]
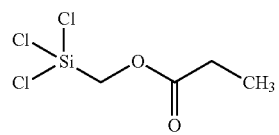 (125)
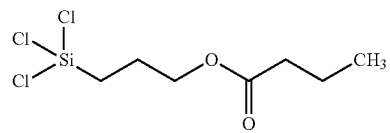 (127)
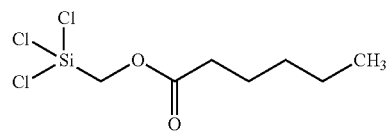 (129)
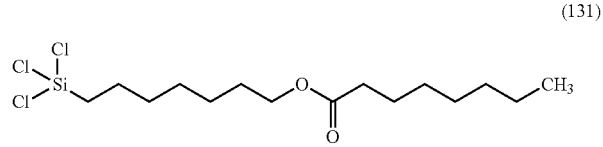 (131)
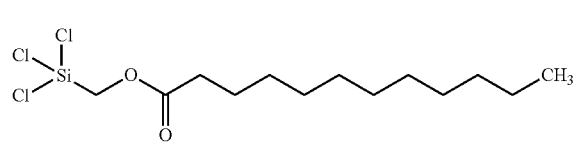 (133)
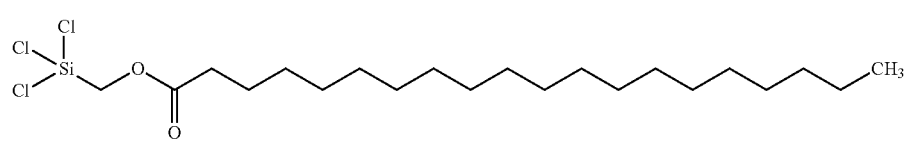 (134)
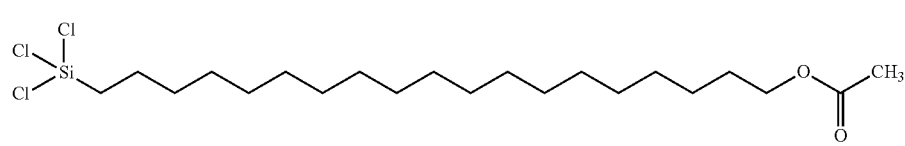 (135)
[Chemical Formula 14]
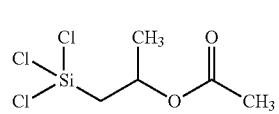 (136)
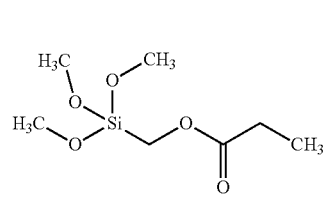 (138)
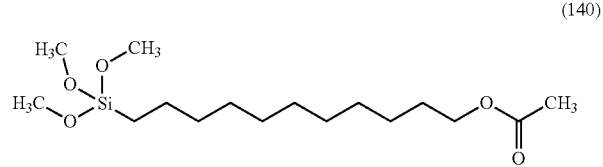 (140)

-continued
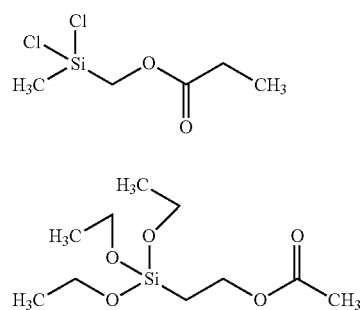
(142) (143)
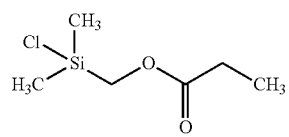
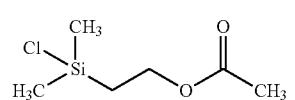
(144)
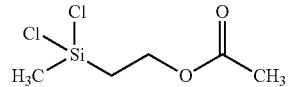
(145)
(146)
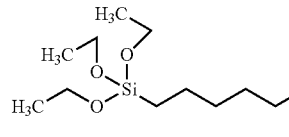
(147)
(148)
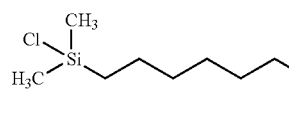
(149)
[Chemical Formula 15]
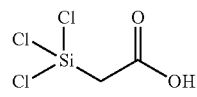
(150)
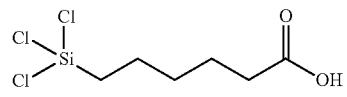
(151)
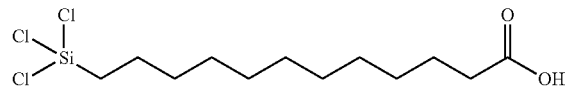
(152)
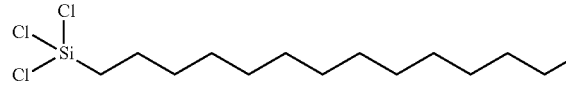
(153)
(154)
(155)
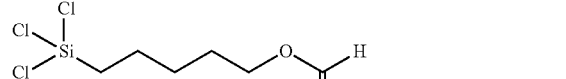
(156)
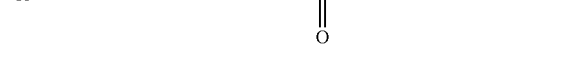
(157)
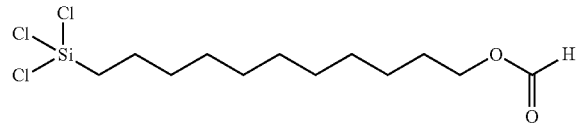
(158)
(159)
(160)

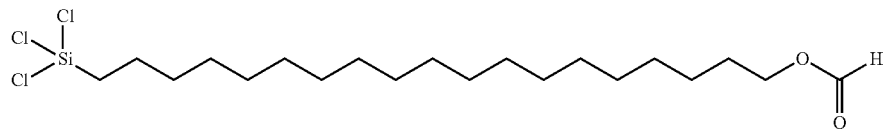
(161)

With the use of any of the above silicon compounds, the graphene compound that has a chain group having one or more ester groups or carboxyl groups can be formed. Note that the graphene compound of one embodiment of the present invention may be formed without using any of the above-mentioned silicon compounds.

Next, examples of the silylating agent that has a chain group having two or more ether bonds are shown below. With the use of any of such silylating agents, a graphene compound chemically modified with a chain group having ether bonds can be formed.

[Chemical Formula 16]

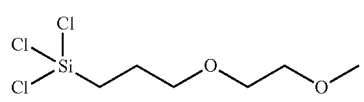
(200)

(201)

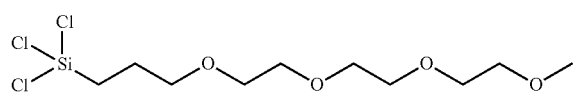
(202)

(203)

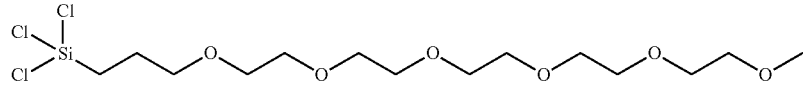
(204)

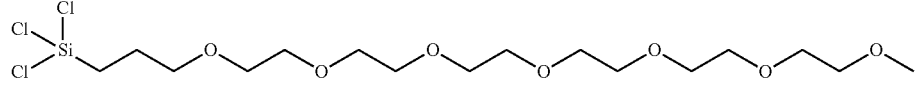
(205)

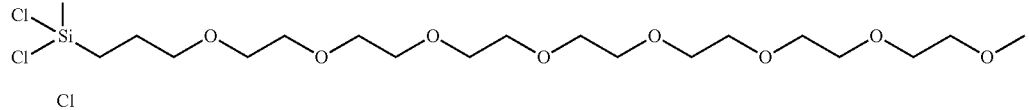
(206)

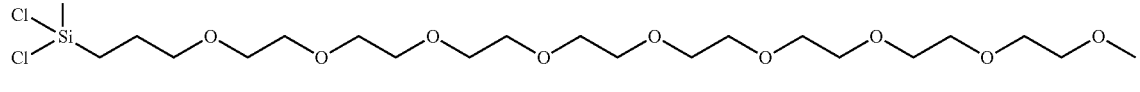
(207)

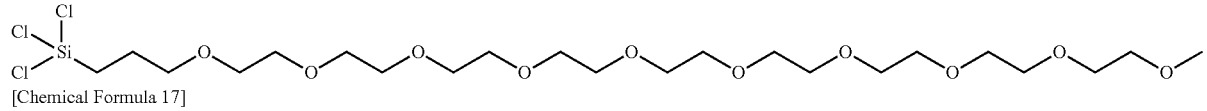
(208)

[Chemical Formula 17]

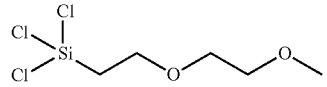
(209)

(210)

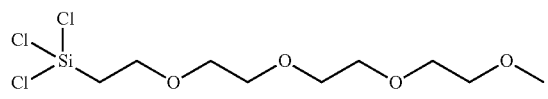
(211)

(212)

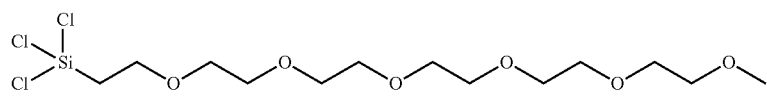
(213)

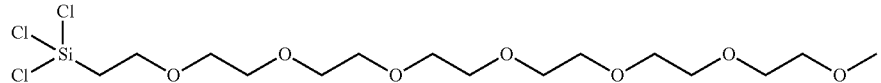
(214)

-continued
(215)
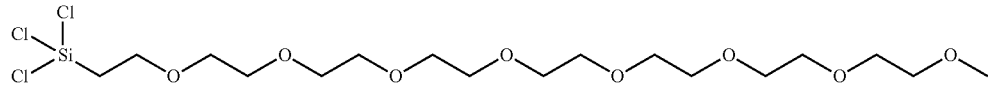
(216)
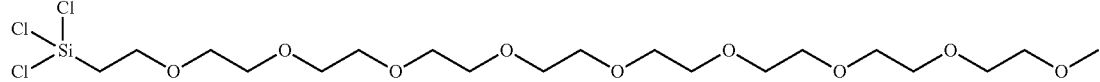
(217)
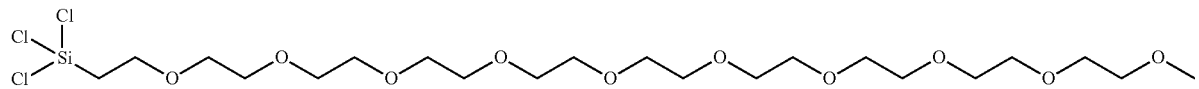
[Chemical Formula 18]
(218)
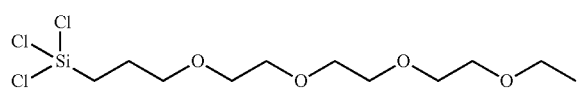
(219)
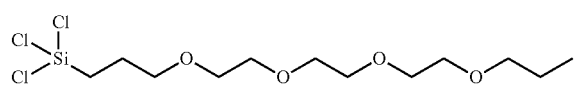
(220)
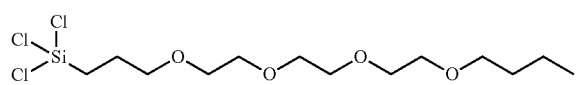
(221)
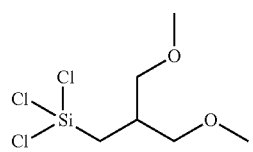
(222)
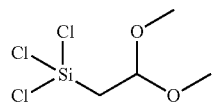
(223)
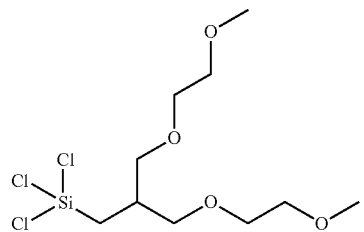
(224)
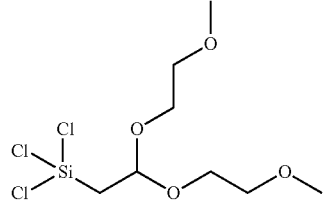
(225)
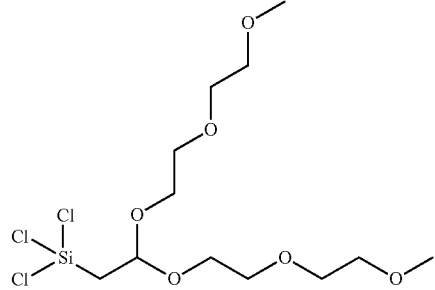
(226)
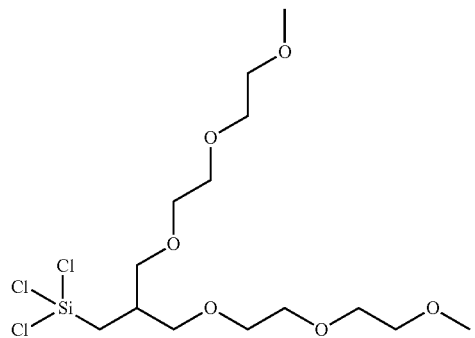

-continued
[Chemical Formula 19]
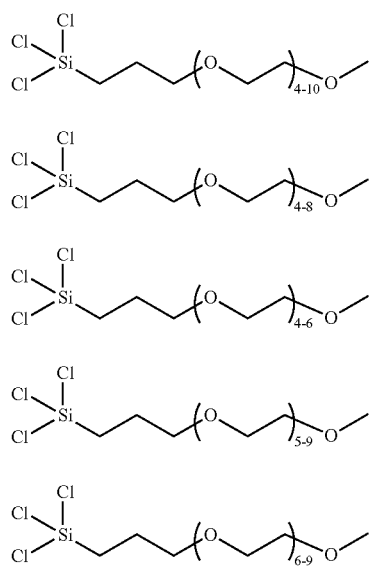
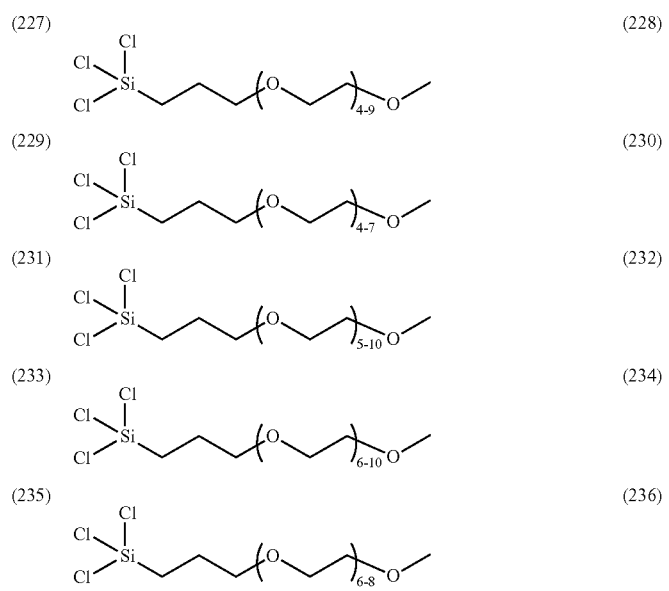
[Chemical Formula 20]
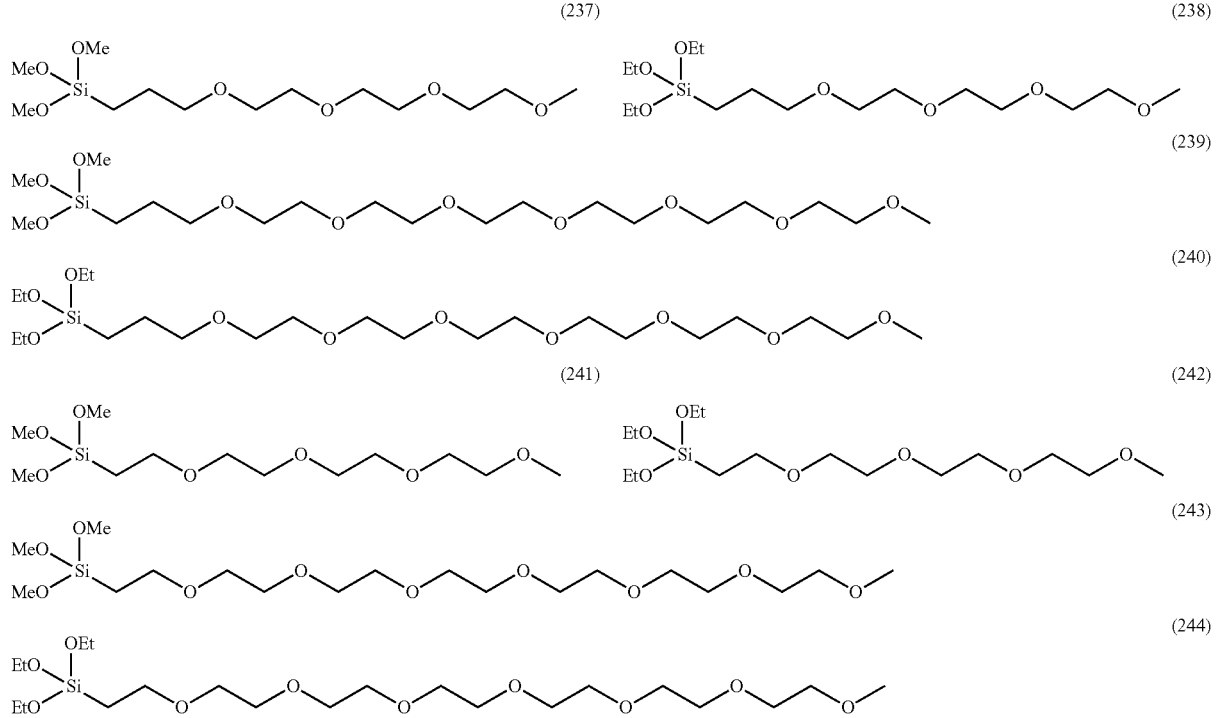
[Chemical Formula 21]
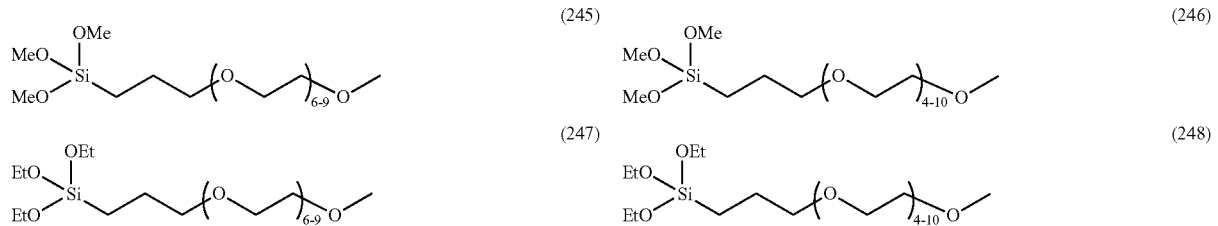
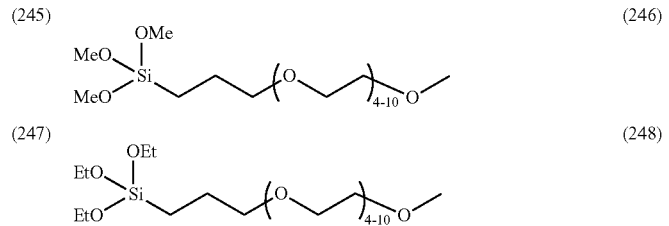

In this embodiment, one embodiment of the present invention has been described. Other embodiments of the present invention are described in other embodiments. Note that one embodiment of the present invention is not limited thereto. For example, although an example of the graphene compound that has a chain group having one or more ester groups or carboxyl groups is described as one embodiment of the present invention, one embodiment of the present invention is not limited to this example.

This embodiment can be combined with any of the other embodiments as appropriate.

Embodiment 3

In this embodiment, an active material, a binder, a conductive additive, and a current collector, which are preferably used for the electrode of one embodiment of the present invention, are described.

The electrode of one embodiment of the present invention contains an active material. The electrode of one embodiment of the present invention may contain a binder. The positive electrode of one embodiment of the present invention may contain a conductive additive.

In the case where the electrode of one embodiment of the present invention is a positive electrode, the electrode contains a positive electrode active material as an active material. As the positive electrode active material, the positive electrode active material described in the above embodiment is preferably used.

Furthermore, in the case where the electrode 210 described in the above embodiment is a positive electrode, the electrode 220 is preferably a negative electrode.

In the case where the electrode of one embodiment of the present invention is a negative electrode, the electrode contains a negative electrode active material as an active material.

<Negative Electrode Active Material>

As the negative electrode active material contained in the electrode, a carbon-based material, an alloy-based material, or the like can be used.

As the carbon-based material, graphite, graphitizing carbon (soft carbon), non-graphitizing carbon (hard carbon), a carbon nanotube, graphene, carbon black, or the like can be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (higher than or equal to 0.05 V and lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and higher level of safety than that of a lithium metal.

Note that it is known that when lithium ions are intercalated in graphite, the interlayer distance of graphite increases from 0.3354 nm to 0.370 nm, for example. That is, the interlayer distance increases by approximately 11%.

For the negative electrode active material, an element which enables charge-discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a significantly high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Here, an element that enables charge-discharge reactions by an alloying reaction and a dealloying reaction with lithium, a compound containing the element, and the like may be referred to as an alloy-based material.

In this specification and the like, SiO refers, for example, to silicon monoxide. SiO can alternatively be expressed as SiOx. Here, x preferably has an approximate value of 1. For example, x is preferably 0.2 or more and 1.5 or less, more preferably 0.3 or more and 1.2 or less.

Furthermore, the negative electrode active material of one embodiment of the present invention may include silicon, lithium, and oxygen. For example, the negative electrode active material may include silicon and lithium silicon oxide positioned outside the silicon.

Alternatively, for the negative electrode active materials, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active materials, $Li_{(3-x)}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not form an alloy with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $FeP_2$, and $CoP_3$, and fluorides such as $FeF_3$ and $BiF_3$.

The reaction potential of the negative electrode active material is preferably as low as possible, in which case the voltage of the power storage device can be high. On the other hand, when the potential is low, power of reducing an electrolyte solution is increased, so that an organic solvent or the like in an electrolyte solution might be subjected to reductive decomposition. The range of potentials in which the electrolysis of an electrolyte solution does not occur is referred to as a potential window. The electrode potential of the negative electrode is preferably within a potential window of an electrolyte solution; however, the potentials of many active materials used for negative electrodes of lithium-ion secondary batteries and lithium-ion capacitors are out of the potential windows of almost all electrolyte solutions. Specifically, materials with low reaction potentials such as graphite and silicon can increase the voltage of power storage devices but are likely to cause the reductive decomposition of electrolyte solutions.

<Binder>

As the binder contained in the electrode, a rubber material such as styrene-butadiene rubber (SBR), styrene-isoprene-styrene rubber, acrylonitrile-butadiene rubber, butadiene rubber, or ethylene-propylene-diene copolymer can be used. Alternatively, fluororubber can be used as the binder.

For the binder, for example, water-soluble polymers are preferably used. As the water-soluble polymers, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used. It is more preferred that such water-soluble polymers be used in combination with any of the above rubber materials.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVdF), polyacrylonitrile (PAN), ethylene-propylene-diene polymer, polyvinyl acetate, or nitrocellulose is preferably used.

Two or more of the above materials may be used in combination for the binder.

The content of the binder with respect to the total amount of an active material layer 102 is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %. The content of the conductive additive with respect to the total amount of the active material layer 102 is preferably greater than or equal to 1 wt % and less than or equal to 10 wt %, more preferably greater than or equal to 1 wt % and less than or equal to 5 wt %.

<Conductive Additive>

Examples of the conductive additive contained in the electrode include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, more preferably greater than or equal to 1 wt % and less than or equal to 5 wt %.

A network for electric conduction can be formed in the electrode by the conductive additive. The conductive additive also allows maintaining of a path for electric conduction between the positive electrode active material particles. The addition of the conductive additive to the active material layer increases the electric conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

As the conductive additive, a graphene compound may be used.

A graphene compound has excellent electrical characteristics of high conductivity and excellent physical properties of high flexibility and high mechanical strength in some cases. Furthermore, a graphene compound has a planar shape. A graphene compound enables low-resistance surface contact. Furthermore, a graphene compound has extremely high conductivity even with a small thickness in some cases and thus allows a conductive path to be formed in an active material layer efficiently even with a small amount. For this reason, it is preferable to use a graphene compound as the conductive additive because the area where the active material and the conductive additive are in contact with each other can be increased. In addition, it is preferable to use a graphene compound as the conductive additive because the electrical resistance can be reduced in some cases. Here, it is particularly preferable to use, for example, graphene, multilayer graphene, or RGO as a graphene compound.

In the case where an active material with a small particle diameter (e.g., 1 μm or less) is used, the specific surface area of the active material is large and thus more conductive paths for the active material particles are needed. In such a case, it is particularly preferred that a graphene compound that can efficiently form a conductive path even in a small amount is used.

A cross-sectional structure example of the active material layer 102 including a graphene compound as a conductive additive is described below.

Figure 6A:
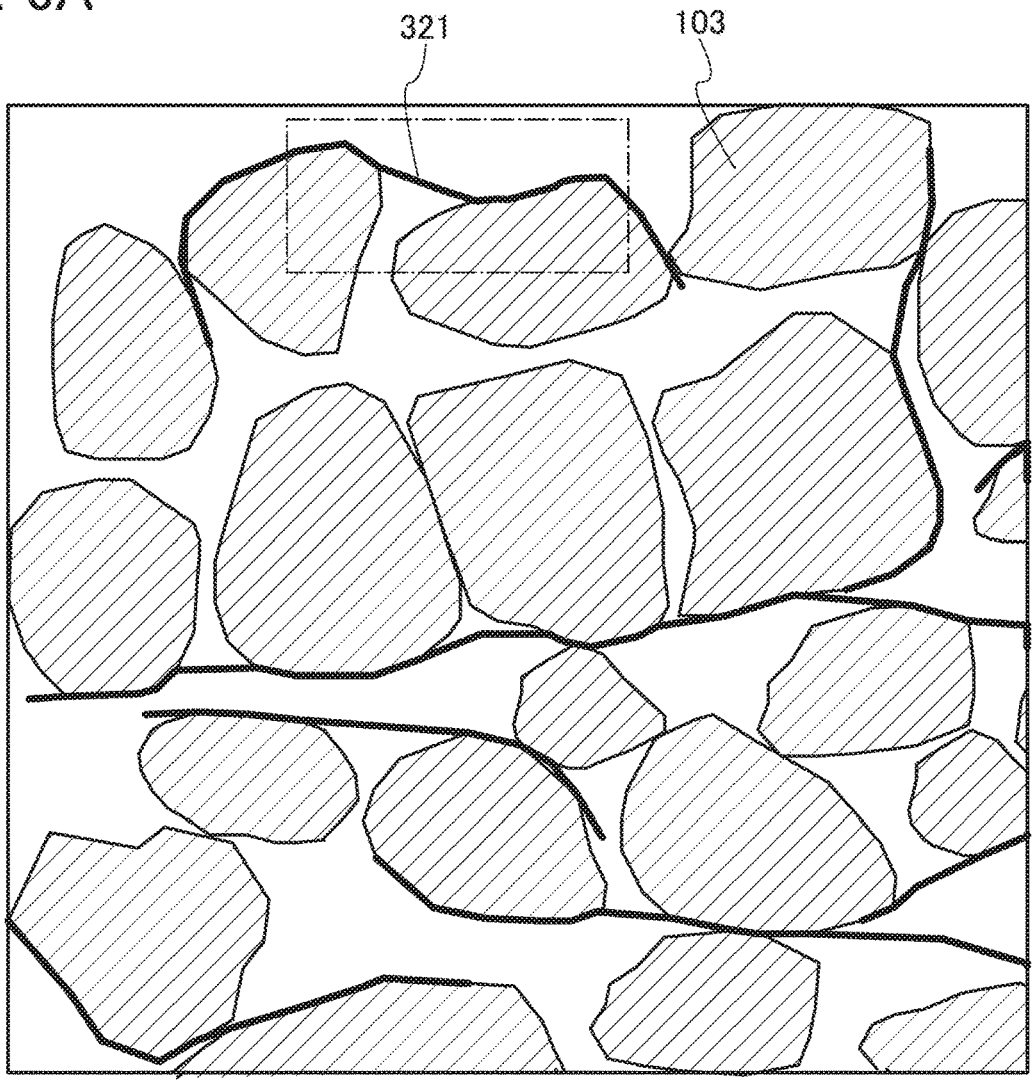
FIGS. 6A and 6B illustrate part of a cross section of an electrode.

FIG. 6A shows a longitudinal sectional view of the active material layer 102. The active material layer 102 includes active material particles 103, a graphene compound 321 serving as a conductive additive, and a binder 104. Here, graphene or multilayer graphene may be used as the graphene compound 321, for example. The graphene compound 321 preferably has a sheet-like shape. The graphene compound 321 may have a sheet-like shape formed of a plurality of sheets of multilayer graphene and/or a plurality sheets of graphene that partly overlap with each other.

The longitudinal section of the active material layer 102 in FIG. 6A shows substantially uniform dispersion of the sheet-like graphene compounds 321 in the active material layer 102. The graphene compounds 321 are schematically shown by thick lines in FIG. 6A but are actually thin films each having a thickness corresponding to the thickness of a single layer or a multi-layer of carbon molecules. The plurality of graphene compounds 321 are formed in such a way as to wrap, coat, or adhere to the surfaces of the plurality of active material particles 103, so that the graphene compounds 321 make surface contact with the active material particles 103.

Here, the plurality of graphene compounds are bonded to each other to form a net-like graphene compound sheet (hereinafter referred to as a graphene compound net or a graphene net). The graphene net covering the active material can function as a binder for bonding active materials. The amount of a binder can thus be reduced, or the binder does not have to be used. This can increase the proportion of the active material in the electrode volume or weight. That is to say, the capacity of the power storage device can be increased.

Here, it is preferable to perform reduction after a layer to be the active material layer 102 is formed in such a manner that graphene oxide is used as the graphene compound 321 and mixed with an active material. When graphene oxide with extremely high dispersibility in a polar solvent is used for the formation of the graphene compounds 321, the graphene compounds 321 can be substantially uniformly dispersed in the active material layer 102. The solvent is removed by volatilization from a dispersion medium in which graphene oxide is uniformly dispersed, and the graphene oxide is reduced; hence, the graphene compounds 321 remaining in the active material layer 102 partly overlap with each other and are dispersed such that surface contact is made, thereby forming a three-dimensional conduction path. Note that graphene oxide can be reduced either by heat treatment or with the use of a reducing agent, for example.

Unlike a conductive additive in the form of particles, such as acetylene black, which makes point contact with an active material, the graphene compound 321 is capable of making low-resistance surface contact; accordingly, the electrical conduction between the active material particles 103 and the graphene compounds 321 can be improved with a smaller amount of the graphene compound 321 than that of a normal conductive additive. Thus, the proportion of the active material particles 103 in the active material layer 102 can be increased. Accordingly, the discharge capacity of a power storage device can be increased.

Figure 6B:
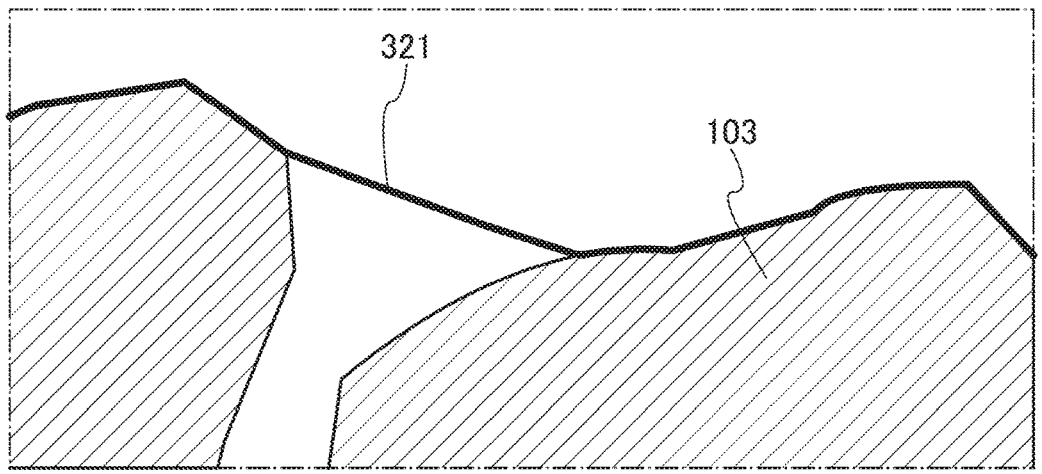

FIG. 6B is an enlarged view illustrating a region surrounded by a dashed dotted line in FIG. 6A. The binder 104 may exist in the shape of a layer on a surface of the active material particle 103. The graphene compound 321 preferably includes a region in contact with a surface of the binder 104. The binder 104 is located between the active material particle 103 and the graphene compound 321, for example. Preferably, the binder 104 is provided on the active material particle 103 and the graphene compound 321 is provided on the binder 104.

<Current Collector>

The current collector 101 can be formed using a material that has high conductivity, such as a metal like stainless steel, gold, platinum, aluminum, or titanium, or an alloy thereof. In the case where the current collector 101 is used in the positive electrode, it is preferred that it not dissolve at the potential of the positive electrode. In the case where the current collector 101 is used in the negative electrode, it is preferred that it not be alloyed with carrier ions such as lithium ions. Alternatively, the current collector 101 can be formed using an aluminum alloy to which an element that improves heat resistance, such as silicon, titanium, neodymium, scandium, or molybdenum, is added. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, nickel, and the like. The current collector 101 can have any of various shapes including a foil-like shape, a plate-like shape (sheet-like shape), a net-like shape, a punching-metal shape, and an expanded-metal shape. The current collector 101 preferably has a thickness of 5 μm to 30 μm inclusive.

This embodiment can be combined with any of the other embodiments as appropriate.

Embodiment 4

In this embodiment, a power storage device which can employ the electrode of one embodiment of the present invention is described.

Examples of the power storage device of one embodiment of the present invention include a secondary battery that utilizes an electrochemical reaction, such as a lithium ion battery, an electrochemical capacitor such as an electric double-layer capacitor or a redox capacitor, an air battery, and a fuel battery.

<Thin Storage Battery>

Figure 7:
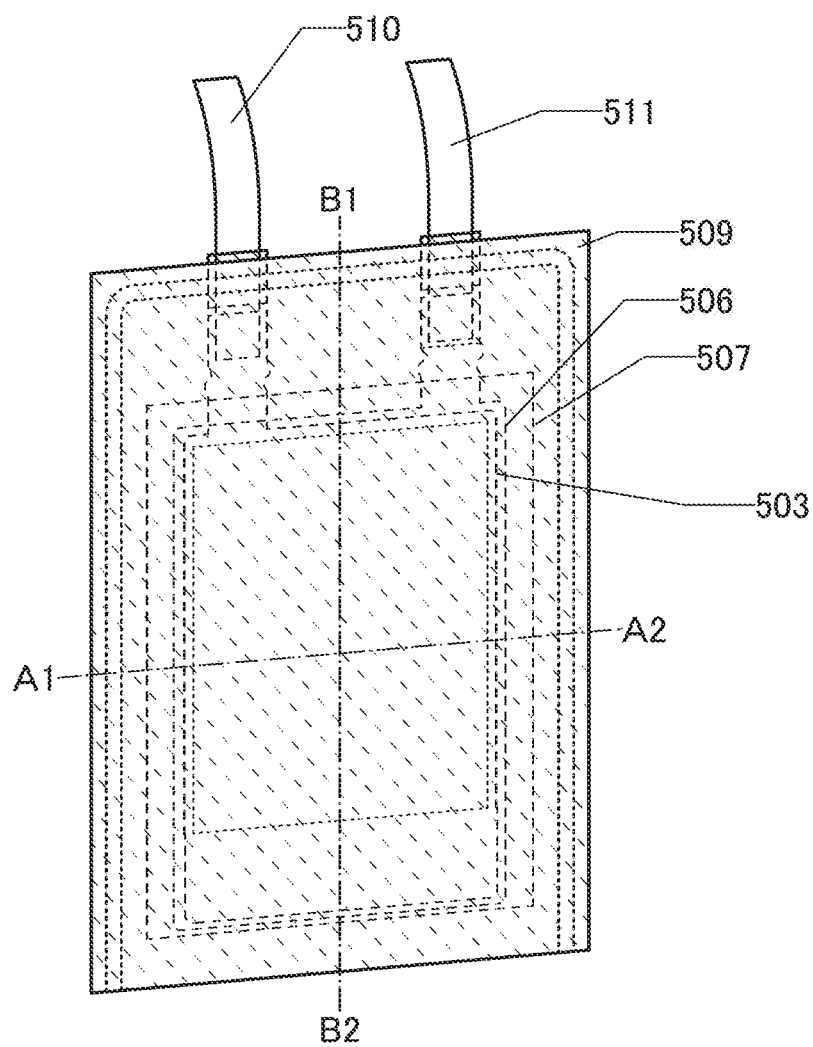
FIG. 7 illustrates a storage battery.

FIG. 7 illustrates a thin storage battery as an example of a storage device. When a flexible thin storage battery is used in an electronic device at least part of which is flexible, the storage battery can be bent as the electronic device is bent.

Figure 8A:
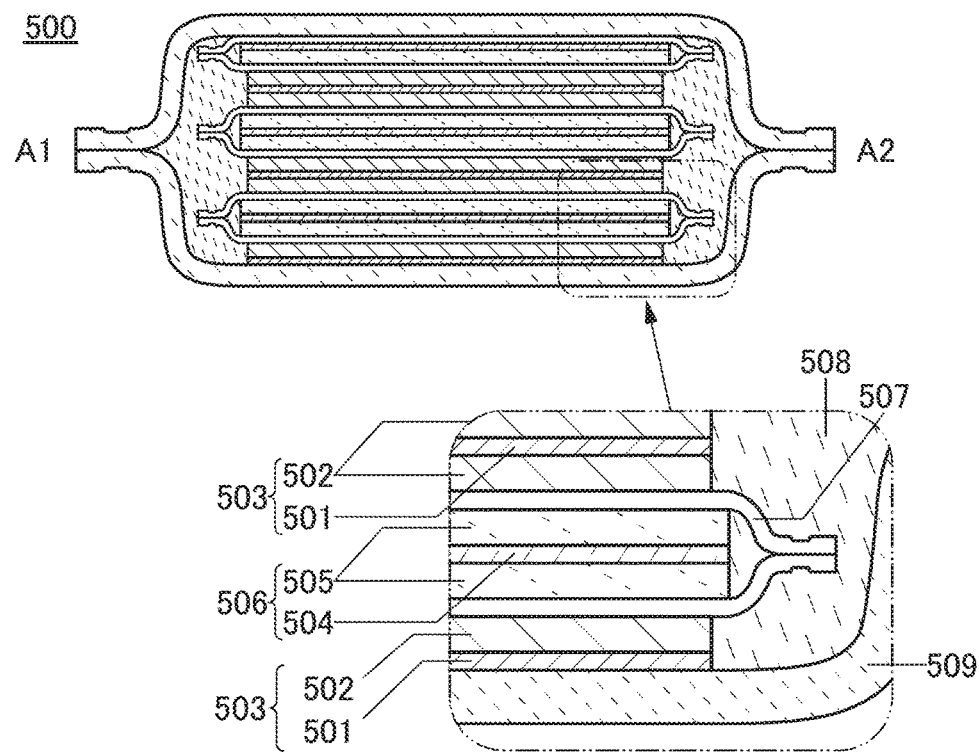
FIGS. 8A and 8B illustrate cross-sectional views of a storage battery.
Figure 8B:
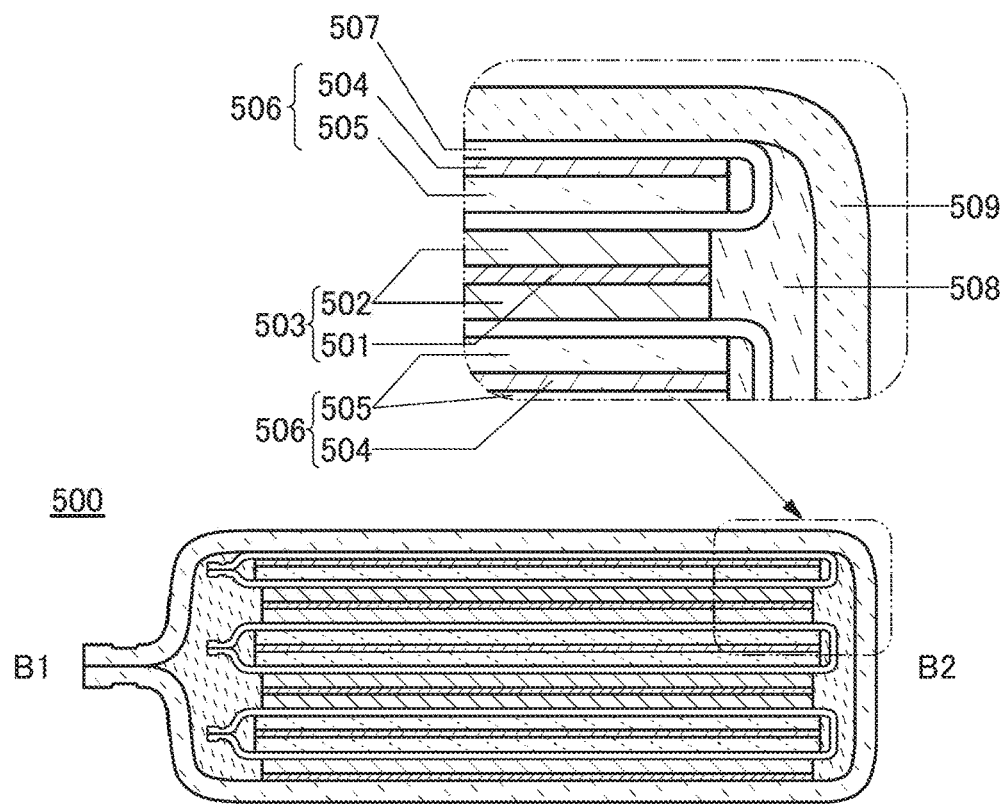

FIG. 7 is an external view of a storage battery 500, which is a thin storage battery. FIG. 8A is a cross-sectional view along dashed-dotted line A1-A2 in FIG. 7, and FIG. 8B is a cross-sectional view along dashed-dotted line B1-B2 in FIG. 7. The storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is provided between the positive electrode 503 and the negative electrode 506 in the exterior body 509. The electrolyte solution 508 is contained in the exterior body 509.

As a solvent of the electrolyte solution 508, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent of the electrolyte solution, safety against liquid leakage and the like is improved. Furthermore, a secondary battery can be thinner and more lightweight. Typical examples of gelled high-molecular materials include a silicone gel, an acrylic gel, an acrylonitrile gel, a polyethylene oxide-based gel, a polypropylene oxide-based gel, a gel of a fluorine-based polymer, and the like.

Alternatively, the use of one or more types of ionic liquids (room temperature molten salts) which have features of non-flammability and non-volatility as a solvent of the electrolyte solution can prevent a power storage device from exploding or catching fire even when a power storage device internally shorts out or the internal temperature increases owing to overcharging or the like. An ionic liquid contains a cation and an anion. The ionic liquid contains an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolyte solution used for a power storage device is preferably highly purified and contains a small amount of dust particles and elements other than the constituent elements of the electrolyte solution (hereinafter, also simply referred to as impurities). Specifically, the weight ratio of impurities to the electrolyte solution is less than or equal to 1%, preferably less than or equal to 0.1%, and more preferably less than or equal to 0.01%.

Furthermore, an additive agent such as vinylene carbonate, propane sultone (PS), tert-butylbenzene (TBB), fluoroethylene carbonate (FEC), or LiBOB may be added to the electrolyte solution. The concentration of such an additive agent in the whole solvent is, for example, higher than or equal to 0.1 wt % and lower than or equal to 5 wt %.

Alternatively, a gel polymer electrolyte obtained in such a manner that a polymer is swelled with an electrolyte solution may be used.

Examples of polymers include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolyte solution, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

As the separator 507, paper; nonwoven fabric; glass fiber; ceramics; synthetic fiber containing nylon (polyamide), vinylon (polyvinyl alcohol-based fiber), polyester, acrylic, polyolefin, or polyurethane; or the like can be used.

Figure 9A:
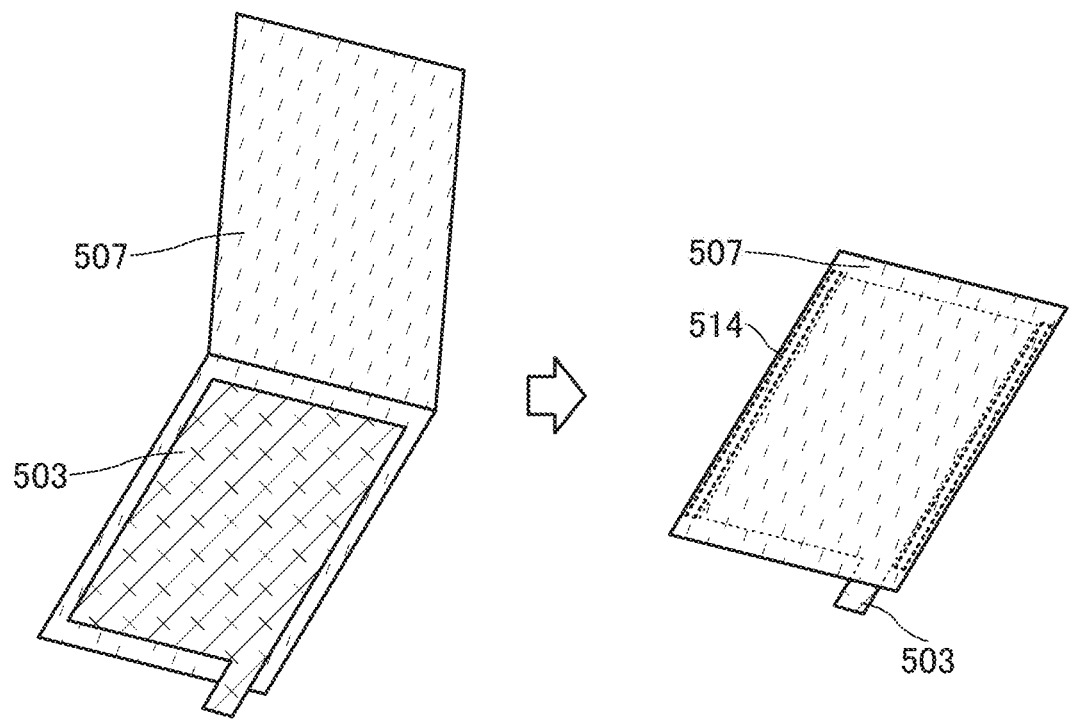
FIGS. 9A and 9B illustrate a method for fabricating a storage battery.
Figure 9B:
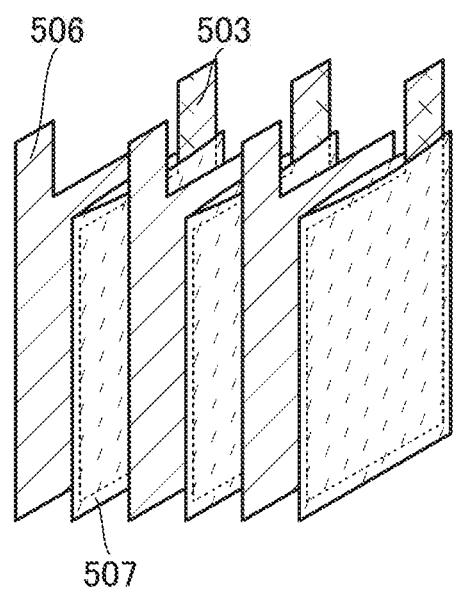

The separator 507 is preferably formed to have a bag-like shape to surround one of the positive electrode 503 and the negative electrode 506. For example, as illustrated in FIG. 9A, the separator 507 is folded in two so that the positive electrode 503 is sandwiched, and sealed with a sealing member 514 in a region outside the region overlapping with the positive electrode 503; thus, the positive electrode 503 can be reliably supported inside the separator 507. Then, as illustrated in FIG. 9B, the positive electrodes 503 surrounded by the separators 507 and the negative electrodes 506 are alternately stacked and provided in the exterior body 509, whereby the storage battery 500 can be formed.

Next, aging after manufacturing a storage battery will be described. Aging is preferably performed after fabrication of a storage battery. The aging can be performed under the following conditions, for example. Charge is performed at a rate of 0.001 C or more and 0.2 C or less at a temperature higher than or equal to room temperature and lower than or equal to 50° C. In the case where the reaction potential of the positive electrode or the negative electrode is out of the range of the potential window of the electrolyte solution 508, the electrolyte solution is decomposed by charge and discharge operations of a storage battery in some cases. In the case where the electrolyte solution is decomposed and a gas is generated and accumulated in the cell, the electrolyte solution cannot be in contact with a surface of the electrode in some regions. That is to say, an effectual reaction area of the electrode is reduced and effectual resistance is increased.

When the resistance is extremely increased, the negative electrode potential is lowered. Consequently, lithium is intercalated into graphite and lithium is deposited on the surface of graphite. The lithium deposition might reduce capacity. For example, if a film or the like is grown on the surface after lithium deposition, lithium deposited on the surface cannot be dissolved again. This lithium cannot contribute to capacity. In addition, when deposited lithium is physically collapsed and conduction with the electrode is lost, the lithium also cannot contribute to capacity. Therefore, the gas is preferably released before the negative electrode potential reaches the potential of lithium because of an increase in a charging voltage.

After the release of the gas, the charging state may be maintained at a temperature higher than room temperature, preferably higher than or equal to 30° C. and lower than or equal to 60° C., more preferably higher than or equal to 35° C. and lower than or equal to 50° C. for, for example, 1 hour or more and 100 hours or less. In the initial charge, an electrolyte solution decomposed on the surface forms a film on a surface of graphite. The formed coating film may thus be densified when the charging state is held at a temperature higher than room temperature after the release of the gas, for example.

Figure 10A:
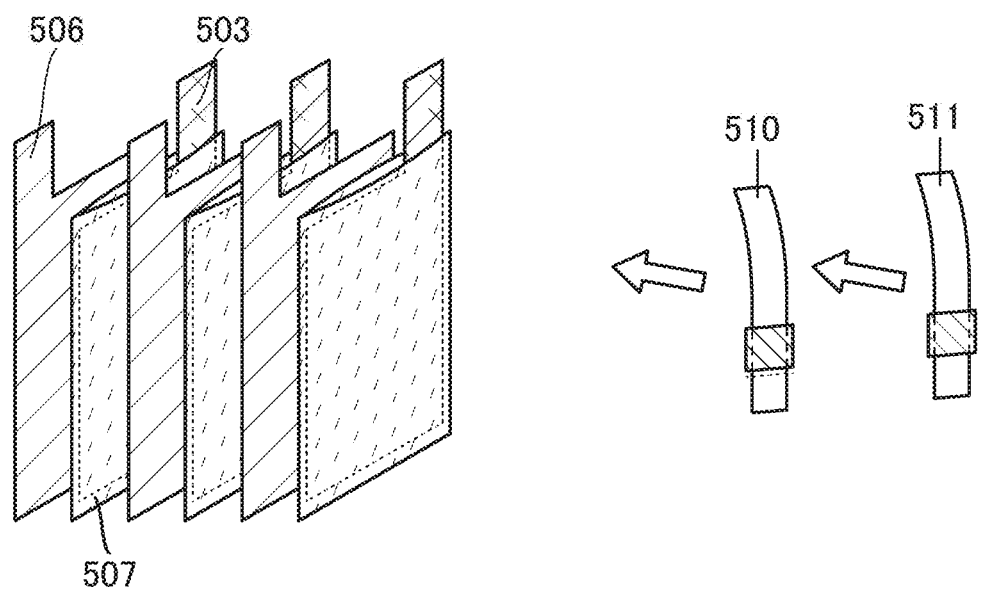
FIGS. 10A and 10B illustrate a method for fabricating a storage battery.
Figure 10B:
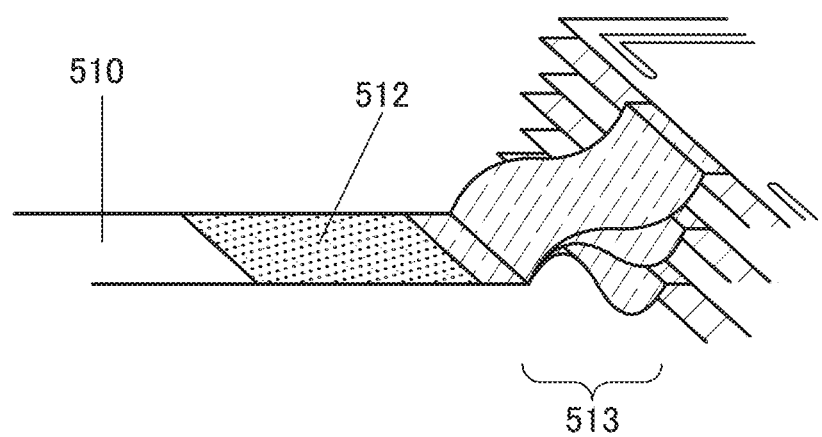

FIGS. 10A and 10B illustrate an example where current collectors are welded to a lead electrode. As illustrated in FIG. 10A, the positive electrodes 503 each wrapped by the separator 507 and the negative electrodes 506 are alternately stacked. Then, the positive electrode current collectors 501 are welded to a positive electrode lead electrode 510, and the negative electrode current collectors 504 are welded to a negative electrode lead electrode 511. FIG. 10B illustrates an example in which the positive electrode current collectors 501 are welded to the positive electrode lead electrode 510. The positive electrode current collectors 501 are welded to the positive electrode lead electrode 510 in a welding region 512 by ultrasonic welding or the like. The positive electrode current collector 501 includes a bent portion 513 as illustrated in FIG. 10B, and it is therefore possible to relieve stress due to external force applied after manufacturing the storage battery 500. The reliability of the storage battery 500 can be thus increased.

In the storage battery 500 illustrated in FIG. 7 and FIGS. 8A and 8B, the positive electrode current collectors 501 in the positive electrode 503 and the negative electrode current collectors 504 in the negative electrode 506 are welded to the positive electrode lead electrode 510 and a negative electrode lead electrode 511, respectively, by ultrasonic welding. The positive electrode current collector 501 and the negative electrode current collector 504 can double as terminals for electrical contact with the outside. In that case, the positive electrode current collector 501 and the negative electrode current collector 504 may be arranged so that part of the positive electrode current collector 501 and part of the negative electrode current collector 504 are exposed to the outside of the exterior body 509 without using lead electrodes.

Figure 11:
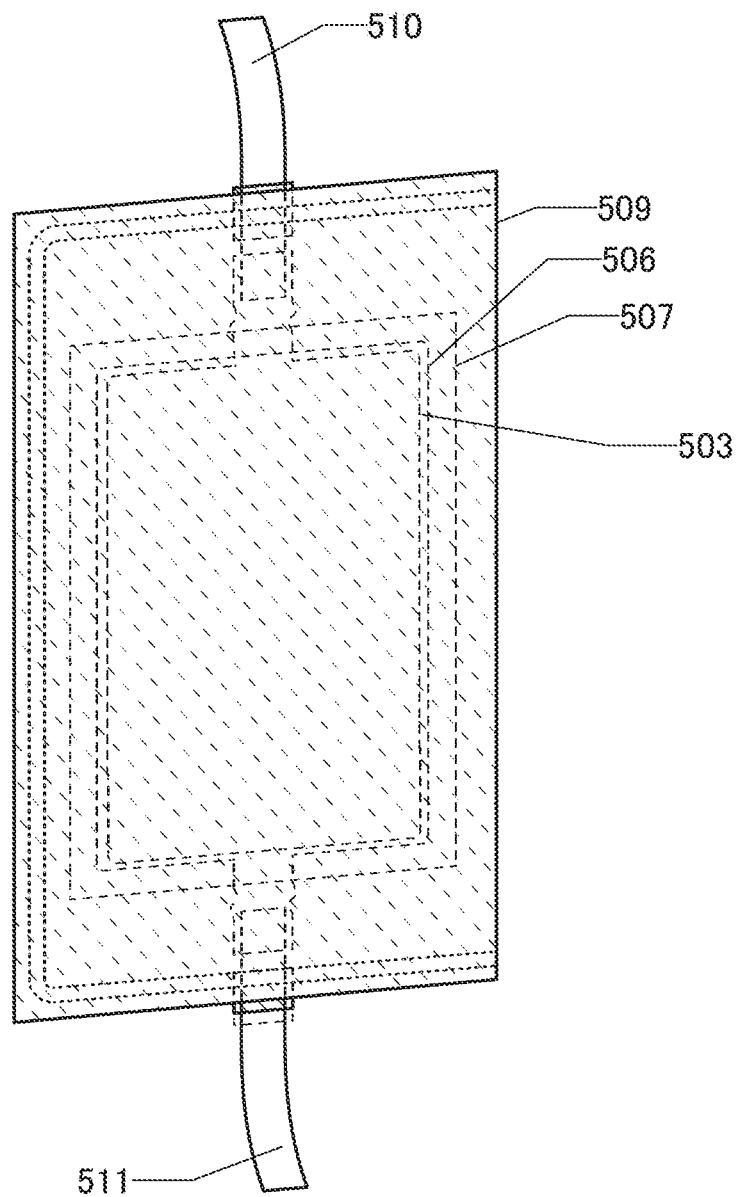
FIG. 11 illustrates a storage battery.

Although the positive electrode lead electrode 510 and the negative electrode lead electrode 511 are provided on the same side in FIG. 7, the positive electrode lead electrode 510 and the negative electrode lead electrode 511 may be provided on different sides as illustrated in FIG. 11. The lead electrodes of a storage battery of one embodiment of the present invention can be freely positioned as described above; therefore, the degree of freedom in design is high. Accordingly, a product including a storage battery of one embodiment of the present invention can have a high degree of freedom in design. Furthermore, a yield of products each including a storage battery of one embodiment of the present invention can be increased.

As the exterior body 509 in the storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

Although the examples in FIGS. 8A and 8B each include five positive electrode active material layer-negative electrode active material layer pairs (the positive and negative electrode active material layers of each pair face each other), it is needless to say that the number of pairs of electrodes is not limited to five, and may be more than five or less than five. In the case of using a large number of electrodes, the storage battery can have a high capacity. In contrast, in the case of using a small number of electrodes, the storage battery can have a small thickness and high flexibility.

In the above structure, the exterior body 509 of the secondary battery can change its form such that the smallest curvature radius is greater than or equal to 3 mm and less than or equal to 30 mm, preferably greater than or equal to 3 mm and less than or equal to 10 mm. One or two films are used as the exterior body of the secondary battery. In the case of a secondary battery having a layered structure, a cross-sectional structure of the battery that is bent is surrounded by two curves of the film serving as the exterior body.

Figure 12A:
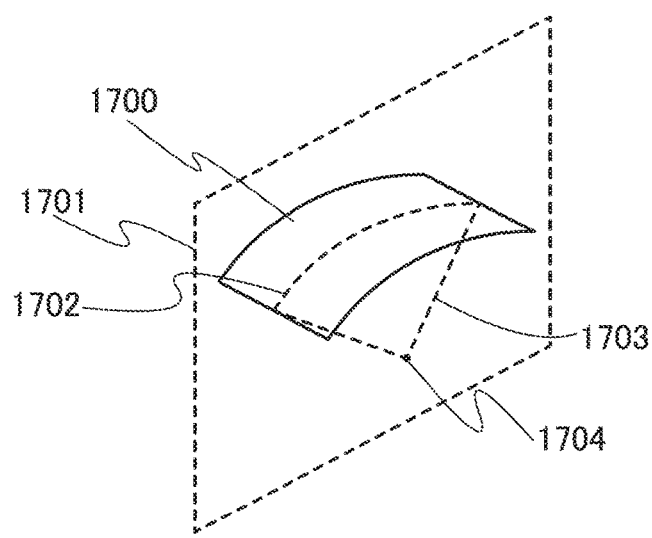
FIGS. 12A to 12C illustrate a radius of curvature of a surface.
Figure 12B:
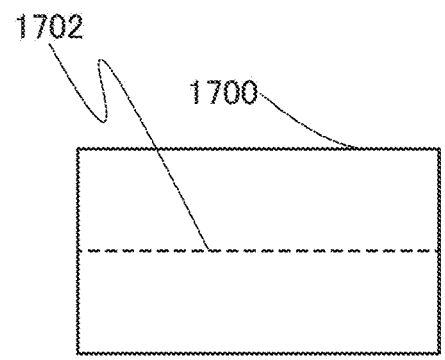
Figure 12C:
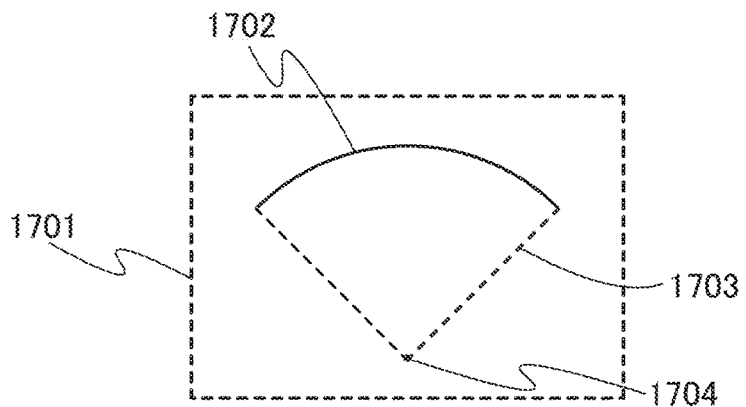

Description will be given of the radius of curvature of a surface with reference to FIGS. 12A to 12C. In FIG. 12A, on a plane 1701 along which a curved surface 1700 is cut, part of a curve 1702 of the curved surface 1700 is approximate to an arc of a circle, and the radius of the circle is referred to as a radius 1703 of curvature and the center of the circle is referred to as a center 1704 of curvature. FIG. 12B is a top view of the curved surface 1700. FIG. 12C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

In the case of bending a secondary battery in which a component 1805 including electrodes, an electrolyte solution, and the like is sandwiched between two films as exterior bodies, a radius 1802 of curvature of a film 1801 close to a center 1800 of curvature of the secondary battery is smaller than a radius 1804 of curvature of a film 1803 far from the center 1800 of curvature (FIG. 13A). When the secondary battery is curved and has an arc-shaped cross section, compressive stress is applied to a surface of the film on the side closer to the center 1800 of curvature and tensile stress is applied to a surface of the film on the side further from the center 1800 of curvature (FIG. 13B). However, by forming a pattern including projections or depressions on surfaces of the exterior bodies, the influence of a strain can be reduced to be acceptable even when compressive stress and tensile stress are applied. For this reason, the secondary battery can change its form such that the exterior body on the side closer to the center of curvature has the smallest curvature radius greater than or equal to 3 mm and less than or equal to 30 mm, preferably greater than or equal to 3 mm and less than or equal to 10 mm.

Note that the cross-sectional shape of the secondary battery is not limited to a simple arc shape, and the cross section can be partly arc-shaped; for example, a shape illustrated in FIG. 13C, a wavy shape illustrated in FIG. 13D, or an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has the smallest curvature radius, for example, greater than or equal to 3 mm and less than or equal to 30 mm, preferably greater than or equal to 3 mm and less than or equal to 10 mm.

Next, a variety of examples of the stack of the positive electrode, the negative electrode, and the separator will be described.

Figure 16A:
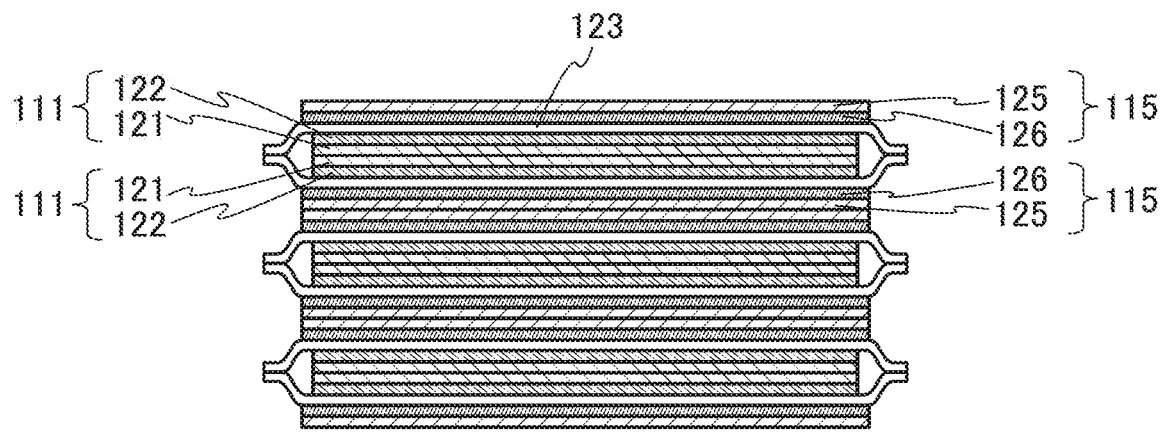
FIGS. 16A to 16C each illustrate part of a cross-sectional view of a storage battery.

FIG. 16A illustrates an example where six positive electrodes 111 and six negative electrodes 115 are stacked. One surface of a positive electrode current collector 121 included in a positive electrode 111 is provided with a positive electrode active material layer 122. One surface of a negative electrode current collector 125 included in a negative electrode 115 is provided with a negative electrode active material layer 126.

In the structure illustrated in FIG. 16A, the positive electrodes 111 and the negative electrodes 115 are stacked so that surfaces of the positive electrodes 111 on each of which the positive electrode active material layer 122 is not provided are in contact with each other and that surfaces of the negative electrodes 115 on each of which the negative electrode active material layer 126 is not provided are in contact with each other. When the positive electrodes 111 and the negative electrodes 115 are stacked in this manner, contact surfaces between metals can be formed; specifically, the surfaces of the positive electrodes 111 on each of which the positive electrode active material layer 122 is not provided can be in contact with each other, and the surfaces of the negative electrodes 115 on each of which the negative electrode active material layer 126 is not provided can be in contact with each other. The coefficient of friction of the contact surface between metals can be lower than that of a contact surface between the active material and the separator.

Therefore, when the secondary battery is curved, the surfaces of the positive electrodes 111 on each of which the positive electrode active material layer 122 is not provided slide on each other, and the surfaces of the negative electrodes 115 on each of which the negative electrode active material layer 126 is not provided slide on each other; thus, the stress due to the difference between the inner diameter and the outer diameter of a curved portion can be relieved. Here, the inner diameter of the curved portion refers to the radius of curvature of the inner surface of the curved portion in the exterior body 509 of the storage battery 500 in the case where the storage battery 500 is curved, for example. Therefore, the deterioration of the storage battery 500 can be inhibited. Furthermore, the storage battery 500 can have high reliability.

Figure 16B:
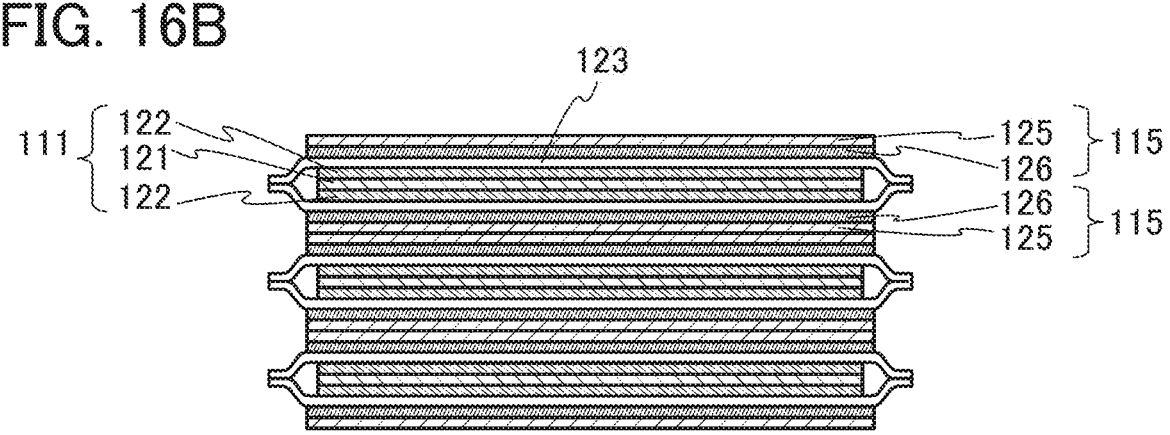

FIG. 16B illustrates an example of a stack of the positive electrodes 111 and the negative electrodes 115 which is different from that in FIG. 16A. The structure illustrated in FIG. 16B is different from that in FIG. 16A in that the positive electrode active material layers 122 are provided on both surfaces of the positive electrode current collector 121. When the positive electrode active material layers 122 are provided on both the surfaces of the positive electrode current collector 121 as illustrated in FIG. 16B, the capacity per unit volume of the storage battery 500 can be increased.

Figure 16C:
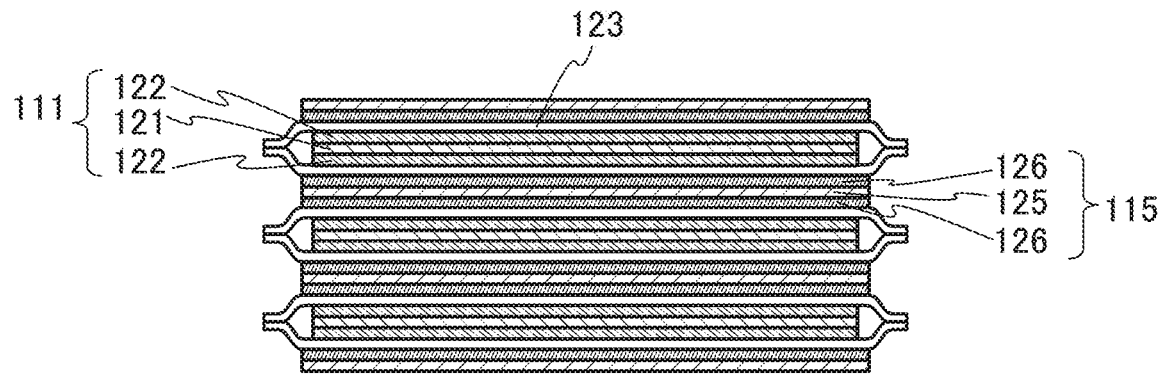

FIG. 16C illustrates an example of a stack of the positive electrodes 111 and the negative electrodes 115 which is different from that in FIG. 16B. The structure illustrated in FIG. 16C is different from that in FIG. 16B in that the negative electrode active material layers 126 are provided on both surfaces of the negative electrode current collector 125. When the negative electrode active material layers 126 are provided on both the surfaces of the negative electrode current collector 125 as illustrated in FIG. 16C, the capacity per unit volume of the storage battery 500 can be further increased.

Figure 17A:
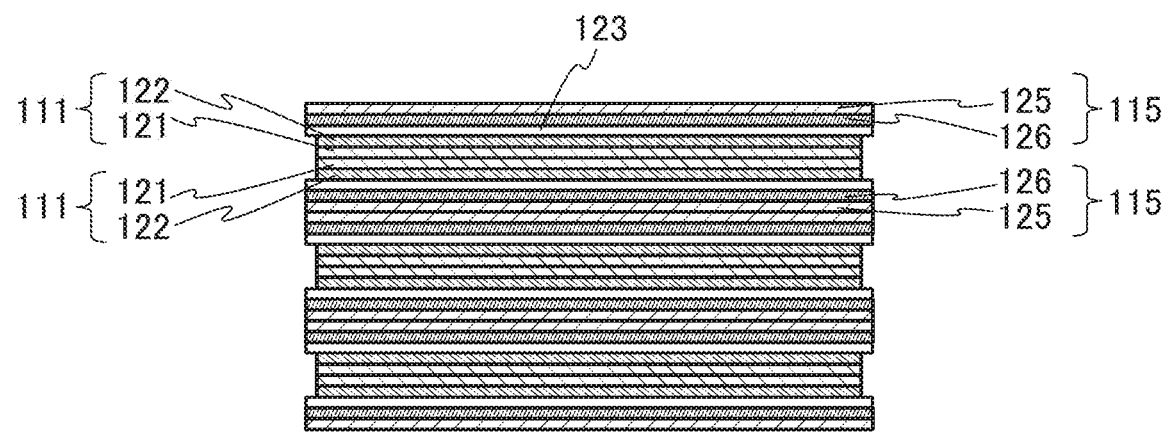
FIGS. 17A and 17B each illustrate part of a cross-sectional view of a storage battery.

In the structures illustrated in FIGS. 16A to 16C, a separator 123 has a bag-like shape by which the positive electrodes 111 are surrounded; however, one embodiment of the present invention is not limited thereto. FIG. 17A illustrates an example in which the separator 123 has a different structure from that in FIG. 16A. The structure illustrated in FIG. 17A is different from that in FIG. 16A in that the separator 123, which is sheet-like, is provided between every pair of the positive electrode active material layer 122 and the negative electrode active material layer 126. In the structure illustrated in FIG. 17A, six positive electrodes 111 and six negative electrodes 115 are stacked, and six separators 123 are provided.

Figure 17B:
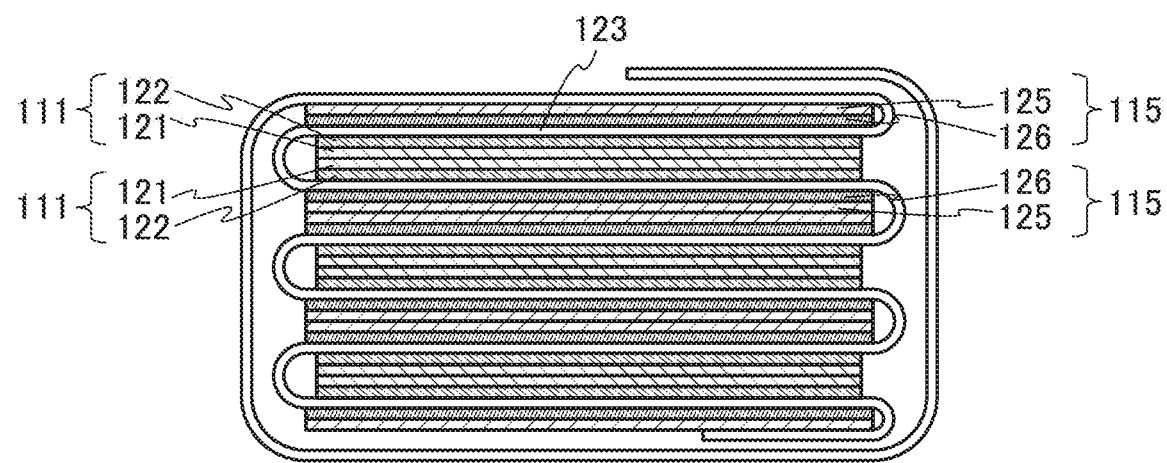

FIG. 17B illustrates an example in which the separator 123 different from that in FIG. 17A is provided. The structure illustrated in FIG. 17B is different from that in FIG. 17A in that one sheet of separator 123 is folded more than once to be interposed between every pair of the positive electrode active material layer 122 and the negative electrode active material layer 126. It can be said that the structure illustrated in FIG. 17B is a structure in which the separators 123 in the respective layers which are illustrated in FIG. 17A are extended and connected together between the layers. In the structure of FIG. 17B, six positive electrodes 111 and six negative electrodes 115 are stacked and thus the separator 123 needs to be folded at least five times. The separator 123 is not necessarily provided so as to be interposed between every pair of the positive electrode active material layer 122 and the negative electrode active material layer 126, and the plurality of positive electrodes 111 and the plurality of negative electrodes 115 may be bound together by extending the separator 123.

Figure 18A:
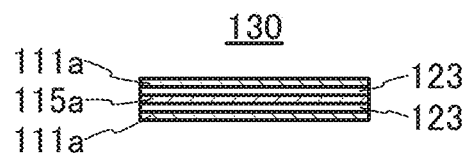
FIGS. 18A to 18C illustrate parts of a cross-sectional view of a storage battery.
Figure 18B:
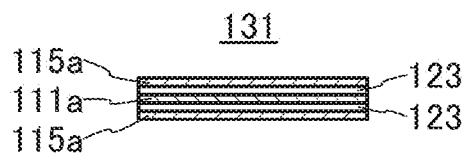
Figure 18C:
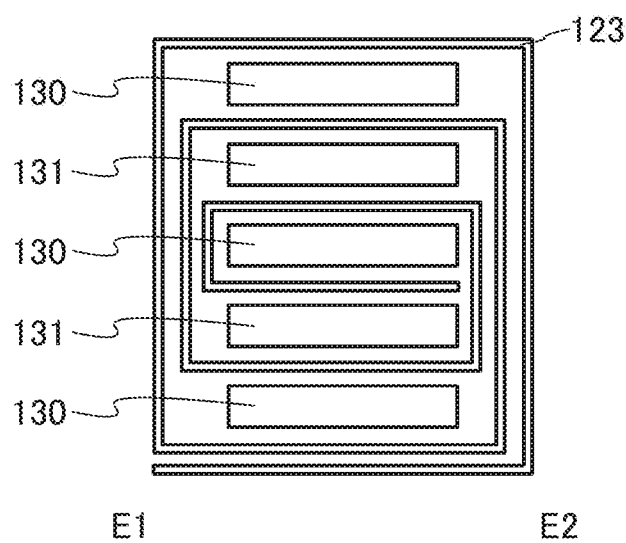

Note that the positive electrode, the negative electrode, and the separator may be stacked as illustrated in FIGS. 18A to 18C. FIG. 18A is a cross-sectional view of a first electrode assembly 130, and FIG. 18B is a cross-sectional view of a second electrode assembly 131. FIG. 18C is a cross-sectional view taken along the dashed-dotted line A1-A2 in FIG. 7. In FIG. 18C, the first electrode assembly 130, the second electrode assembly 131, and the separator 123 are selectively illustrated for the sake of clarity.

As illustrated in FIG. 18C, the storage battery 500 includes a plurality of first electrode assemblies 130 and a plurality of second electrode assemblies 131.

As illustrated in FIG. 18A, in each of the first electrode assemblies 130, a positive electrode 111a including the positive electrode active material layers 122 on both surfaces of a positive electrode current collector 121, the separator 123, a negative electrode 115a including the negative electrode active material layers 126 on both surfaces of a negative electrode current collector 125, the separator 123, and the positive electrode 111a including the positive electrode active material layers 122 on both surfaces of the positive electrode current collector 121 are stacked in this order. As illustrated in FIG. 18B, in each of the second electrode assemblies 131, the negative electrode 115a including the negative electrode active material layers 126 on both surfaces of the negative electrode current collector 125, the separator 123, the positive electrode 111a including the positive electrode active material layers 122 on both surfaces of the positive electrode current collector 121, the separator 123, and the negative electrode 115a including the negative electrode active material layers 126 on both surfaces of the negative electrode current collector 125 are stacked in this order.

As illustrated in FIG. 18C, the plurality of first electrode assemblies 130 and the plurality of second electrode assemblies 131 are covered with the wound separator 123.

[Coin-Type Storage Battery]

Figure 14A:
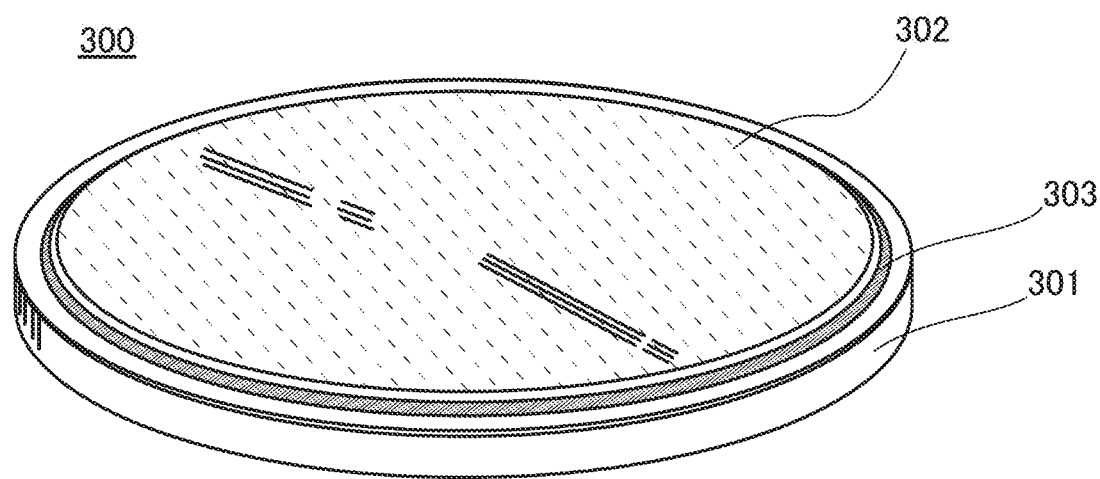
FIGS. 14A and 14B illustrate a coin-type storage battery.
Figure 14B:
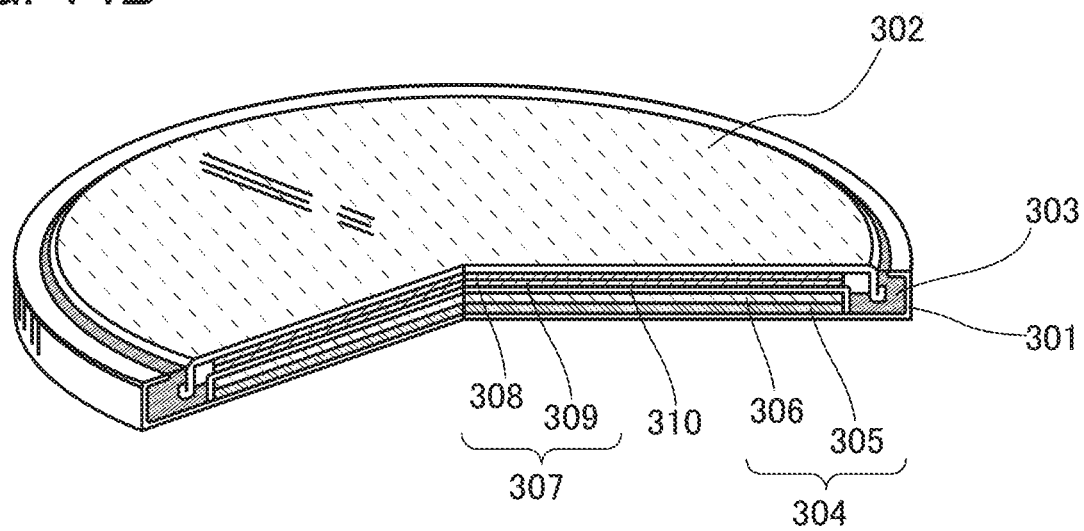

Next, an example of a coin-type storage battery will be described as an example of a power storage device with reference to FIGS. 14A and 14B. FIG. 14A is an external view of a coin-type (single-layer flat type) storage battery, and FIG. 14B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305.

A negative electrode 307 includes a negative electrode current collector 308 and a negative electrode active material layer 309 provided in contact with the negative electrode current collector 308.

The description of the positive electrode 503 can be referred to for the positive electrode 304. The description of the positive electrode active material layer 502 can be referred to for the positive electrode active material layer 306. The description of the negative electrode 506 can be referred to for the negative electrode 307. The description of the negative electrode active material layer 505 can be referred to for the negative electrode active material layer 309. The description of the separator 507 can be referred to for a separator 310. The description of the electrolyte solution 508 can be referred to for the electrolyte solution.

Note that only one surface of each of the positive electrode 304 and the negative electrode 307 used for the coin-type storage battery 300 is provided with an active material layer.

For the positive electrode can 301 and the negative electrode can 302, a metal having a corrosion-resistant property to an electrolyte solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolyte solution. The positive electrode can 301 and the negative electrode can 302 are electrically connected to the positive electrode 304 and the negative electrode 307, respectively.

The negative electrode 307, the positive electrode 304, and the separator 310 are immersed in the electrolyte solution. Then, as illustrated in FIG. 14B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

[Cylindrical Storage Battery]

Figure 15A:
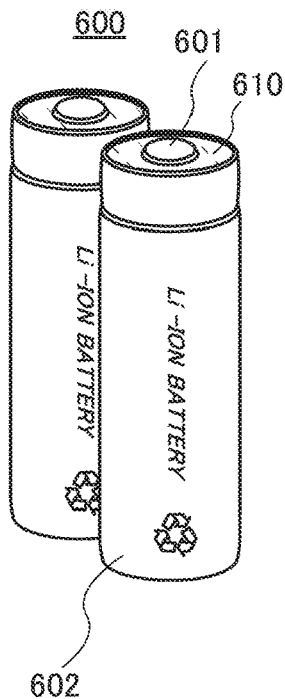
FIGS. 15A and 15B illustrate a cylindrical storage battery.

Next, an example of a cylindrical storage battery will be described as an example of a power storage device with reference to FIGS. 15A and 15B. As illustrated in FIG. 15A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 15B:
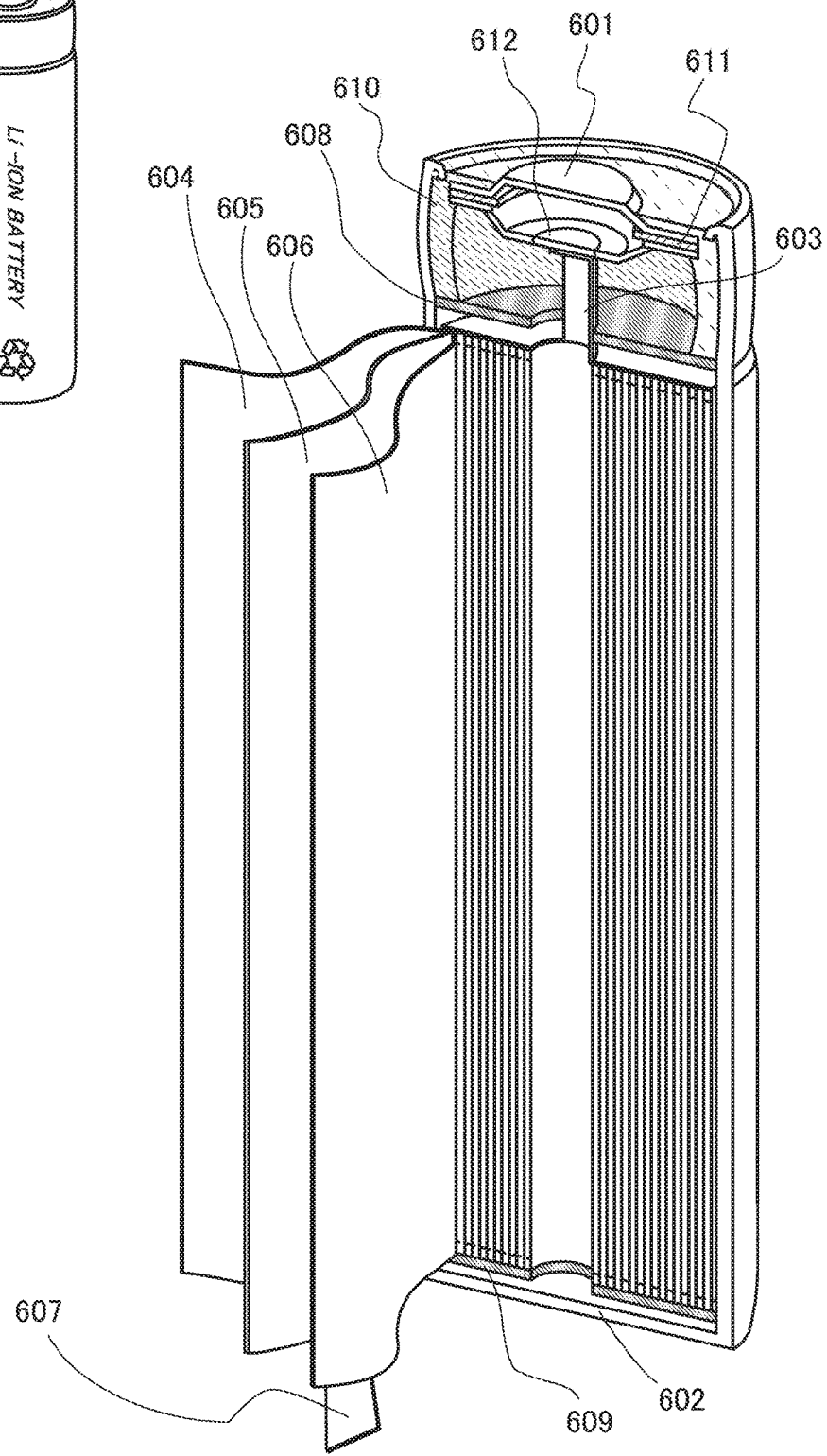

FIG. 15B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a separator 605 interposed therebetween is provided. Although not illustrated, the battery element is wound around a center pin. One end of the battery can 602 is closed and the other end thereof is open. For the battery can 602, a metal having a corrosion-resistant property to an electrolyte solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolyte solution. Inside the battery can 602, the battery element in which the positive electrode, the negative electrode, and the separator are wound is provided between a pair of insulating plates 608 and 609 which face each other. Furthermore, a non-aqueous electrolyte solution (not illustrated) is injected inside the battery can 602 provided with the battery element. As the nonaqueous electrolyte solution, a nonaqueous electrolyte solution that is similar to those of the coin-type storage battery can be used.

The description of the positive electrode 503 can be referred to for the positive electrode 604. The description of the negative electrode 506 can be referred to for the negative electrode 606. The description of the method for fabricating an electrode that is described in Embodiment 1 can be referred to for the positive electrode 604 and the negative electrode 606. Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

In the case where an electrode is wound as in the cylindrical storage battery illustrated in FIGS. 15A and 15B, a great stress is caused at the time of winding the electrode. In addition, an outward stress from an axis of winding is applied to the electrode all the time in the case where a wound body of the electrode is provided in a housing. However, the active material can be prevented from being cleaved even when such a great stress is applied to the electrode.

Note that in this embodiment, the coin-type storage battery, the cylindrical storage battery, and the thin storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or a structure in which a positive electrode, a negative electrode, and a separator are wound may be employed. For example, FIGS. 19A to 19C, FIGS. 20A to 20C, FIGS. 21A and 21B, FIGS. 22A-1, 22A-2, 22B-1, and 22B-2, and FIGS. 23A and 23B illustrate examples of other storage batteries.

[Structure Example of Thin Storage Battery]

FIGS. 19A to 19C and FIGS. 20A to 20C illustrate structure examples of thin storage batteries. A wound body 993 illustrated in FIG. 19A includes a negative electrode 994, a positive electrode 995, and a separator 996.

The wound body 993 is obtained by winding a sheet of a stack in which the negative electrode 994 overlaps with the positive electrode 995 with the separator 996 therebetween. The wound body 993 is covered with a rectangular sealed container or the like; thus, a rectangular secondary battery is fabricated.

Note that the number of stacks each including the negative electrode 994, the positive electrode 995, and the separator 996 is determined as appropriate depending on capacity and element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 19A:
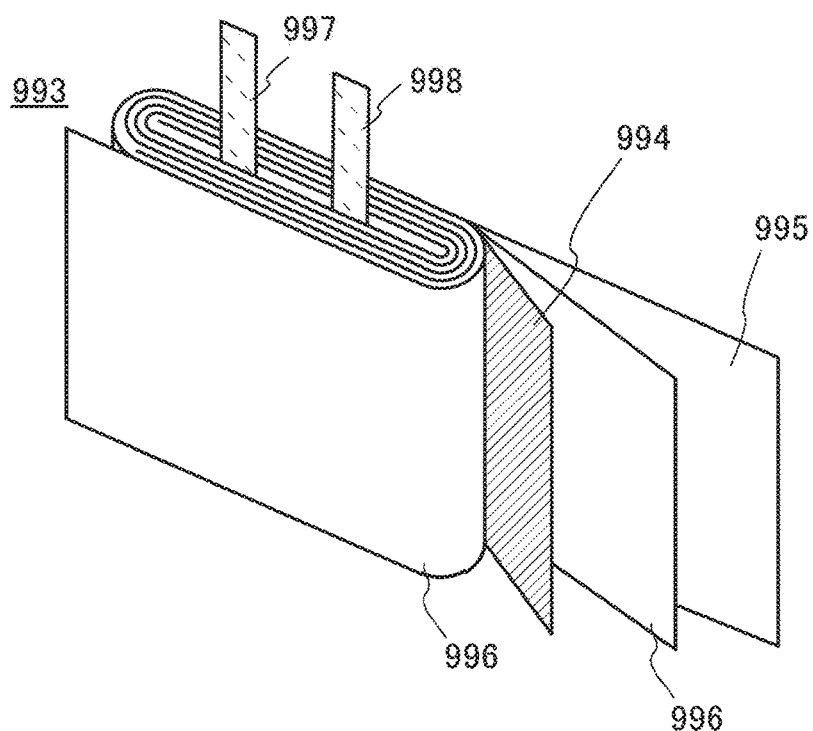
FIGS. 19A to 19C illustrate an example of a storage battery.
Figure 19B:
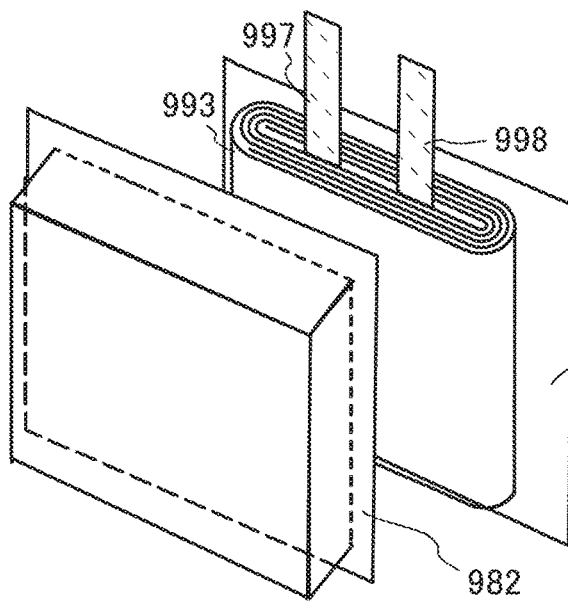
Figure 19C:
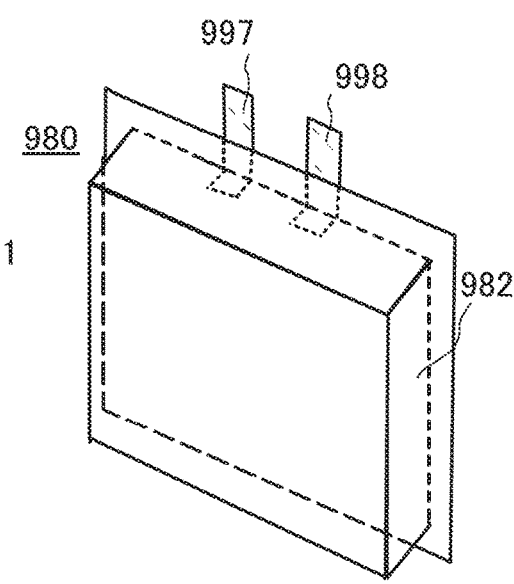

In a storage battery 990 illustrated in FIGS. 19B and 19C, the wound body 993 is packed in a space formed by bonding a film 981 and a film 982 having a depressed portion that serve as exterior bodies by thermocompression bonding or the like. The wound body 993 includes the lead electrode 997 and the lead electrode 998, and is soaked in an electrolyte solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be fabricated.

Although FIGS. 19B and 19C illustrate an example where a space is formed by two films, the wound body 993 may be placed in a space formed by bending one film.

Furthermore, in fabricating a flexible power storage device, a resin material or the like can be used for an exterior body and a sealed container of the power storage device. Note that in the case where a resin material is used for the exterior body and the sealed container, a conductive material is used for a portion connected to the outside.

For example, FIGS. 20A to 20C illustrate another example of a flexible thin storage battery. The wound body 993 illustrated in FIG. 20A is the same as that illustrated in FIG. 19A, and the detailed description thereof is omitted.

In the storage battery 990 illustrated in FIGS. 20B and 20C, the wound body 993 is packed in an exterior body 991. The wound body 993 includes the lead electrode 997 and the lead electrode 998, and is soaked in an electrolyte solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible thin storage battery can be fabricated.

When the electrode including the active material of one embodiment of the present invention is used in the flexible thin storage battery, the active material can be prevented from being cleaved even if a stress caused by repeated bending of the thin storage battery is applied to the electrode.

When the active material in which at least part of the cleavage plane is covered with graphene is used for an electrode as described above, a decrease in the voltage and discharge capacity of a battery can be prevented. Accordingly, the charge-discharge cycle characteristics of the battery can be improved.

[Structure Example of Power Storage System]

Structure examples of power storage systems will be described with reference to FIGS. 21A and 21B, FIGS. 22A-1, 22A-2, 22B-1, and 22B-2, and FIGS. 23A and 23B. Here, a power storage system refers to, for example, a device including a power storage device.

Figure 21A:
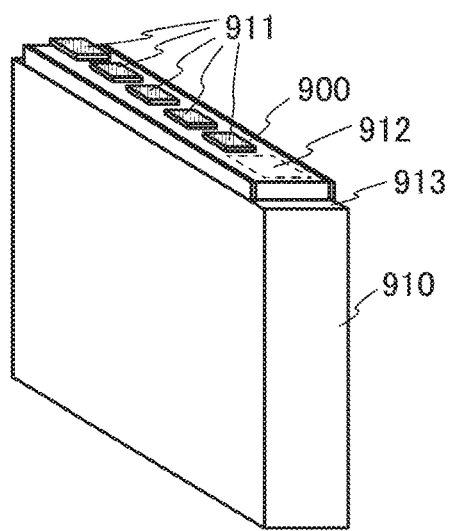
FIGS. 21A and 21B illustrate an example of a power storage system.
Figure 21B:
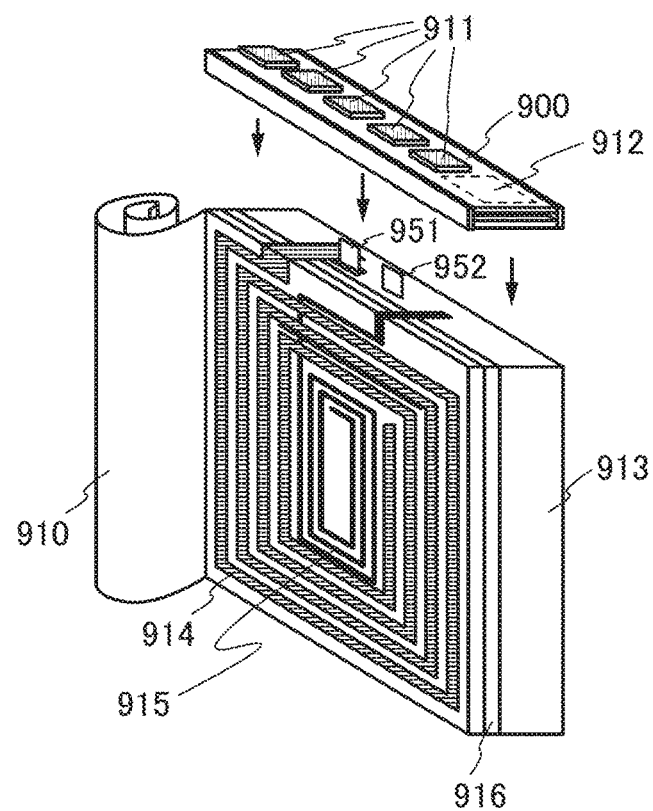

FIGS. 21A and 21B are external views of a power storage system. The power storage system includes a circuit board 900 and a storage battery 913. A label 910 is attached to the storage battery 913. As shown in FIG. 21B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 may have a function of blocking an electromagnetic field by the storage battery 913. As the layer 916, for example, a magnetic body can be used.

Note that the structure of the power storage system is not limited to that shown in FIGS. 21A and 21B.

For example, as shown in FIGS. 22A-1 and 22A-2, two opposite surfaces of the storage battery 913 in FIGS. 21A and 21B may be provided with respective antennas. FIG. 22A-1 is an external view showing one side of the opposite surfaces, and FIG. 22A-2 is an external view showing the other side of the opposite surfaces. For portions similar to those in FIGS. 21A and 21B, the description of the power storage system illustrated in FIGS. 21A and 21B can be referred to as appropriate.

As illustrated in FIG. 22A-1, the antenna 914 is provided on one of the opposite surfaces of the storage battery 913 with the layer 916 interposed therebetween, and as illustrated in FIG. 22A-2, the antenna 915 is provided on the other of the opposite surfaces of the storage battery 913 with a layer 917 interposed therebetween. The layer 917 has a function of blocking an electromagnetic field by the storage battery 913, for example. As the layer 917, for example, a magnetic body can be used.

With the above structure, both of the antennas 914 and 915 can be increased in size.

Alternatively, as illustrated in FIGS. 22B-1 and 22B-2, two opposite surfaces of the storage battery 913 in FIGS. 21A and 21B may be provided with different types of antennas. FIG. 22B-1 is an external view showing one side of the opposite surfaces, and FIG. 22B-2 is an external view showing the other side of the opposite surfaces. For portions similar to those in FIGS. 21A and 21B, the description of the power storage system illustrated in FIGS. 21A and 21B can be referred to as appropriate.

As illustrated in FIG. 22B-1, the antennas 914 and 915 are provided on one of the opposite surfaces of the storage battery 913 with the layer 916 interposed therebetween, and as illustrated in FIG. 22B-2, an antenna 918 is provided on the other of the opposite surfaces of the storage battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage system and another device, a response method that can be used between the power storage system and another device, such as NFC, can be employed.

Figure 23A:
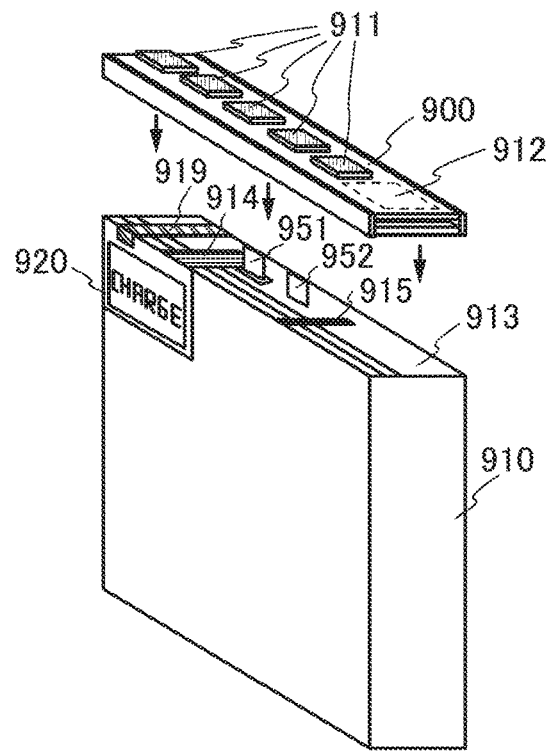
FIGS. 23A and 23B illustrate examples of power storage systems.

Alternatively, as illustrated in FIG. 23A, the storage battery 913 in FIGS. 21A and 21B may be provided with a display device 920. The display device 920 is electrically connected to the terminal 911 via a terminal 919. It is possible that the label 910 is not provided in a portion where the display device 920 is provided. For portions similar to those in FIGS. 21A and 21B, the description of the power storage system illustrated in FIGS. 21A and 21B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 23B:
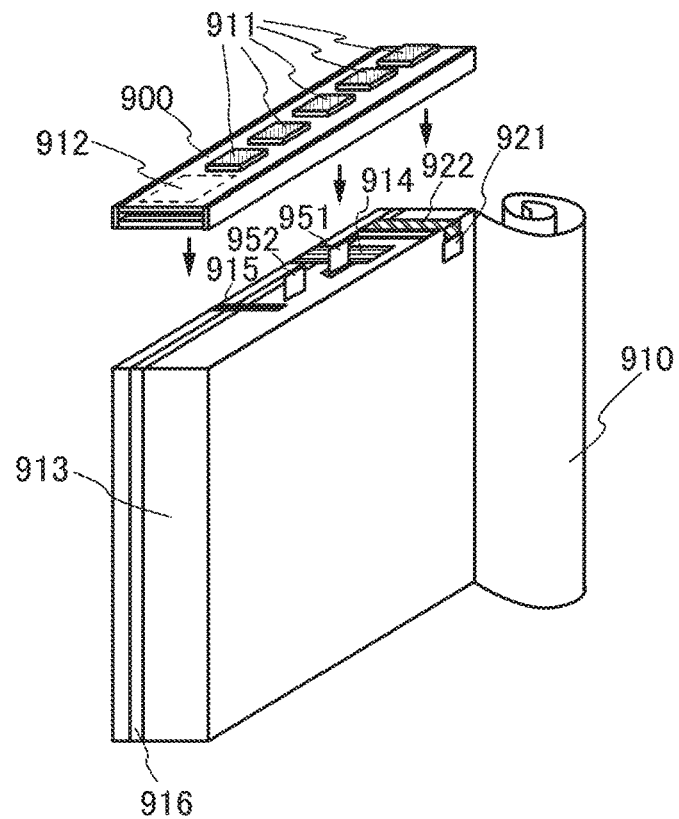

Alternatively, as illustrated in FIG. 23B, the storage battery 913 illustrated in FIGS. 21A and 21B may be provided with a sensor 921. The sensor 921 is electrically connected to the terminal 911 via a terminal 922. For portions similar to those in FIGS. 21A and 21B, the description of the power storage system illustrated in FIGS. 21A and 21B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage system is placed can be determined and stored in a memory inside the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

This embodiment can be combined with any of the other embodiments as appropriate.

Embodiment 5

To show structures in each of which the electrode of one embodiment of the present invention is available, this embodiment will describe examples of electronic devices each including a flexible storage battery.

FIGS. 24A to 24G illustrate examples of electronic devices including the flexible power storage devices described in Embodiment 4. Examples of electronic devices each including a flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

FIG. 24A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

FIG. 24B illustrates the mobile phone 7400 that is bent. When the whole mobile phone 7400 is bent by the external force, the power storage device 7407 included in the mobile phone 7400 is also bent. FIG. 24C illustrates the bent power storage device 7407. The power storage device 7407 is a thin storage battery. The power storage device 7407 is fixed in a state of being bent. Note that the power storage device 7407 includes a lead electrode 7408 electrically connected to a current collector 7409. The current collector 7409 is, for example, copper foil, and partly alloyed with gallium; thus, adhesion between the current collector 7409 and an active material layer in contact with the current collector 7409 is improved and the power storage device 7407 can have high reliability even in a state of being bent.

FIG. 24D illustrates an example of a bangle display device. A portable display device 7100 includes a housing 7101, a display portion 7102, an operation button 7103, and a power storage device 7104. FIG. 24E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm inclusive. When the radius of curvature at the main surface of the power storage device 7104 is greater than or equal to 40 mm and less than or equal to 150 mm, the reliability can be kept high.

FIG. 24F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with a power storage device including the electrode of one embodiment of the present invention. For example, the power storage device 7104 illustrated in FIG. 24E that is in the state of being curved can be provided in the housing 7201. Alternatively, the power storage device 7104 illustrated in FIG. 24E can be provided in the band 7203 such that it can be curved.

The portable information terminal 7200 preferably includes a sensor. As the sensor, for example a human body sensor such as a fingerprint sensor, a pulse sensor, or a temperature sensor, a touch sensor, a pressure sensitive sensor, an acceleration sensor, or the like is preferably mounted.

FIG. 24G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

This embodiment can be combined with any of the other embodiments as appropriate.

Embodiment 6

In this embodiment, examples of electronic devices that can include power storage devices will be described.

Figure 25A:
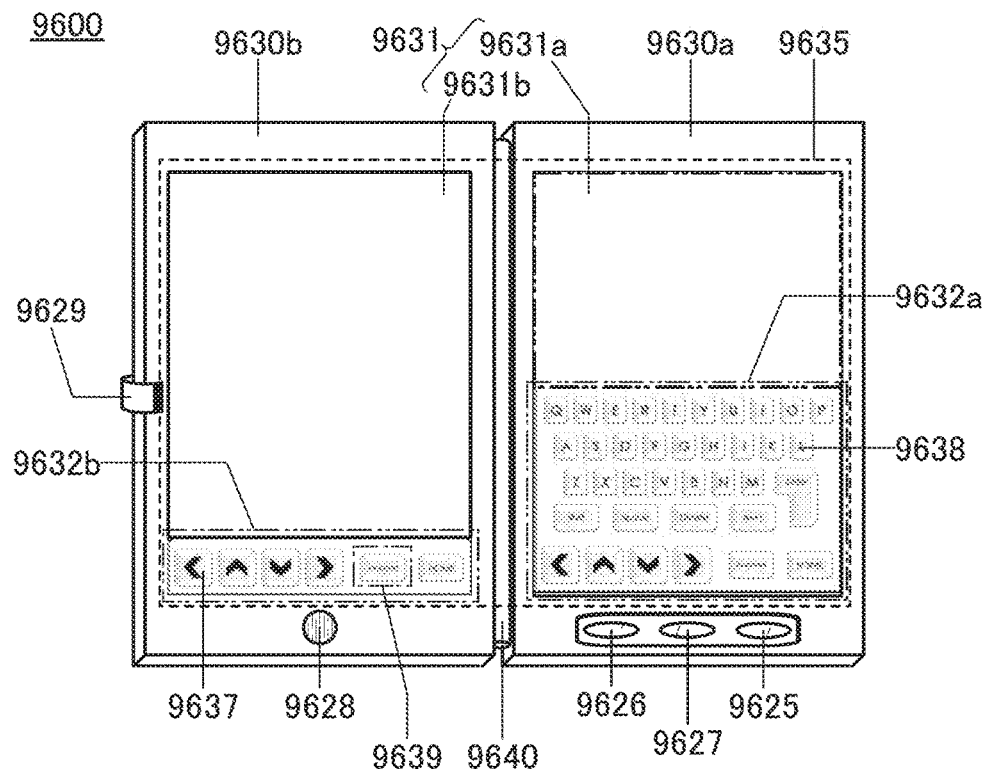
FIGS. 25A to 25C illustrate an example of an electronic device.
Figure 25B:
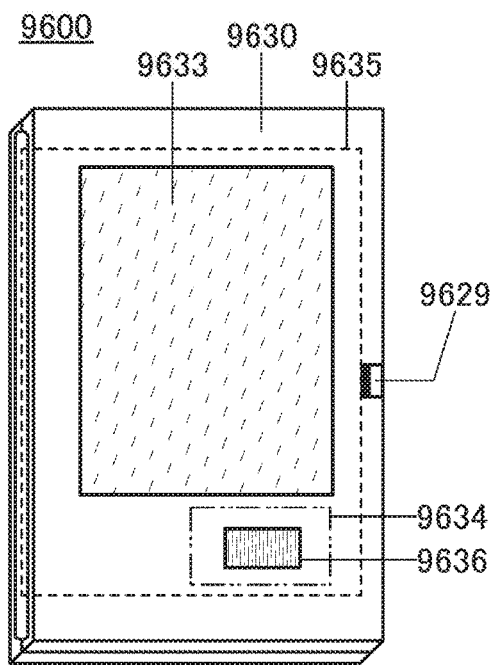

FIGS. 25A and 25B illustrate an example of a tablet terminal that can be folded in half. A tablet terminal 9600 illustrated in FIGS. 25A and 25B includes a housing 9630*a*, a housing 9630*b*, a movable portion 9640 connecting the housings 9630*a* and 9630*b*, a display portion 9631 including a display portion 9631*a* and a display portion 9631*b*, a display mode changing switch 9626, a power switch 9627, a power saving mode changing switch 9625, a fastener 9629, and an operation switch 9628. FIG. 25A illustrates the tablet terminal 9600 that is opened, and FIG. 25B illustrates the tablet terminal 9600 that is closed.

The tablet terminal 9600 includes a power storage unit 9635 inside the housings 9630*a* and 9630*b*. The power storage unit 9635 is provided across the housings 9630*a* and 9630*b*, passing through the movable portion 9640.

Part of the display portion 9631*a* can be a touch panel region 9632*a*, and data can be input by touching operation keys 9638 that are displayed. Note that half of the area of the display portion 9631*a* has only a display function and the other half of the area has a touch panel function. However, the structure of the display portion 9631*a* is not limited to this, and all the area of the display portion 9631*a* may have a touch panel function. For example, all the area of the display portion 9631*a* can display a keyboard and serve as a touch panel while the display portion 9631*b* can be used as a display screen.

In the display portion 9631*b*, as in the display portion 9631*a*, part of the display portion 9631*b* can be a touch panel region 9632*b*. When a keyboard display switching button 9639 displayed on the touch panel is touched with a finger, a stylus, or the like, a keyboard can be displayed on the display portion 9631*b*.

Touch input can be performed in the touch panel region 9632*a* and the touch panel region 9632*b* at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope sensor or an acceleration sensor, may be incorporated in the tablet terminal.

Although the display portion 9631*a* and the display portion 9631*b* have the same display area in FIG. 25A, one embodiment of the present invention is not limited to this example. The display portion 9631*a* and the display portion 9631*b* may have different display areas or different display quality. For example, one of the display portions 9631*a* and 9631*b* may display higher definition images than the other.

The tablet terminal is closed in FIG. 25B. The tablet terminal includes a housing 9630, a solar cell 9633, and a charge and discharge control circuit 9634 including a DCDC converter 9636. The power storage unit of one embodiment of the present invention is used as the power storage unit 9635.

The tablet terminal 9600 can be folded such that the housings 9630*a* and 9630*b* overlap with each other when not in use. Thus, the display portions 9631*a* and 9631*b* can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 25A and 25B can also have a function of displaying various types of data (e.g., a still image, a moving image, and a text image), a function of displaying a calendar, a date, or the time on the display portion, a touch-input function of operating or editing data displayed on the display portion by touch input, a function of controlling processing by various types of software (programs), and the like.

The solar cell 9633, which is attached on the surface of the tablet terminal, supplies electric power to a touch panel, a display portion, an image signal processing portion, and the like. Note that the solar cell 9633 can be provided on one or both surfaces of the housing 9630 and the power storage unit 9635 can be charged efficiently. The use of a lithium ion battery as the power storage unit 9635 brings an advantage such as reduction in size.

Figure 25C:
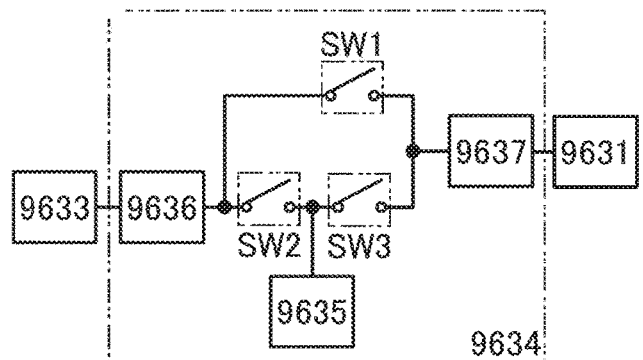

The structure and operation of the charge and discharge control circuit 9634 illustrated in FIG. 25B will be described with reference to a block diagram in FIG. 25C. The solar cell 9633, the power storage unit 9635, the DCDC converter 9636, a converter 9637, switches SW1 to SW3, and the display portion 9631 are illustrated in FIG. 25C, and the power storage unit 9635, the DCDC converter 9636, the converter 9637, and the switches SW1 to SW3 correspond to the charge and discharge control circuit 9634 in FIG. 25B.

First, an example of operation when electric power is generated by the solar cell 9633 using external light will be described. The voltage of electric power generated by the solar cell is raised or lowered by the DCDC converter 9636 to a voltage for charging the power storage unit 9635. When the display portion 9631 is operated with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 26:
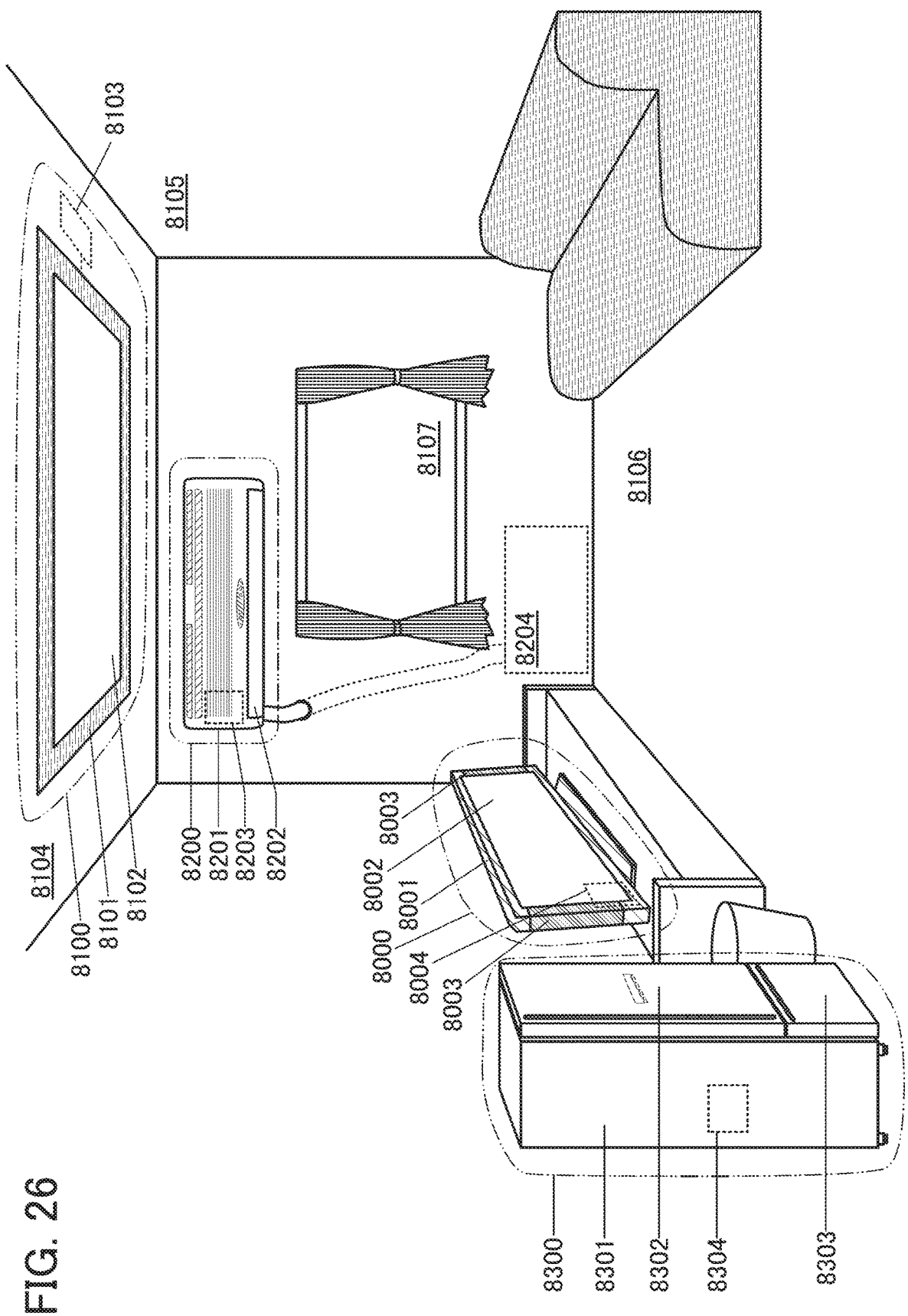
FIG. 26 illustrates examples of electronic devices.

FIG. 26 illustrates other examples of electronic devices. In FIG. 26, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can be operated with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 26, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 26 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can be operated with the use of power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 26 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 26, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 26 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 26 as an example, the power storage device of one embodiment of the present invention can be used in an air conditioner in which the functions of an indoor unit and an outdoor unit are integrated in one housing.

In FIG. 26, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 26. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

This embodiment can be implemented in combination with any of the other embodiments as appropriate.

Embodiment 7

In this embodiment, examples of vehicles using power storage devices will be described.

The use of power storage devices in vehicles enables production of next-generation clean energy vehicles such as hybrid electric vehicles (HEVs), electric vehicles (EVs), and plug-in hybrid electric vehicles (PHEVs).

Figure 27A:
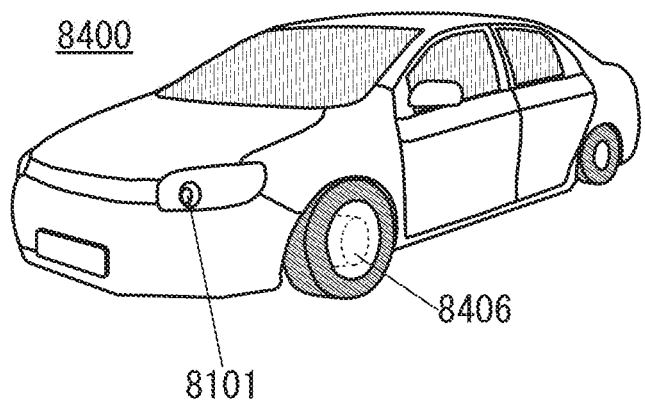
FIGS. 27A and 27B illustrate examples of electronic devices.
Figure 27B:
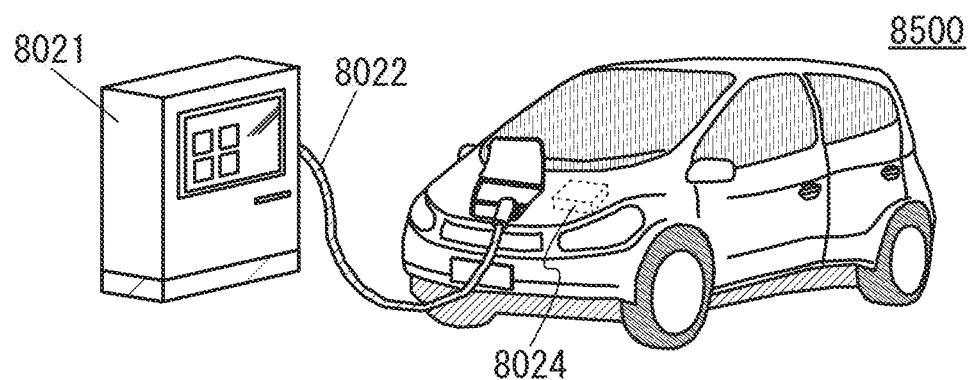

FIGS. 27A and 27B each illustrate an example of a vehicle using one embodiment of the present invention. An automobile 8400 illustrated in FIG. 27A is an electric vehicle that runs on the power of an electric motor. Alternatively, the automobile 8400 is a hybrid electric vehicle capable of driving appropriately using either an electric motor or an engine. One embodiment of the present invention can provide a high-mileage vehicle. The automobile 8400 includes the power storage device. The power storage device is used not only for driving an electric motor 8406, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 27B illustrates an automobile 8500 including the power storage device. The automobile 8500 can be charged when the power storage device is supplied with electric power through external charging equipment by a plug-in system, a contactless power feeding system, or the like. In FIG. 27B, a power storage device 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device 8024 included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the mileage. Furthermore, the power storage device included in the vehicle can be used as a power source for supplying electric power to products other than the vehicle. In such a case, the use of a commercial power source can be avoided at peak time of electric power demand.

This embodiment can be combined with any of the other embodiments as appropriate.

Example

In this example, characteristics of a power storage device which charges and discharges with the use of the electrode of one embodiment of the present invention are described.

As the electrode, an electrode M, an electrode N, and an electrode O were prepared.

<Synthesis of Particles Containing Lithium Manganese Nickel Oxide>

Lithium manganese nickel oxide was synthesized. As raw materials, $Li_2CO_3$, $MnCO_3$, and NiO were weighed so that the ratio (molar ratio) of $Li_2CO_3$ to $MnCO_3$ and NiO was 0.84:0.8062:0.318.

Then, the weighed raw materials were mixed. After that, heat treatment was performed at 1000° C. to synthesize lithium manganese nickel oxide. Subsequently, the obtained lithium manganese nickel oxide was subjected to crushing treatment with a bead mill.

Next, a surface of the obtained lithium manganese nickel oxide was covered by a graphene compound. First, water was added to graphene oxide to form a dispersion liquid. At this time, 160 ml of water was added to 5.2 g of graphene oxide, so that the concentration of the graphene oxide dispersion liquid became 32.5 g/l.

Next, to the formed graphene oxide dispersion liquid, the lithium manganese nickel oxide was added and mixed. To the dispersion liquid containing 5.2 g of graphene oxide, 260 g of lithium manganese nickel oxide was added. That is, the graphene oxide which accounts for 2% of the weight of the positive electrode active material was added. After that, heat treatment was performed at 50° C. under a reduced pressure, so that a sample A which is lithium manganese nickel oxide covered with graphene oxide was obtained.

Next, to reduce the graphene oxide, 240 g of the sample A, 40.5 g of ascorbic acid, 9.36 g of lithium hydroxide monohydrate, 1029 ml of ethanol, and 9.36 g of water were added and mixed. The obtained mixed solution was subjected to spray dry treatment, and a powder was collected from the mixed solution. After that, heat treatment was performed at 170° C. under a reduced pressure.

Through the above process, a particle B containing the lithium manganese nickel oxide was formed.

<Formation of Active Material Layer 212>

Next, slurry was formed. The formed particle B, acetylene black (AB), and PVdF were mixed at a ratio (weight ratio) of the particle B to AB and PVdF of 90:5:5, NMP was added thereto as a solvent, and kneading was performed. The proportion of the solid content in the slurry was 47 weight %.

Next, the slurry was applied to one surface of a current collector. Aluminum foil with a thickness of 20 μm whose both surfaces were subjected to undercoating was used as the current collector. After that, the solvent was volatilized at 65° C. and volatilized at 75° C.

Then, heat treatment was performed at 250° C. under a reduced pressure. After that, pressing was performed at 120° C. with a 1000 kN/m of pressure. Through the above process, the electrode O including the active material layer 212 on the current collector was formed.

<Synthesis of Graphene Compound>

Next, a graphene compound having a structure represented by a structural formula (202) shown below was synthesized.

[Chemical Formula 22]

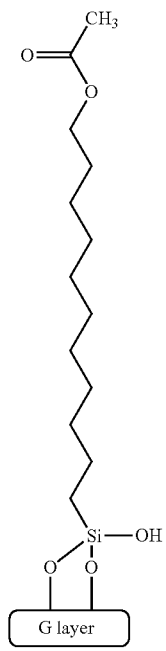

(202)

First, into a flask were put 0.41 g of graphene oxide (Rap dGO (TQ-11)-1 produced by NiSiNa materials Co., Ltd.) and 5.6 g (77 mmol) of n-butylamine. This mixture was irradiated with ultrasonic waves for 5 minutes and stirred at 60° C. for 1 hour, under a nitrogen stream. After the stirring, this mixture was cooled to room temperature, 20 mL of toluene was added to this mixture, and the obtained mixture was irradiated with ultrasonic waves for 5 minutes. After this mixture was cooled to 0° C., 11 g (31 mmol) of 11-acetoxyundecyltrichlorosilane was dripped into the mixed solution and the obtained mixture was stirred at 60° C. for 5 hours. After the stirring, this mixture was washed with toluene, and the resulting solid was collected by suction filtration. The obtained solid (residue) was further washed with ethanol and acetone. The obtained solid was dried, whereby 0.52 g of target black powder (Sample 1) was obtained.

<Formation of Layer 213>

A method for forming the electrode M will be described. The electrode M is formed by forming the layer 213 containing a graphene compound over the electrode O. The layer 213 containing the graphene compound was formed over the active material layer 212. First, a graphene compound and ethanol was mixed to form a dispersion liquid. Next, the electrode O in which the active material layer 212 is formed over a current collector was put on a hot plate at 70° C., and the formed dispersion liquid was dropped on the active material layer 212. In addition, heat treatment was performed at 70° C. under a reduced pressure. Through the above process, the electrode M in which the active layer 212 and the layer 213 were provided over the current collector was formed.

Next, a method for forming the electrode N will be described. The electrode N is formed by forming the layer 213 containing graphene oxide over the electrode O. First, graphene oxide and ethanol were mixed to form a dispersion liquid. Then, the formed dispersion liquid was dropped on the active material layer 212, and heat treatment was performed to volatilize the ethanol. Through the above process, the electrode N in which the active layer 212 and the layer containing graphene oxide were provided over the current collector was formed. The total thickness of the active material layer 212 and the layer 213 was approximately 90 μm.

Next, the formed electrode was stamped out into a positive electrode with a size of 12 mmφ. Two positive electrodes (No. 1 and No. 2) were formed from each electrode. As a negative electrode, lithium foil stamped into a size of 15 mmφ was used, and a separator was sandwiched between the positive electrode and the negative electrode, whereby a CR2032 coin-type storage battery was formed. For the separator, polypropylene was used. An electrolyte solution was formed in such a manner that lithium hexafluorophosphate ($LiPF_6$) was dissolved at a concentration of 1 mol/l in a solution in which EC and DEC were mixed at a volume ratio of 1:1.

Table 1 shows the amount of the positive electrode active material of each of the electrode O, the electrode M, and the electrode N, and the amount of the graphene oxide or the graphene compound (GO or GC) of each of the electrode M and the electrode N. The amount of the positive electrode active material was 18.6 mg/cm² to 19.5 mg/cm², and the amount of the graphene oxide or the graphene compound was 1.1 mg/cm² to 1.8 mg/cm².

TABLE 1

| | Positive Electrode Active Material [mg/cm²] | GO or GC [mg/cm²] |
|---|---|---|
| Electrode O (No. 1) | 19.2 | — |
| Electrode O (No. 2) | 19.0 | — |

TABLE 1-continued

|  | Positive Electrode Active Material [mg/cm$^2$] | GO or GC [mg/cm$^2$] |
| --- | --- | --- |
| Electrode N (No. 1) | 18.6 | 1.8 |
| Electrode N (No. 2) | 18.9 | 1.4 |
| Electrode M (No. 1) | 19.5 | 1.1 |
| Electrode M (No. 2) | 19.1 | 1.8 |

Charging and discharging of the formed storage battery were performed. Charging was performed at a constant current of 30 mA/g (approximately 0.08 C) with the upper voltage limit set to 4.8 V. Discharging was performed at a constant current of 30 mA/g (approximately 0.08 C) with the lower voltage limit set to 2 V.

Figure 28:
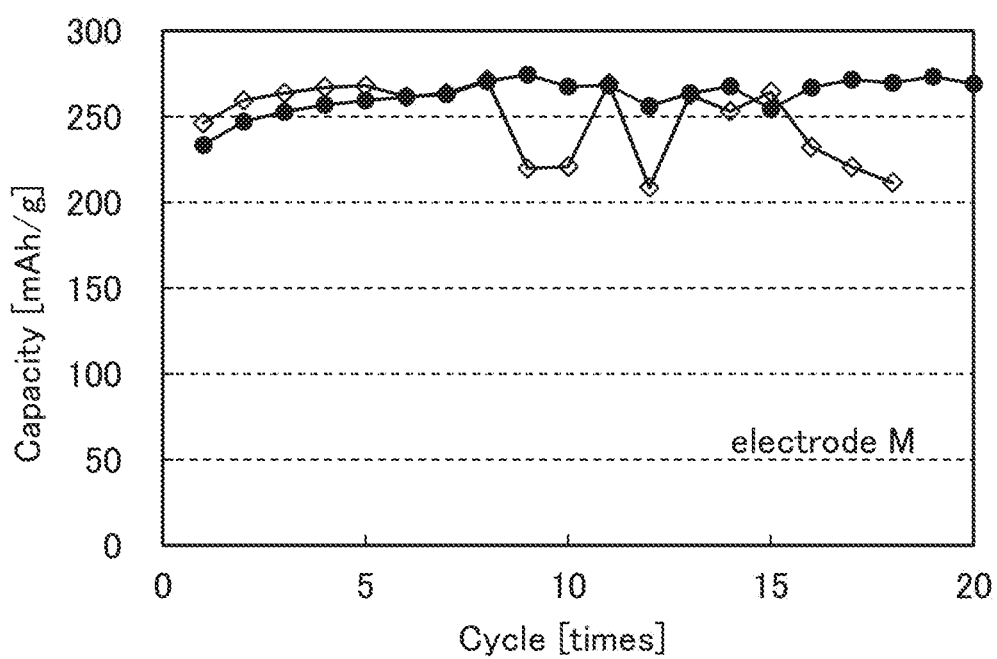
FIG. 28 shows cycle characteristics of a storage battery.
Figure 29A:
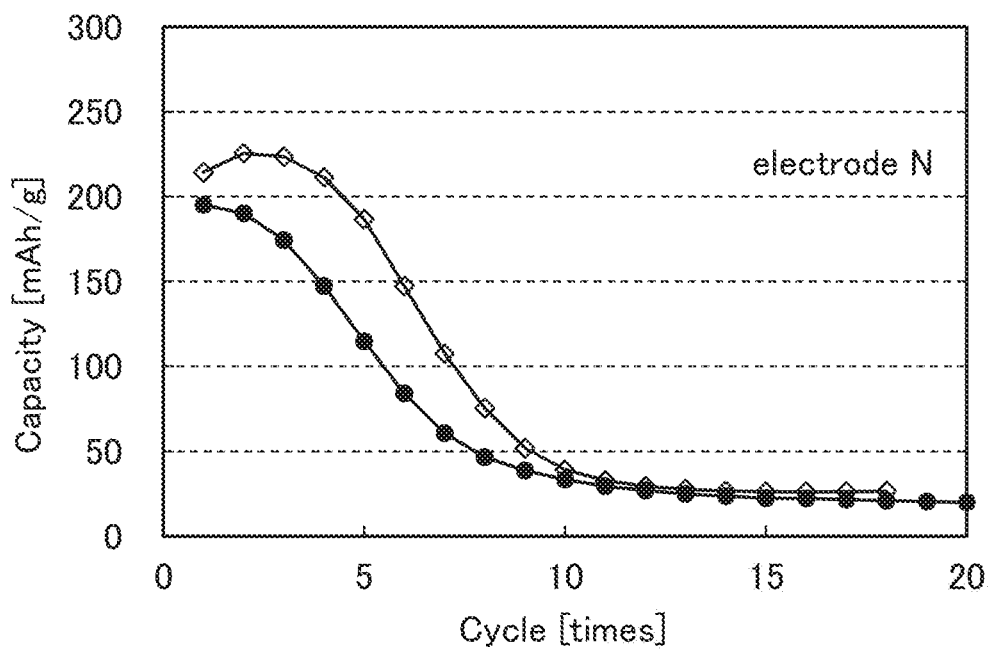
FIGS. 29A and 29B show cycle characteristics of storage batteries.
Figure 29B:
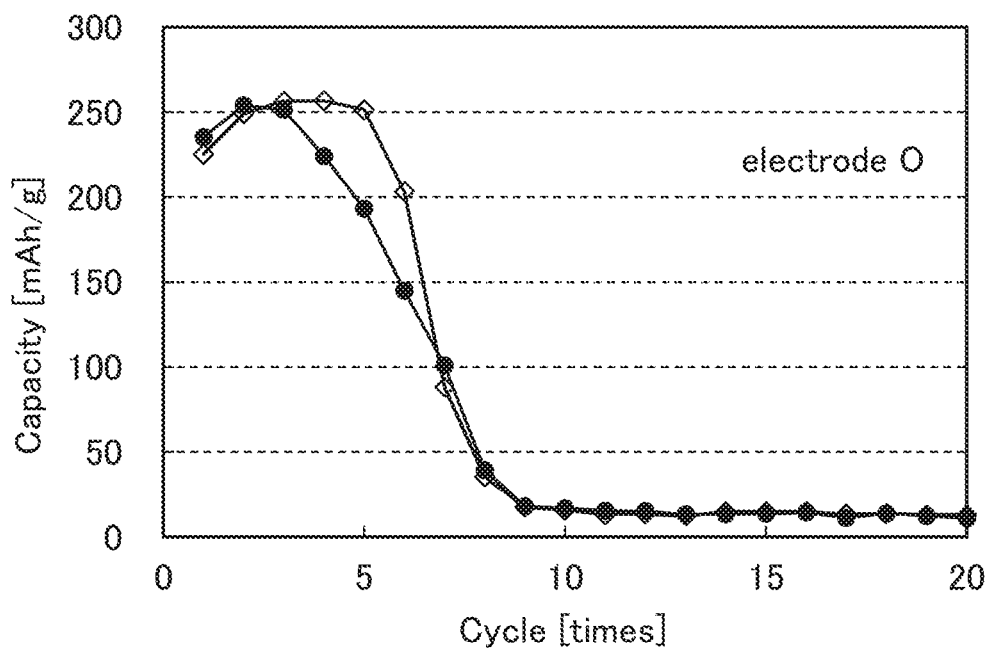

FIG. 28, FIG. 29A, and FIG. 29B show charge and discharge cycle characteristics of the electrode M, the electrode N, and the electrode O, respectively. Each electrode was stamped into the two positive electrodes; thus, two results of the charge and discharge cycle characteristics are shown at each condition. The vertical axis represents capacity and the horizontal axis represents the number of cycles. In the case of the electrode N in which the layer containing graphene oxide was formed, a decrease in capacity was suppressed as compared with the condition using the electrode O. In addition, in the case of the electrode M in which the layer containing the graphene compound, which is one embodiment of the present invention, was formed, a decrease in capacity with an increasing number of charge and discharge cycles was reduced, which is favorable.

This application is based on Japanese Patent Application Serial No. 2016-177284 filed with Japan Patent Office on Sep. 12, 2016, the entire contents of which are hereby incorporated by reference.

What is claimed is:

1. A power storage device comprising:
a positive electrode; and
a negative electrode over the positive electrode,
wherein the positive electrode comprises:
  a current collector;
  an active material layer over and in contact with the current collector; and
  a layer over and in contact with the active material layer,
wherein the active material layer comprises an active material and a conductive additive,
wherein the layer comprises a graphene compound,
wherein the active material comprises an element A and an element M,
wherein the element A is one or more elements selected from elements belonging to Group 1 and elements belonging to Group 2,
wherein the element M is one or more elements selected from manganese and nickel,
wherein the graphene compound has a structure represented by a following formula (G1):

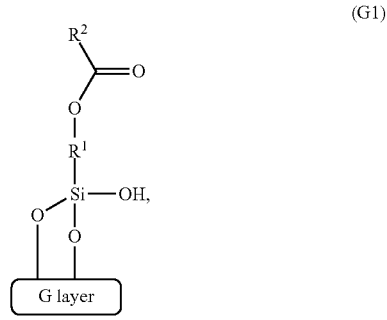

wherein G layer represents a graphene layer,
wherein R$^1$ represents a substituted alkylene group,
wherein R$^2$ represents a substituted or unsubstituted alkyl group, and
wherein the substituted alkylene group comprises a substituent selected from an alkyl group having 1 to 6 carbon atoms, an aryl group having 6 to 10 carbon atoms, fluorine, and trifluoromethane.

2. The power storage device according to claim 1,
wherein the substituted alkylene group comprises an alkylene group having 1 to 20 carbon atoms.

3. The power storage device according to claim 2,
wherein the substituted alkylene group comprises an alkylene group having 1 to 11 carbon atoms.

4. The power storage device according to claim 1,
wherein the graphene compound is capable of trapping the element M.

5. The power storage device according to claim 1, further comprising:
an exterior; and
an electrolyte solution.

6. The power storage device according to claim 1,
wherein the substituted alkylene group comprises the substituent selected from a methyl group, an ethyl group, an n-propyl group, an iso-propyl group, a sec-butyl group, a tert-butyl group, an n-pentyl group, an n-hexyl group, a phenyl group, an o-tolyl group, an m-tolyl group, a p-tolyl group, a 1-naphthyl group, a 2-naphthyl group, fluorine, and trifluoromethane.

7. A power storage device comprising:
a positive electrode; and
a negative electrode over the positive electrode,
wherein the positive electrode comprises:
  a current collector;
  an active material layer over and in contact with the current collector; and
  a layer over and in contact with the active material layer,
wherein the active material layer comprises an active material and a conductive additive,
wherein the layer comprises a graphene compound,
wherein the active material comprises an element A and an element M,
wherein the element A is one or more elements selected from elements belonging to Group 1 and elements belonging to Group 2,
wherein the element M is one or more elements selected from manganese and nickel, wherein the graphene compound has a structure represented by a following formula (G2):

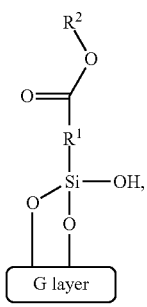
(G2)

wherein G layer represents a graphene layer,
wherein R¹ represents a substituted alkylene group,
wherein R² represents hydrogen or a substituted or unsubstituted alkyl group, and
wherein the substituted alkylene group comprises a substituent selected from an alkyl group having 1 to 6 carbon atoms, an aryl group having 6 to 10 carbon atoms, fluorine, and trifluoromethane.

8. The power storage device according to claim 7,
wherein the substituted alkylene group comprises an alkylene group having 1 to 20 carbon atoms.

9. The power storage device according to claim 8,
wherein the substituted alkylene group comprises an alkylene group having 1 to 11 carbon atoms.

10. The power storage device according to claim 7,
wherein the graphene compound is capable of trapping the element M.

11. The power storage device according to claim 7, further comprising:
an exterior; and
an electrolyte solution.

12. The power storage device according to claim 7,
wherein the substituted alkylene group comprises the substituent selected from a methyl group, an ethyl group, an n-propyl group, an iso-propyl group, a sec-butyl group, a tert-butyl group, an n-pentyl group, an n-hexyl group, a phenyl group, an o-tolyl group, an m-tolyl group, a p-tolyl group, a 1-naphthyl group, a 2-naphthyl group, fluorine, and trifluoromethane.

* * * * *